(12) United States Patent
Haq et al.

(10) Patent No.: US 6,702,941 B1
(45) Date of Patent: Mar. 9, 2004

(54) FLUID TREATMENT ELEMENTS ADAPTED FOR CROSS FLOW TREATMENT

(75) Inventors: Tanweer Haq, Tully, NY (US); John D. Miller, Sunnyside, NY (US); Stephen A. Geibel, Cortland, NY (US); James Acquaviva, East Northport, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/786,724

(22) PCT Filed: Sep. 9, 1999

(86) PCT No.: PCT/US99/20509
§ 371 (c)(1),
(2), (4) Date: Mar. 8, 2001

(87) PCT Pub. No.: WO00/13767
PCT Pub. Date: Mar. 16, 2000

Related U.S. Application Data

(60) Provisional application No. 60/099,663, filed on Sep. 9, 1998.

(51) Int. Cl.[7] ............................................... B01D 25/00
(52) U.S. Cl. ......................... 210/315; 55/484; 55/498; 55/521; 210/321.86; 210/337; 210/457; 210/493.1; 210/497.01
(58) Field of Search ............................ 210/337, 338, 210/409, 411, 321.77, 321.86, 455, 485, 489, 490, 493.1, 493.2, 493.4, 493.5, 497.01, 505, 508, 509; 55/521, 527, 528; 166/227, 230; 428/181; 495/941

(56) References Cited

U.S. PATENT DOCUMENTS

| | | |
|---|---|---|
| 2,401,222 A | 5/1946 | Briggs |
| 2,420,414 A | 5/1947 | Briggs |
| 2,801,009 A | 7/1957 | Bowers |
| 3,019,147 A | 1/1962 | Nalle, Jr. |
| 3,067,084 A | 12/1962 | Nalle, Jr. |
| 3,118,180 A | 1/1964 | Nalle, Jr. |
| 3,386,583 A | 6/1968 | Merten |
| 3,417,870 A | 12/1968 | Bray |
| 3,616,080 A | 10/1971 | Nalle, Jr. |
| 3,620,883 A | 11/1971 | Naller, Jr. |

(List continued on next page.)

FOREIGN PATENT DOCUMENTS

| | | |
|---|---|---|
| DE | 4311297 A | 10/1994 |
| DE | 4140058 A | 10/1997 |
| EP | 559623 A | 9/1993 |
| JP | 8-281008 A | 10/1996 |
| JP | 2000-42379 A | 2/2000 |
| WO | WO 94/26670 A | 11/1994 |
| WO | WO 97/24169 A | 7/1997 |

*Primary Examiner*—Joseph Drodge
(74) *Attorney, Agent, or Firm*—Leydig, Voit & Mayer, Ltd.

(57) ABSTRACT

A fluid treatment element is adapted for cross flow filtration which includes a fluid treatment pack having first and second lengthwise ends, a fluid treatment layer that may be pleated, a first mesh layer disposed on a first side of the fluid treatment layer and a second mesh layer disposed on the second side of the treatment layer, the element defining a flow path for a process fluid to be treated passing in a lengthwise direction of the fluid treatment element inside the first mesh layer and a flow path for permeate passing through the second mesh layer. The first mesh layer may open onto the first lengthwise end with the second mesh layer including sealant at the first lengthwise end such that fluid can flow through the first lengthwise end into the first mesh layer but not into the second mesh layer. The element may include a core having a blind region in which fluid cannot pass therethrough and at least one regions where fluid can pass through the core.

59 Claims, 30 Drawing Sheets

U.S. PATENT DOCUMENTS

| | | |
|---|---|---|
| 3,738,813 A | 6/1973 | Esmond |
| T912,007 I4 | 7/1973 | Rosenblatt |
| 3,813,334 A | 5/1974 | Bray |
| 3,880,755 A | 4/1975 | Thomas et al. |
| 4,154,688 A | 5/1979 | Pall |
| 4,252,591 A | 2/1981 | Rosenberg |
| 4,378,976 A | 4/1983 | Rush |
| 4,400,277 A | 8/1983 | Leason |
| 4,404,100 A | 9/1983 | Mikhail |
| 4,500,426 A | 2/1985 | Ishii et al. |
| 4,683,039 A | 7/1987 | Twardowski et al. |
| 4,802,982 A | 2/1989 | Lien |
| 4,839,037 A | 6/1989 | Bertelsen et al. |
| 4,842,736 A | 6/1989 | Bray et al. |
| 4,855,058 A | 8/1989 | Holland et al. |
| 4,872,990 A | 10/1989 | Van Wijk |
| 4,902,417 A | 2/1990 | Lien |
| 5,096,584 A | 3/1992 | Reddy et al. |
| 5,096,591 A | 3/1992 | Benn |
| 5,114,582 A | 5/1992 | Sandstrom et al. |
| 5,147,541 A | 9/1992 | McDermott, Jr. et al. |
| 5,252,207 A * | 10/1993 | Miller et al. ............. 210/493.5 |
| 5,254,143 A | 10/1993 | Anazawa et al. |
| 5,275,743 A * | 1/1994 | Miller et al. ............. 210/493.5 |
| 5,366,712 A | 11/1994 | Violante et al. |
| 5,460,720 A | 10/1995 | Schneider |
| 5,543,047 A | 8/1996 | Stoyell et al. |
| 5,552,048 A * | 9/1996 | Miller et al. ............. 210/493.2 |
| 5,725,784 A * | 3/1998 | Geibel et al. |
| 5,876,601 A * | 3/1999 | Geibel et al. ............. 210/493.1 |
| 6,099,729 A * | 8/2000 | Cella et al. ................ 210/315 |
| 6,113,784 A * | 9/2000 | Stoyell et al. ........... 210/493.2 |
| 6,432,310 B1 | 8/2002 | Andou et al. |

\* cited by examiner

FLUID TREATMENT ELEMENTS ADAPTED FOR CROSS FLOW TREATMENT

CROSS-REFERENCE TO A RELATED APPLICATION

This application is a 371 of PCT/US99/20509, filed on Sep. 9, 1999 and claims the benefit of U.S. Provisional Application No. 60/099,663, filed Sep. 9, 1998, the disclosure of which is incorporated herein in its entirety by reference.

FIELD OF THE INVENTION

The present invention generally relates to a fluid treatment element and fluid treatment methods such as filtering and material transfer from one fluid to another, and particularly to a filter element defining a flow path for process fluid passing in a lengthwise direction of the fluid treatment element.

BACKGROUND OF THE INVENTION

In one conventional type of fluid treatment known as dead end treatment, a fluid to be treated is introduced into a fluid treatment element, and the entirety or substantially all of the fluid is passed through a fluid treatment medium of the fluid treatment element to be filtered or otherwise treated. In another conventional type of fluid treatment known as crossflow filtration, a fluid to be treated is introduced into a fluid treatment element and is made to flow along the surface of a fluid treatment medium of the fluid treatment element. This flow of fluid along the surface is usually referred to as crossflow. Only a portion of the fluid passes through the fluid treatment medium to be filtered or otherwise treated, while the remainder of the fluid is discharged from the fluid treatment element without passing through the fluid treatment medium.

The fluid which is introduced into the element for treatment is usually referred to as process fluid, the fluid which passes through the fluid treatment medium is usually referred to as permeate, while the fluid which is discharged from the fluid treatment element without passing the fluid treatment medium is usually referred to as retentate. The crossflow of fluid along the surface of the fluid treatment medium generates a fluid shear force in the fluid adjoining the fluid treatment medium which slows the rate at which particles accumulate on the fluid treatment medium.

Each of these types of fluid treatment methods has advantages and disadvantages. In certain crossflow treatment or filtration, since particles accumulate on the surface of a fluid treatment medium more slowly than in dead end treatment, a fluid treatment element operated in a crossbow mode will typically have a longer useful life before requiring cleaning or replacement than a fluid treatment operated in the dead end mode. On the other hand, a fluid treatment element operated in crossflow mode requires greater volumes of fluid than does a fluid treatment element operated in dead end mode, since much of the fluid introduced into the fluid treatment element exits from it as retentate.

Furthermore, a crossflow fluid treatment element may require higher flow velocities than a dead end fluid treatment element, since a certain crossflow velocity is necessary to produce an adequate fluid shear force to prevent the accumulation of particles on the fluid treatment medium. For these reasons, a fluid treatment system employing a crossflow fluid treatment element is usually more complicated than one employing a dead end fluid treatment element and may be unsuitable for situations in which it is desired to treat small volumes of fluid at low flow rates.

The foregoing shows that there exists a need for a fluid treatment element that is capable of providing the advantages of crossflow as well as dead end treatment modes. There further exists a need for a method of cleaning fluid treatment elements such as filter elements which become loaded with particles during fluid treatment.

Furthermore, in the treatment of fluids, for example, in the dissolution of or removal of gases in liquids, certain problems are encountered. For example, in a conventional method of dissolving gases such as by bubbling a gas into a liquid, the resulting solution contains tiny gas bubbles. Such solutions are unfit for certain applications that require stringent purity, for example, in the manufacturing of semiconductors. The fluids considered for cleaning of the silicon wafer, particularly corrosive or active fluids such as ozonated water, ozonated sulfuric acid, or aqueous solutions of hydrofluoric acid, when prepared by conventional methods contain bubbles that may adhere to the wafer and adversely affecting the quality or performance of the semiconductor. Further, such conventional methods, as they operate on a sparging mode, provide rather low or inefficient gas to liquid transfer or dissolution rates.

Thus, there exists a need for a system or arrangement for treatment of fluids, for example, dissolution of or removal of gases in liquids. There further exists a need for fluid treatment elements which are resistant to corrosive fluids. There further exists a need for fluid treatment elements that do not degrade or release contaminants into the process fluids. Thus, there exists a need for fluid treatment elements that are free or substantially free of extractables.

These and other advantages of the present invention, as well as additional inventive features, will be apparent from the description of the invention provided herein.

BRIEF SUMMARY OF THE INVENTION

The present invention provides a fluid treatment element capable of operation in a crossflow mode. The present invention also provides a fluid treatment element having a large surface area available for fluid treatment. The present invention further provides a fluid treatment element which can have a variety of flow paths through it.

The present invention additional provides a fluid treatment element suitable for crossflow fluid treatment which can be connected in series with one or more additional fluid treatment elements without a large decrease in the energy of a fluid performing crossflow. The present invention also provides a treatment element which can be cleaned by crossflow. additionally provides methods of cleaning a fluid treatment element by crossflow.

Fluid treatment elements may comprise a fluid treatment pack having first and second lengthwise end faces and including a fluid treatment layer having first and second sides and a sealing strip extending for less than a length of the fluid treatment pack on the first side of the fluid treatment layer and preventing fluid from flowing through the first lengthwise end face into the fluid treatment pack on the first side of the fluid treatment layer.

Fluid treatment elements may comprise a hollow fluid treatment pack containing a fluid treatment medium and a core surrounded by the fluid treatment pack and having a blind region in which fluid cannot flow between an interior of the core and the fluid treatment pack extending continuously over at least fifty percent of a length of the fluid treatment pack.

Fluid treatment elements adapted for cross flow filtration may comprise a fluid treatment pack having a fluid treatment layer, a first mesh layer disposed on a first side of the fluid treatment layer, and a second mesh layer disposed on a second side of the fluid treatment layer, the fluid treatment elements defining a flow path for a process fluid to be treated passing in a lengthwise direction of the fluid treatment element inside the first mesh layer and a flow path for permeate passing through the second mesh layer.

Fluid treatment assemblies may comprise a housing having a process fluid chamber, a permeate chamber, and a retentate chamber, and a cylindrical fluid treatment element disposed in the housing and comprising a pleated fluid treatment layer having a radially inner side and a radially outer side, the fluid treatment element defining a first flow path passing through the fluid treatment element in a lengthwise direction of the fluid treatment element along the radially inner side of the fluid treatment layer between the process fluid chamber and the retentate chamber, and a second flow path passing through the fluid treatment layer between the process fluid chamber and the permeate chamber.

Fluid treatment elements may comprise a fluid treatment pack through which fluid can flow in a lengthwise direction of the fluid treatment pack and surrounding a hollow center of the fluid treatment element, and a flow restriction disposed in the hollow center for partially restricting fluid flow in the lengthwise direction of the fluid treatment element through the hollow center.

Fluid treatment arrangements may comprise a first fluid treatment element having a hollow center and first and second lengthwise ends and including a fluid treatment pack surrounding the hollow center and containing a fluid treatment medium, the first fluid treatment element defining a first flow path between the first and second ends through the fluid treatment pack and a second flow path through the hollow center between the first and second ends and bypassing the fluid treatment pack, and a flow restriction disposed in the hollow center for partially restricting fluid flow in a lengthwise direction of the fluid treatment element through the hollow center, and a second fluid treatment element connected in series with the first fluid treatment element so as to receive fluid passing along the first and second flow paths of the first fluid treatment element and defining a first flow path passing through a fluid treatment pack of the second fluid treatment element.

Fluid treatment elements include a fluid treatment pack containing a fluid treatment medium and a bypass passage surrounding the fluid treatment pack and enabling fluid to flow in a lengthwise direction of the fluid treatment element while bypassing the fluid treatment pack, the bypass passage having an inlet at a first lengthwise end of the fluid treatment element and an outlet at a second lengthwise end of the fluid treatment element, an interior of the bypass passage being isolated from the fluid treatment pack between the inlet and outlet.

Fluid treatment arrangements may comprise a first fluid treatment element including a fluid treatment pack containing a fluid treatment medium, a first member surrounding the fluid treatment pack, and a second member surrounding the first member and defining a bypass passage between the first and second members through which fluid can flow in a lengthwise direction of the first fluid treatment element while bypassing the fluid treatment pack, and a second fluid treatment element connected in series with the first fluid treatment element so as to receive fluid passing through the fluid treatment pack and the bypass passage of the first fluid treatment element.

Fluid treatment arrangements may comprise a cylindrical fluid treatment element comprises a hydrophobic gas pore membrane having first and second sides, the fluid treatment element defining a first flow path in a lengthwise direction of the fluid treatment element on the first side of the membrane and a second flow path in a lengthwise direction of the fluid treatment element on the second side of the membrane, a $ClO_2$ generator fluidly connected to the first flow path for supplying an aqueous solution containing dissolved $ClO_2$ to the fluid treatment element, and a source of a fluid to receive $ClO_2$ fluidly connected to the second flow path.

Fluid treatment assemblies may comprise a housing which has first through fourth tube sheets and which is divided by the tube sheets in a lengthwise direction of the housing into a first chamber, a second chamber located between the first and second tube sheets and separated from the first chamber by the first tube sheet, a third chamber located between the second and third tube sheets, a fourth chamber located between the third and fourth tube sheets, and a fifth chamber separated from the fourth chamber by the fourth tube sheet, each of the chambers having a fluid port communicating between the chamber and an exterior of the housing, and at least one fluid treatment element disposed in the second chamber and fluidly communicating with the first and third chambers through openings in the fist and second tube sheets, and at least one fluid treatment element disposed in the fourth chamber and fluidly communicating with the third and fifth chambers through openings in the third and fourth tube sheets.

Fluid treatment elements may comprise a fluid treatment pack having axially extending pleats and comprising a pleated composite including a fluid treatment layer, a first drainage layer on a first side of the fluid treatment layer, and a second drainage layer on a second side of the fluid treatment layer, a first open end cap sealed to a first lengthwise end of the fluid treatment pack and a second open end cap sealed to a second lengthwise end of the fluid treatment pack, and a core surrounded by the fluid treatment pack and having first and second open ends, a first perforated region adjoining the first open end of the core and having a blind inner end, and a second perforated region adjoining the second open end of the core and having a blind inner end, fluid being able to flow between the perforated regions only on an exterior of the core.

Fluid treatment elements may comprise a pleated fluid treatment pack containing a fluid treatment layer having a radially inner side and a radially outer side and a hollow center, a first lengthwise end into which a process fluid can flow into the radially outer side of the fluid treatment layer but not into the radially inner side of the fluid treatment layer, and a second lengthwise end having a lengthwise end face which is sealed to prevent fluid from flowing through the lengthwise end face, and a tube surrounding the fluid treatment pack and preventing fluid from flowing in a radial direction of the fluid treatment element between the fluid treatment pack and an exterior of the fluid treatment element except in a region in a vicinity of the second lengthwise end of the fluid treatment pack.

Fluid treatment elements may comprise a hollow pleated fluid treatment pack having two lengthwise end faces through which fluid can flow into the fluid treatment pack, a fluid impervious member surrounding the fluid treatment pack for preventing fluid from flowing into the fluid treatment pack from an exterior of the fluid treatment element between the lengthwise end faces, a sealing member for sealing a first lengthwise end of the fluid treatment element to a tube sheet of a fluid treatment housing, a tube communicating with the hollow center of the fluid treatment pack and extending outwards from one of the lengthwise end faces of the fluid treatment pack, and a sealing member for sealing the tube to a tube sheet of a fluid treatment housing.

Fluid treatment assemblies may comprise a fluid treatment housing including first and second tube sheets, a first chamber adjoining the first tube sheet, a second chamber between the first and second tube sheets and separated from the first chamber by the first tube sheet, and a third chamber adjoining the second tube sheet and separated from the second chamber by the second tube sheet, and a fluid treatment element disposed in the second chamber and comprising a hollow pleated fluid treatment pack having first and second lengthwise end faces through which fluid can flow, a first lengthwise end connected to the first tube sheet, a tube communicating with a hollow center of the fluid treatment pack and connected to the second tube sheet, and a fluid impervious member surrounding the fluid treatment pack for preventing fluid from flowing into the fluid treatment pack from the second chamber except through the second lengthwise end face of the fluid treatment pack.

Fluid treatment assemblies may comprise a fluid treatment element having a hollow center and a pleated fluid treatment pack surrounding the hollow center, a blind end cap connected to a first lengthwise end of the fluid treatment pack, and an open end cap connected to a second lengthwise end of the fluid treatment pack, and a housing containing the fluid treatment element and including a first fluid port opening onto a region of the housing on an exterior of the fluid treatment element, a second fluid port opening onto a region of the housing on an exterior of the fluid treatment element, and a third fluid port communicating with the hollow center of the fluid treatment pack, the fluid treatment element being disposed between the first and second fluid ports, the housing surrounding the fluid treatment element sufficiently closely that a flow path between the first and second fluid ports passing through the fluid treatment pack provides lower resistance to flow than a flow path between the first and second fluid ports passing between the fluid treatment pack and the housing.

Fluid treatment elements may have first and second open ends through which fluid can flow and may comprise a pleated fluid treatment pack disposed between the open ends of the fluid treatment element and a fluid impervious member surrounding the fluid treatment pack and preventing fluid from flowing into the fluid treatment pack from an exterior thereof except in a lengthwise midportion of the fluid treatment element.

Fluid treatment methods may comprise introducing a process fluid into a cylindrical fluid treatment pack comprising a fluid treatment layer having a radially inner side and a radially outer side, passing the process fluid in a lengthwise direction of the fluid treatment pack along the radially inner side of the fluid treatment layer to produce a fluid shear force on the radially inner side of the fluid treatment layer, passing a portion of the process fluid though the fluid treatment layer to the radially outer side of the fluid treatment layer to form a permeate, and discharging the permeate and the process fluid which does not pass through the fluid treatment layer from the fluid treatment element.

Fluid treatment methods may comprise introducing a process fluid into a first mesh layer on a first side of a fluid treatment layer at a first lengthwise end of a fluid treatment element, passing the process fluid in a lengthwise direction of the fluid treatment pack within the first mesh layer toward a second lengthwise end of the fluid treatment element to generate a fluid shear force on the first side of the fluid treatment layer, and passing a portion of the process fluid through the fluid treatment layer into a second mesh layer on a second side of the fluid treatment layer.

Fluid treatment methods may comprise introducing a fluid through a lengthwise end face of a fluid treatment pack into a first mesh layer on a first side of a fluid treatment layer of the fluid treatment pack, and passing at least a portion of the fluid through the fluid treatment layer into a second mesh layer on a second side of the fluid treatment layer.

Fluid treatment methods may comprise introducing a process fluid into a fluid treatment clement having a fluid treatment layer and a drainage mesh disposed on one side of the fluid treatment layer, the drainage mesh having first and second sets of strands extending diagonally with respect to a lengthwise direction of the fluid treatment element, passing the process fluid through the drainage mesh in a lengthwise direction of the fluid treatment element to produce a fluid shear force along a surface of the fluid treatment layer, and passing a portion of the process fluid through the fluid treatment layer to form a permeate.

Fluid treatment methods may comprise introducing a -fluid into a first fluid treatment element at a fist lengthwise end thereof, passing a first portion of the fluid along a first flow path through a fluid treatment pack of the first fluid treatment element and passing a second portion of the fluid along a second flow path through the fluid treatment element bypassing the fluid treatment pack, combining fluid which has passed along the first and second flow paths at a second lengthwise end of the fluid treatment element, and discharging the combined fluid from the first fluid treatment element.

Fluid treatment methods may comprise passing a first fluid stream through a pleated fluid treatment element in a lengthwise direction of the fluid treatment element on a first side of a fluid treatment layer of the fluid treatment element, passing a second fluid stream through the fluid treatment element in a lengthwise direction of the fluid treatment element on a second side of the fluid treatment layer, and transferring material across the fluid treatment layer between the two fluid streams. The material transfer is carried out without direct mixing of the fluid streams.

Fluid treatment methods may comprise passing a fluid through a fluid treatment layer from a first side to a second side of the fluid treatment layer to treat the fluid, and then cleaning the fluid treatment layer by passing a liquid and a gas along the first side of the fluid treatment layer in a lengthwise direction of the fluid treatment element.

Fluid treatment methods comprise passing a fluid through a fluid treatment layer of a fluid treatment element in a first direction, passing a mixture of liquid and gas through the fluid treatment layer in a second direction to dislodge particles from the fluid treatment layer; and discharging the mixture of liquid and gas and the dislodged particles from the fluid treatment element.

Fluid treatment methods may comprise introducing a process fluid into a hollow center of a pleated fluid treatment element at a first lengthwise end of the fluid treatment element, passing the process fluid outward from the hollow center into a fluid treatment pack surrounding the hollow center, passing the process fluid within the fluid treatment pack in a lengthwise direction of the fluid treatment element along a first surface of a fluid treatment layer of the fluid treatment element, passing a portion of the process fluid through the fluid treatment layer, and discharging process fluid which does not pass through the fluid treatment layer from a second lengthwise end of the fluid treatment element.

Fluid treatment methods may comprise introducing a fluid to be treated into a fluid treatment element on a first side of a fluid treatment layer of the fluid treatment element, passing all of the fluid to be treated through the fluid treatment layer, introducing a cleaning fluid into the fluid treatment element on the first side of the fluid treatment layer, and cleaning the fluid treatment layer by passing the cleaning fluid along the fist side of the fluid treatment layer to generate a fluid shear force on the first side of the fluid treatment layer.

Fluid treatment methods may comprise introducing a fluid from a first chamber of a housing through a first tube sheet into a first lengthwise end of a pleated fluid treatment element disposed in a second chamber of the housing separated from the first chamber by the first tube sheet, passing the fluid within the fluid treatment element along a radially outer side of a fluid treatment layer of the fluid treatment element in a lengthwise direction of the fluid treatment element to generate a fluid shear force on the radially outer side of the fluid treatment layer while retaining the fluid in the fluid treatment element by a fluid impervious member, and discharging the fluid radially outward from the fluid treatment element into the second chamber in the vicinity of a second lengthwise end of the fluid treatment element.

Fluid treatment methods may comprise introducing a fluid from a first chamber of a housing radially into a fluid treatment element disposed in the first chamber, passing the fluid within the fluid treatment element along a radially outer side of a fluid treatment layer of the fluid treatment element in a lengthwise direction of the fluid treatment element to generate a fluid shear force on the radially outer side of the fluid treatment layer while retaining the fluid in the fluid treatment element by a fluid impervious member, and discharging the fluid from a lengthwise end of the fluid treatment element through a first tube sheet into a second chamber of the housing separated from the first chamber by the first tube sheet.

Fluid treatment methods may comprise introducing a fluid to be treated into a pleated fluid treatment element, passing the fluid in a lengthwise direction of the fluid treatment element along a first side of a fluid treatment layer of the fluid treatment element toward a first lengthwise end of the fluid treatment element, passing a portion of the fluid through the fluid treatment layer, discharging the portion of the fluid which passed through the fluid treatment layer from a second lengthwise end of the fluid treatment element, and discharging fluid which did not pass through the fluid treatment layer from the first lengthwise end of the fluid treatment element.

The numerous advantages of the various above-mentioned and other aspects of the present invention will be described in detail below. Among these advantages are versatility permitting various modes of operation, high efficiency, effective use of space, and an increased lifespan of fluid treatment elements.

A fluid treatment element according to the present invention can be used to treat a wide variety of fluids, including gases, liquids, and multi-phase combinations, such as mixtures of gases and liquids, and it can be employed to perform a wide variety of fluid treatment processes, such as removal of particles from a fluid (particle filtration), coalescing, transfer of dissolved substances between two fluids, and concentration of a process fluid. Particles which may be removed from a fluid when the fluid treatment element is used for particle filtration may range in size from coarse particles (generally defined as particles about 0.1 mm in diameter and above) down to particles in the ionic range (generally defined as particles measuring about $10^{-7}$ to about $10^{-5}$ mm in diameter). Thus, the fluid treatment element may be used to perform filtration such as coarse particle filtration, fine particle filtration, microfiltration, ultrafiltration, reverse osmosis, gas permeation, dialysis, pervaporation, vapor permeation, membrane distillation, electrodialysis, electrofiltration, and liquid membranes.

A fluid treatment element according to the present invention may be a disposable element which is intended to be discarded when it becomes loaded with particles, or it can be a reusable element which can be cleaned upon becoming loaded, either while still installed in a housing or after being removed therefrom, to enable the element to be reused. In a number of preferred embodiments of the present invention, a fluid treatment element is capable of being cleaned while installed in a housing either by backwashing or by crossflow.

Fluid treatment assemblies may comprise a fluid treatment pack and a tube surrounding the fluid treatment pack. The tube may have openings at or in the vicinity of the lengthwise ends of the tube and a blind region without openings extending between the openings. The assembly may include end caps sealed to the ends of the filter pack.

An arrangement for contacting a liquid and a gas that is soluble in the liquid may comprise a fluid treatment device, a source of the gas, and a source of the liquid. A method for contacting a liquid and a gas may use the above arrangement. The method enables the preparation of solutions of gases in liquids that are free or substantially free of bubbles. An arrangement for degassifying a liquid containing a dissolved gas may comprise a fluid treatment device, a source of the liquid, and a difference in pressure between the first and second flow paths.

Fluid treatment methods may comprise introducing a process fluid into a pleated fluid treatment element; passing at least a portion of the process fluid through a fluid treatment medium of the element; and passing a gas which is different from the process fluid along the first side of the fluid treatment medium to remove particles from the first side of the fluid treatment medium.

Fluid treatment arrangements may comprise a pleated fluid treatment element; a housing containing the fluid treatment element and having a first fluid port communicating with the first lengthwise end and second and third fluid ports communicating with the second lengthwise end of the fluid treatment element, fluid being able to flow from the first port to the second and third ports through the fluid treatment element without passing through the fluid treatment medium; a source of liquid to be treated connected to one of the first and second fluid ports; and a source of crossflow cleaning gas connected to third fluid port.

Fluid treatment modules may comprise headers having bores for fluid communication, a casing, and a fluid treatment element. A fluid treatment assembly may comprise a plurality of fluid treatment modules.

Methods for cleaning a fluid treatment element may comprise a fluid treatment medium having a first side and a second side, the first side having particles deposited thereon. The method involves passing a cleaning gas along the first side of the fluid treatment medium without first passing through the fluid treatment medium.

Although the present invention will be described with respect to a number of embodiments, the present invention

DETAILED DESCRIPTION OF EMBODIMENTS

Figure 1:
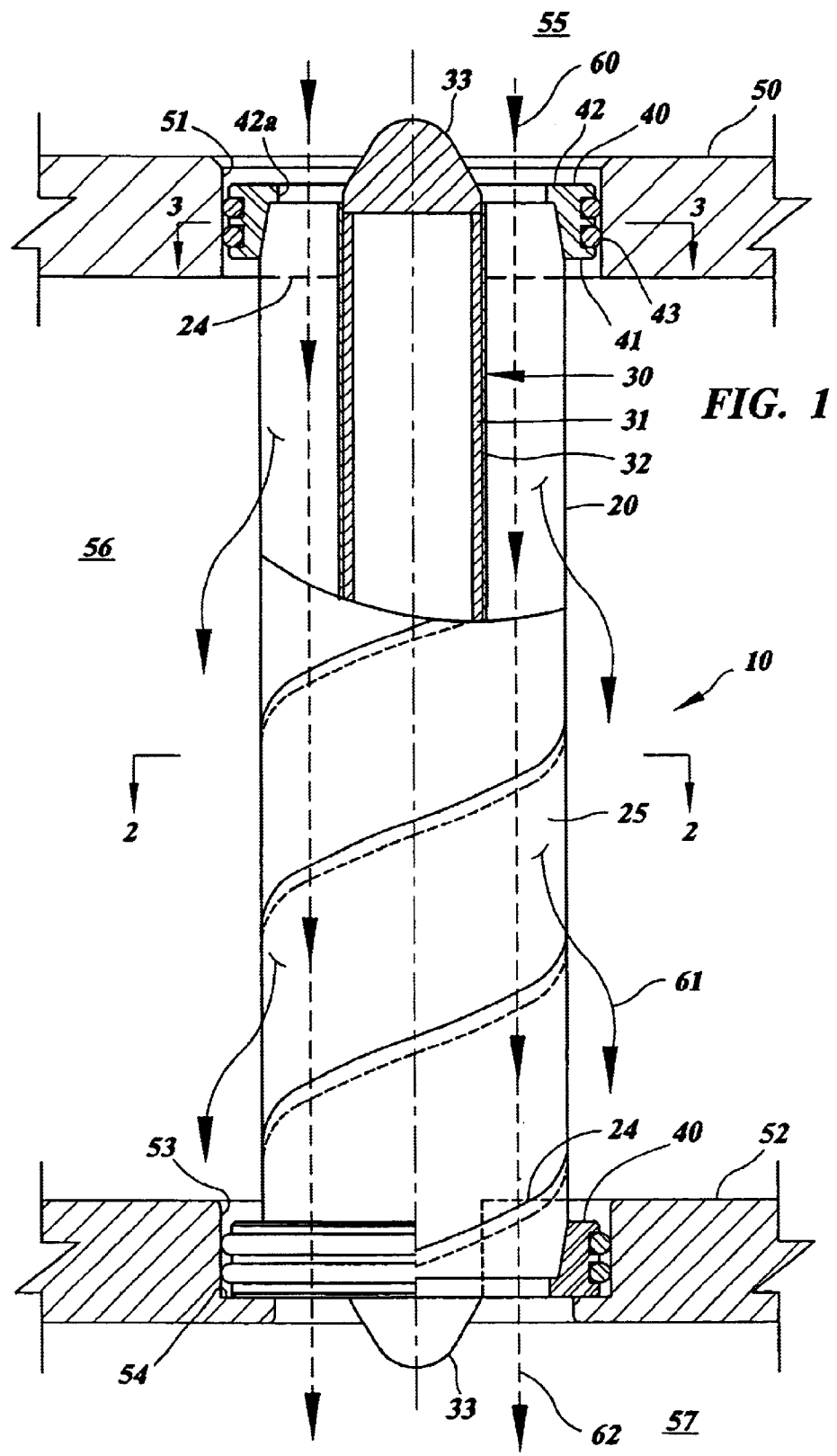
FIG. 1 is a cut-away elevation of an embodiment of a filter element according to the present invention.

In the following description, the term "fluid treatment element" will be used to refer to a device including a fluid treatment medium for treating a fluid, and the term "fluid treatment assembly" will be used to refer to a combination of a housing and one or more fluid treatment elements installed in the housing, ether removably or permanently. The term "fluid treatment pack" will be used to refer to a portion of a fluid treatment element containing a fluid treatment medium. When the fluid treatment element is to perform filtration, a fluid treatment element, a fluid treatment assembly, a fluid treatment medium, and a fluid treatment pack may be referred to as a filter element, a filter assembly, a filter medium, and a filter pack, respectively. In many of the embodiments described below, the fluid treatment elements are particularly suitable for filtration of a fluid to remove particles from the fluid and so will be refereed to as filter elements, but as stated above, fluid treatment elements of the present invention can be employed for a wide variety of types of fluid treatment.

In the drawings, the filter elements are illustrated as being vertically oriented, but the filter elements can have any orientation with respect to the vertical. For convenience, the terms "upper" and "lower" may be used to refer to various portions of the filter elements or equipment with which the filter elements are employed, but use of these terms is not intended to impose any restrictions on the manner in which the filter elements can be oriented.

FIG. 1 is cutaway elevation of a first embodiment of a filter element 10 according to the present invention. It includes a filter pack 20 containing a filter medium, a core 30 surrounded by the filter pack 20, and an end cap 40 disposed at each lengthwise end of the filter pack 20.

The filter element 10 is shown installed in a housing, only a portion of which is shown. The housing will frequently comprise a plurality of sections which are detachably secured to each other to enable the housing to be opened and closed to permit installation and replacement of the filter element 10. The illustrated housing includes first and second tube sheets 50 and 52 which divide the interior of the housing into a process fluid chamber 55 from which a process fluid to be filtered can be introduced into the filter element 10, a permeate chamber 56 which receives permeate discharged from the filter element 10 when the filter element is being operated in a crossflow mode of filtration, and a retentate chamber 57 which receives retentate discharged from the filter element 10 when the filter element is being operated in a crossflow mode of filtration. When the filter element 10 is being operated in a dead end mode of filtration, the permeate chamber 56 receives filtrate which has passed through the filter element 10, while substantially no fluid flows into the retentate chamber 57.

The first tube sheet 50 contains an opening 51 communicating between the process fluid chamber 55 and the permeate chamber 56, and the second tube sheet 52 contains an opening 53 communicating between the permeate chamber 56 and the retentate chamber 57. Each end of the filter element 10 is received in or otherwise fluidly connected to one of the openings 51, 53. Depending upon the size of the housing, each tube sheet may include a plurality of openings to enable the housing to accommodate a plurality of similar filter elements in the same manner. The housing will generally include a plurality of fluid ports, each of which communicates between one of the chambers 55–57 and the exterior of the housing and enables fluid to be introduced into or removed from the corresponding chamber. Preferably each of the fluid ports is equipped with a valve or other control mechanism by means of which fluid flow through the port can be allowed or prevented. If desired, means may be provided for immobilizing the filter element 10 with respect to the tube sheets, such as tie rods, hold down plates, or clamps, although in many cases, friction between the tube sheets and the end caps 40 is sufficient to prevent undesired movement of the filter element 10. In the present embodiment, a ledge 54 for supporting the filter element 10, positioning the filter element 10 with respect to the tube sheets, or resisting axial forces acting on the filter element 10 is formed in the opening 53 in the second tube sheet 52. The filter element 10 can be installed in the tube sheets by being inserted from the process fluid chamber 55 into the first and second tube sheets until the end caps 40 are sealed against the openings 51, 53 in the tube sheets.

The filter pack 20 need not have any particular shape. In the present embodiment, the filter pack 20 is a hollow member with a cylindrical inner or outer periphery, but it may have other peripheral shapes, such as oval or polygonal. Furthermore, it need not be hollow. In the embodiment of FIG. 1, the filter pack 20 is a pleated member with a plurality of axially extending pleats, i.e., pleats extending in the lengthwise direction of the filter pack 20. However, the filter pack 20 may have a non-pleated structure, such as a spiral-wound structure in which one or more sheets of material are wound around a core in one or more turns.

A pleated filter pack may be advantageous in those applications in which minimizing pressure drop is important, since the flow path of fluid in the direction of the height of pleats in a pleated filter pack tends to be shorter than the flow path of fluid in the direction of winding of sheets in a spiral-wound filter pack, resulting in lower pressure drops in a pleated filter pack. On the other hand, a spiral-wound filter pack may have advantages with respect to ease of manufacture, the surface area available for filtration for a given volume, or strength.

The filter pack 20 may be formed from a single layer, but generally it comprises a multilayer composite. In the present embodiment, it comprises a three-layer composite of a filter layer 21 comprising a filter medium, an inner drainage layer 22, and an outer drainage layer 23.

There are no particular restrictions on the type of filter medium which can be employed in the filter layer 21, and it can be selected in accordance with the fluid which is to be filtered and the type of filtration which is to be performed. For example, the filter medium may be in the form of a mass of fibers, fibrous mats, woven or non-woven fibrous sheets, porous membranes such as supported or unsupported microporous membranes, porous foam, and porous metals or ceramics. The filter medium may be formed from any suitable materials, including but not being limited to natural or synthetic polymers, glass, metals, and ceramics.

The filter pack 20 may contain a single filter layer 21, or a plurality of filter layers of the same or different filter medium may be disposed atop one another to a desired thickness. For example, it is possible for the filter pack 20 to include two or more filter layers having different filtering characteristics, e.g., with one layer acting as a prefilter for the second layer. Each filter layer may have a uniform pore structure or a graded pore structure which varies over its thickness.

The drainage layers 22 and 23 are frequently desirable in the filter pack 20 to form spaces through which fluid can flow along either side of the filter layer 21 even when the pleats of the filter pack 20 are pressed against each other, and they may also reinforce the filter layer 21 to give the filter pack greater rigidity and strength. However, if there is adequate space for fluid to flow along the surfaces of the filter layer 21, one or both of the drainage layers can be omitted. The inner drainage layer 22 is the layer positioned on what is the downstream side of the filter layer 21 when fluid is flowing radially inwards through the filter pack 20 from its exterior to its center, while the outer drainage layer 23 is the layer positioned on what is the upstream side of the filter layer 21 when fluid is flowing radially inwards through the filter pack 20.

The drainage layers 22, 23 can be made of any materials having low edgewise flow characteristics, i.e., low resistance to fluid flow through a drainage layer in a direction generally parallel to its surface. Examples of suitable materials include meshes and porous woven or non-woven sheets. Meshes are usually preferably to porous sheets because they tend to have a greater open area and a greater resistance to compression in the thickness direction. For high temperature applications, a metallic mesh or screen may be employed, while for lower temperature applications, a polymeric mesh may be particularly suitable. Polymeric meshes typically come in the form of woven meshes and nonwoven meshes. Either type may be employed, but nonwoven meshes are generally preferable because they are smoother and therefore produce less abrasion of adjoining layers of the filter composite. Specific examples of suitable nonwoven polymeric meshes are those available from Nalle Plastics (Austin, Tex.) under the trade names NALTEX™, ZICOT™, and ULTRAFLO™.

Some types of nonwoven meshes have less resistance to edgewise flow in one direction than in other directions. One example of such a nonwoven mesh is that sold under the trade designation DELNET™. This mesh has a set of parallel polymeric strands disposed atop an expanded polymeric sheet. The edgewise flow resistance of DELNET is considerably lower for flow parallel to the polymeric strands than for flow transverse to the strands. In regions of the filter pack 20 where the flow is primarily in one direction (such as primarily in the lengthwise direction of the filter pack 20 or primarily in the direction of the height of the pleats), a mesh having a lower edgewise flow resistance in one flow direction than in another may be suitable.

On the other hand, in regions of the filter pack 20 where flow is in multiple directions, or where the flow must change directions, it may be preferable to employ a mesh which does not have a single preferred flow direction. An example of such a mesh is that referred to as diamond mesh, which has first and second sets of strands extending diagonally with respect to the lengthwise direction of the mesh (the direction in which the mesh emerges from a roll of the mesh). When a patterned mesh such as a diamond mesh is employed for the drainage layers 22, 23, the strands of the mesh will all extend diagonally with respect to the lengthwise direction of the filter pack 20, and the drainage layers 22, 23 will provide roughly the same edgewise flow resistance in the lengthwise direction of the filter pack 20 and in the height direction of the pleats of the filter pack 20. Different types of meshes can be used on opposite sides of the filter layer 21, or in different regions along the length of the filter pack 20 on the same side of the filter layer 21.

In certain preferred embodiments of the filter element according to the present invention in which opposing surfaces of adjoining legs of the pleats are pressed against each other, when the drainage layers 22, 23 comprise nonwoven meshes, the strands of the drainage mesh of one leg of the pleats are pressed against the strands of the drainage mesh of an adjacent leg of the pleats. If the strands of the drainage mesh on two opposing surfaces are parallel to one another, the strands may have a tendency to "nest", i.e., to fit between one another rather than to lie atop one another. If nesting takes place, the direction of the strands which nest is preferably such that their nesting does not seriously degrade the edgewise flow resistance of the mesh. The resistance to edgewise flow produced by nesting strands is generally a maximum when the nesting strands extend perpendicular to the direction of edgewise flow and a mimnimum when they nesting strands extend parallel to this direction.

The drainage layers 22, 23 on the radially inner and outer sides of the filter layer 21 may have different characteristics from each other. For example, the thickness of the drainage layer on the process fluid side of the filter layer 21 (the inner drainage layer 22 in FIG. 2) may be greater than the thickness of the drainage layer on the permeate side (the outer drainage layer 23 in FIG. 2) to provide space in which a cake can form or through which particles, which may be present in the process fluid but not in the permeate, can pass.

The filter pack 20 may include other layers in addition to the filter layer 21 and the drainage layers 22, 23. For example, in order to prevent abrasion of the filter layer 21 due to rubbing contact with the drainage layers 22, 23 when the pleats expand and contract during pressure fluctuations of the fluid system in which the filter is installed, a cushioning layer can be disposed between the filter layer 21 and one or both of the drainage layers 22, 23. The cushioning layer is preferably made of a material smoother than the drainage layers 22, 23 and having a higher resistance to abrasion than the filter layer 21. For example, when the drainage layers 22, 23 are made of a nonwoven polymeric mesh, an example of a suitable cushioning layer is a polyester non-woven fabric such as that sold under the trade designation REEMAY™ 2250 by Reemay Corporation. A cushioning layer may be a discrete layer which is separate from other layers in the composite, or it may be joined to another one of the layers. For example, it may be in the form of a porous fabric to which the filter layer 21 is attached and which serves as a substrate for the filter layer 21.

The spaces between opposing surfaces of the filter layer 21 on the radially outer side of the filter layer 21 are preferably sealed at both lengthwise ends of the filter pack 20 to prevent process fluid from flowing through the upper lengthwise end face of the filter pack 20 into the permeate side of the filter layer 21 and to prevent permeate from flowing through the lower lengthwise end face into the retentate chamber 57. The spaces can be sealed in a variety of manners. In the present embodiment a sealing strip 24 which is impervious to the process fluid and the permeate is pleated into the composite at both lengthwise ends of the filter pack 20 so as to fill the spaces. The sealing strips 24 can be made of any material which in the pleated state of the filter pack 20 is impervious to the process fluid or the permeate. For example, the material can be one which is impervious in either a compressed or uncompressed state, or it can be made of material which is porous and pervious in an uncompressed state but which, when compressed inside the filter pack 20, has its pores closed to become non-porous and impervious to fluid.

Some examples of suitable materials for the sealing strips 24 are soft, polymeric closed cell foams made of polyurethane, silicon, polyester, elastomers, or similar materials. The material forming the sealing strips 24 is preferably soft enough to completely fill the spaces between opposing surfaces of the filter layer 21 on the radially outer side of the filter layer 21 and prevent fluid flow between the surfaces. The sealing material may also extrude into and fill some or all of the pores of the end(s) of the filter layer 21. An example of a suitable hardness for the sealing strips 24 is on the order of Shore A20 or softer, but the hardness can vary depending upon factors such as the thickness of the inner drainage layer 22 and the compressive forces acting on the pleats in the circumferential direction of the filter pack 20.

The lengthwise ends of the outer drainage layer 23 may be set back from the lengthwise ends of the filter element 10 so as not to overlap the sealing strips 24, or if the sealing strips 24 are sufficiently soft to extrude into and fill any openings in the outer drainage layer 23, the outer drainage layer 23 may overlap one or both of the scaling strips 24 in the lengthwise direction of the filter pack 20. The width of the sealing strips 24 (measured in the lengthwise direction of the filter element 10) is not critical. The smaller the width, the greater the surface area of the filter layer 21 which is available for filtration. On the other hand, as the width of the sealing strips 24 decreases, it may become more difficult to corrugate the sealing strips 24 into the pleated composite. The sealing strips 24 can have any thickness which enables them to fill the spaces between adjoining surface of the filter layer 21. In the present embodiment, each sealing strip 24 has a thickness of about ⅛ inch in an uncompressed state and a width of about 1 inch.

In the present embodiment, the outer drainage layer 23 is disposed between the sealing strips 24 and the filter layer 21, but it is also possible for the sealing strips 24 to be disposed between the outer drainage layer 23 and the filter layer 21, or for there to be multiple sealing strips at each lengthwise end of the filter pack 20, with one disposed between the filter layer 21 and the outer drainage layer 23, and another disposed on the radially outer side of the outer drainage layer 23.

Other means besides sealing strips 24 can be used to form a seal between opposing surfaces of the filter layer 21 on its radially outer side. For example, a resin sealant can be injected into the outer drainage layer 23 between opposing surfaces of the filter layer 21 to fill the openings in the drainage layer at the lengthwise ends. If one or both of the filter layer 21 and the outer drainage layer 23 are formed of a thermoplastic material the layers 21 and 23 can be locally melted to each other along their edges which will be located at the lengthwise ends of the filter pack 20 after pleating has taken place. The melting will decrease the thickness of the outer drainage layer 23 and/or fill the openings in the outer drainage layer 23 with the molten material along its edges to thereby prevent fluid from flowing into the outer drainage layer 23 in the melted regions. The melting can take place prior to corrugating by passing the edges of layers 21 and 23 through heated rollers, for example. Layers 21 and 23 can then be combined with the inner drainage layer 22, and the three layers can be corrugated to form a pleated filter pack 20.

The pleats of the filter pack 20 may be configured in a variety of manners. For example, when the filter pack 20 is a hollow cylindrical member, the pleats may be formed into radial pleats in which the radially inner portion of each pleat lies substantially on the same radius as the radially outer portion of the same pleat with respect to the longitudinal axis of the filter element. Thus, in certain embodiments of the present invention, the pleated fluid treatment element can be characterized by a pleat height which is given by the formula:

$$h=(D-d)2$$

wherein D is the outer diameter at the peaks of the filter element, and d is the inner diameter at the roots of the filter element. However, with such an arrangement, the spacing between adjacent pleats necessarily increases as the distance from the center of the filter pack 20 increases. Accordingly, radial pleats result in a great deal of unused space between adjacent pleats. Furthermore, due to the varying spacing between the pleats, the flow conditions of the process fluid will greatly vary over the height of the pleats, with the result that certain portions of the pleats will be loaded with dirt before other portions. This nonuniform loading can decrease the dirt capacity and/or service life of a filter element.

Therefore, it is preferred for the pleats to be arranged such tat the legs of the pleats are pressed against each other over a continuous region extending over a substantial portion of the height of the legs. The pleats of a hollow cylindrical filter pack 20 can be pressed against each other in a variety of manners. One way is to form the pleats into a laid-over state in which the radially outer portions of the pleats are displaced in the circumferential direction of the filter element 10 with respect to the radially inner portions of the pleats around at least a portion of the circumference and more preferably around substantially the entire circumference of the filter element 10 until adjoining legs of the pleats are pressed against each other. When the pleats are laid over in this manner, each pleat has a height which is greater than the difference between the outer radius of the peaks of the pleats and the inner radius at the roots of the pleats of the filter packs. In certain other embodiments wherein the pleats are in a laid-over state in which the opposing surfaces of adjoining legs of the pleats are in intimate contact over substantially the entire pleat height, thee pleated filter element can be characterized by a maximum pleat height $h_{max}$ which can be given by the formula:

$$h_{max}=D^2-d^2\ 4(d+2t)$$

wherein t is the effective thickness of a fluid treatment layer such as a pleat leg. The fluid treatment layer in some embodiments includes a filter medium, drainage layers, and other layers. In many preferred embodiments, the height of each pleat is greater than $(D-d)/2$ and less than or equal to $(D^2-d^2)/[4(d+2t)]$, more preferably at least about 80% of $(D^2-d^2)/[4(d+2t)]$.

In one preferred configuration, each pleat of the filter pack 20 has first and second legs joined to each other at the peak (the radially outer end) of the pleat and each joined to a leg of an adjoining pleat at the root (the radially inner end) of the pleat. The first leg may be pressed against the second leg of the same pleat and against the second leg of an adjoining pleat over a continuous region extending for a substantial portion of the height of the first leg and over at least about 50%, more preferably at least about 75%, and most preferably about 95–100% of the axial length of the filter pack 20. The substantial portion of the height is preferably at least about 50% of the height of the first leg, more preferably at least about 75% of the height of the first leg, and still more preferably at least about 90% of the height of the first leg.

When the pleats are in a laid-over state, each pleat will typically assume a curved configuration as viewed from a lengthwise end of the filter element 10. To make it easier to form the pleats into a laid-over state, the filter pack 20 may be corrugated in a manner such that the two legs of each pleat are of different lengths from each other. Depending upon the relative lengths of the first and second legs, each leg may be pressed against the adjoining leg of the same pleat and against the adjoining leg of an adjoining pleat over a continuous region extending for a substantial portion, preferably at least about 50%, more preferably at least about 75%, and still more preferably at least about 90% of the height of each leg, and over at least about 50%, more preferably at least about 75%, and most preferably about 95–100% of the axial length of the filter pack 20. Examples of suitable methods of forming a filter pack 20 having pleats in a laid-over state and of forming pleats with legs of unequal length are described in detail in U.S. Pat. No. 5,543,047 by Stoyell et al.

In addition to making efficient use of the space occupied by the filter pack 20 and tending to equalize the resistance to fluid flow over the height of the pleats, forming the pleats into a laid-over state reduces the movement of the pleats when the pressure across the filter pack 20 fluctuates, thereby reducing abrasion of the filter layer 21. Furthermore, when the pleats are in a laid-over state, the lengthwise end faces of the filter pack 20 are extremely compact and provide greater resistance to damage of the filter pack 20 during the installation of end caps.

Various pleating methods and equipment can be used to form a pleated composite having laid-over pleats, such as methods using a rotary pleating machine or a grab and fold pleating machine which forms pleats extending in the transverse direction of a sheet (the pleats being perpendicular to the direction in which the sheet passes through the pleating machine), methods using a longitudinal pleating machine which forms longitudinal pleats in ma sheet (the pleats extending parallel to the direction in which the sheet passes through the pleating machine), or methods which form a sheet of material into pleats around a mandrel and then displace the pleats in the circumferential direction to lay them over.

An example of a grab and fold pleating machine which can be employed is described in U.S. Pat. No. 5,543,047, while an example of a longitudinal pleating machine which can be employed is described in U.S. Pat. No. 4,252,591 by Rosenberg. Me pleating machine described in the latter patent includes a fan-shaped fold-former which forms longitudinal pleats in a filter composite. The fold-former includes a plurality of folds having alternating peaks and depressed portions. A pair of cylindrical rolls draw the filter composite through the fold-former. Flexible chains, because of their weight, facilitate in corrugating the filter composite by conforming the filter composite to the undulating contour of the fold-former surface.

The fold-former and chains may be replaced with upper and lower vaned guides which form corrugations into the filter composite as the composite passes between the guides. The vanes may be alternately disposed in the upper and lower guides and may increase in height along the length of the guides. Some portion of the pleating machine, such as the guides, may be heated to a moderate temperature to soften the filter composite without melting it during pleating and facilitate the deformation of the composite. A gripping mechanism which grabs the ends of the corrugated filter composite may be utilized to pull the material through the vaned guides rather than rollers. An example of an apparatus which can be used to form a sheet of material into pleats around a mandrel and then lay the pleats over is described U.S. Pat. No. 3,386,583.

The pleats of the filter pack 20 may be formed into a laid-over state at various points during the manufacture of the filter element. For example, as described in U.S. Pat. No. 5,543,047, pleats of a pleated composite may be laid over by forming the pleated composite into a cylindrical pack and then passing the filter pack through a funnel-shaped tool of decreasing inner diameter while rotating the filter pack. Alternatively, the pleats of a pleated composite may be laid over before the composite is formed into a cylindrical form, such as by compressing the pleated composite between plates, or by grasping the composite in a hinged rectangular frame and then deforming the frame into the shape of an oblique parallelogram. If the pleated composite comprises polymeric materials and is heated without being melted while being laid over to soften the composite and then cooled while a force is applied to maintain the pleats in a laid-over state, the pleats may have a greater tendency to remain in a laid-over state once the force is removed.

Another way of pressing adjoining legs of pleats in a cylindrical filter pack against each other is to insert wedges between adjoining legs of the pleats at intervals around the filter pack. The wedges compress the pleats in the circumferential direction of the filter pack so as to eliminate spaces between adjoining legs without producing any bending of the pleats in the circumferential direction of the filter packs. Such a filter pack is described, for example, in U.S. Pat. No. 4,154,688 entitled "Collapse-Resistant Corrugated Filter Element".

The filter pack 20 will frequently have at least one lengthwise side seal where adjoining lengthwise edges of the pleated composite of which the filter pack 20 is formed are joined and usually sealed to each other. Depending upon the circumference of the filter pack 20, there may be one or a plurality of side seals. Preferably, the filter pack 20 has not more than one lengthwise side seal.

After the pleats of a filter pack 20 have been formed into a laid-over state, they may have a tendency to try to unfold from this state to create gaps between adjoining pleats. To prevent the pleats from unfolding, the filter element 10 may be equipped with one or more restraining members which restrain the pleats in the radial direction of the filter element. A radial restraint may be achieved by a variety of devices, such as by a cage, tube, or sleeve surrounding the filter pack 20, by rings which slide over the filter pack 20, or by a wrap member which is wrapped closely around the filter pack 20 over at least a portion of its length. The present embodiment employs a restraining member in the form of a wrap member 25 comprising a strip of material wrapped around the filter pack 20 with a plurality of turns with sufficient tension to prevent the pleats from unbending from a laid-over state. Such a wrap member 25 is advantageous as a restraining member because it can be quite thin, lightweight, and economical, and it is easy to install around the filter pack 20. The illustrated wrap member 25 extends over the entire length of the filter pack 20, but it may extend over a shorter length.

The wrap member 25 may be wrapped around the filter pack 20 with or without an overlap between adjoining turns. A wrap member 25 can be wrapped around the filter pack 20 in various manners, such as helically, spirally, or cylindrically. A wrap member 25 may be made of a wide variety of materials which may be either permeable or non-permeable to the fluid being filtered. Some examples of suitable materials are woven or non-woven fabrics, polymeric films, and metal or nonmetal woven meshes.

The wrap member 25 preferably produces as low a pressure drop as possible in fluid flowing through it. The thickness of the wrap member 25 is not restricted and can be selected based on the desired strength and flexibility and space considerations. The wrap member 25 may be secured in place on the filter pack 20 in various ways. For example, the wrap member 25 may be joined to the peaks of the pleats of the filter pack 20 to hold the wrap member 25 in place on the filter pack 20, to help maintain the pleats in a laid-over state, and to reduce shifting of the pleats within the filter pack 20. If there is an overlap between adjoining turns, the turns may be secured to each other in the overlapping portions, with or without being secured to the pleats. It is also possible for the wrap member 25 to be held in place only at its lengthwise ends without being secured to itself or to the pleats between its ends.

Examples of specific methods which can be used to hold the wrap member 25 in place include use of an adhesive, such as a hot melt adhesive, fusion bonding using a hot wheel, disposing mechanical ties or bands around the wrap member 25 at intervals, or mechanically securing the end caps 40 atop the lengthwise ends of the wrap member 25. If the wrap member 25 is made of a material which is pervious to the fluid being filtered, it may completely surround the filter pack 20 without any gaps or openings, while if it is impervious to the fluid, the wrap member 25 may contain openings or gaps through which the fluid in the radial direction of the filter pack 20. The present embodiment employs a wrap member 25 comprising a 38×20×0.011× 0.011 stainless steel woven wire mesh (38 strands per inch×20 strands per inch, with each strand having a diameter of 0.011 inches) which is helically wrapped around the filter pack 20 in a plurality of overlapping turns.

A filter element according to an embodiment of the present invention may include a cage or tube surrounding the filter pack 20, and it is possible for such a cages or tube to function as a retaining member to maintain the pleats in a laid-over state. However, even when the filter clement 10 includes a cage or tube, it may be preferable to employ a wrap member 25 as a retaining member. When, for example, a cage is used as a retaining member, since the filter pack 20 will expand against the inner periphery of the cage, the cage must be manufactured to close tolerances to ensure that the filter pack 20 is under a desired level of compression, whereas when a wrap member 25 is used as a retaining member, the compression of the pleats can be controlled to a desired level by adjusting the tension of the wrap member 25 during wrapping, regardless of variations in the diameter of a cage or other member surrounding the filter pack 20.

When the filter pack 20 is a hollow member, the filter element 10 may include a core 30 disposed at the center of the filter pack 20. A core 30 can serve a variety of functions. It can provide the filter element 10 with resistance against axial, bending, or torsional stresses, and it can prevent the filter pack 20 from collapsing inwardly under radial forces due to a pressure differential between the interior and exterior of the filter element 10 which may occur during filtration. The core 30 can also help the filter pack 20 to maintain a desired shape, and it can further be used as a means for connecting the filter element 10 to other members, such as a tube sheet or fitting within a housing. In some embodiments of the present invention, the core 30 serves primarily to provide support and does not serve to transport fluid, whereas in other embodiments it both provides support and functions as a conduit for fluid flowing in the lengthwise direction of the filter element 10.

The core 30 may have any structure which enables it to perform the desired function of providing support and/or transporting fluid. Frequently, the core 30 will be cylindrical since the filter pack 20 will typically have a cylindrical inner periphery, but other shapes may be employed, such as a shape with a polygonal or oval cross section, and the cross-sectional shape of the core 30 may vary along its length. The core 30 may be formed of any material compatible with the fluid being filtered and having the desired strength, including but not being limited to both metals and plastics. The core 30 will frequently extend for the entire length of the filter pack 20 to provide maximum support to the filter pack, but it is possible for the core 30 to extend for a smaller distance.

In the present embodiment, the core 30 serves solely to provide support, so it is structured such that fluid is prevented from flowing axially through the core 30 between the process fluid chamber 55 and the retentate chamber 57. For example, the entire core 30 may be imperforate and impervious. The illustrated core 30 is hollow to reduce weight, but it may instead be solid. It includes a hollow tube 31, each end of which is sealed by a stopper 33 or other suitable member secured to the end of the tube 31 in a fluid-tight manner to prevent fluid from entering the tube 31. The stoppers 33 may be rounded to produced smoother fluid flow through the lengthwise ends of the filter pack 20.

Because the pleats of the filter pack 20 are formed from a material having a finite thickness, at the radially inner and outer ends of the pleats where the filter composite is folded back upon itself to form the pleats, the pleats are somewhat rounded. As a result, at the radially inner and outer ends of the pleats, small triangular gaps may be formed between the opposing surfaces of adjoining legs of the pleats over the entire length of the filter pack 20. It may be desirable to fill the gaps at the radial inner ends to prevent the process fluid from flowing preferentially along the gaps rather than through the inner drainage layer 22. In the present embodiment, the core 30 has an outer surface which surrounds the hollow tube 31 and fills the gaps between the legs of the pleats at the radially inner ends thereof.

The outer surface can be preformed with triangular ridges which fit into the triangular gaps between the legs of the pleats, or it may be made of a material which is sufficiently soft so as to conform to the shape of the triangular gaps and fill them. In the present embododiment, the outer surface is formed by a layer 32 of a readily deformable resilient material which surrounds the hollow tube 31 and which can deform to fill the gaps at the radially inner ends of the pleats.

The layer 32 can be made of any material which is impervious to the process fluid when surrounded by the filter pack 20. It can be one which is impervious to the process fluid at any time or one which is impervious when compressed against the radially inner ends of the pleats.

Since the layer 32 is impervious to the process fluid, the tube 31 which supports the layer 32 may have perforations or other openings, for example, to reduce its weight, with the layer 32 covering the openings. In the present embodiment, the layer 32 comprises a resilient closed cell foams. The layer 32 may be mounted on the tube 31 in a variety of manners. For example, it may be a cylindrical sleeve which is slid axially over the tube 31, or it may be a strip of material which is wrapped helically, spirally, or cylindrically around the tube 31. It may also be formed directly on the tube 31. Means other than the outer surface of the core 30 can also be used to fill the gaps at the radially inner ends of the pleats. For example, an adhesive can be introduced into the gaps between adjoining pleats and then allowed to set.

Figure 2:
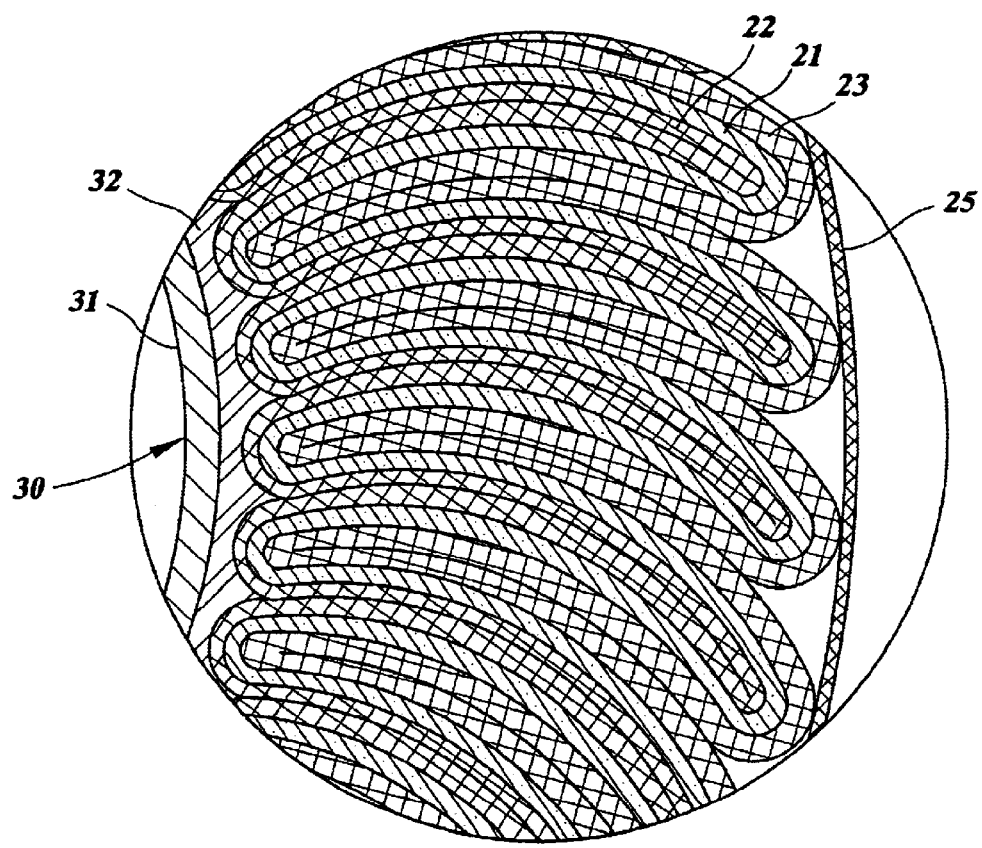
FIG. 2 is a transverse cross-sectional view taken along line 2—2 of FIG. 1.
Figure 3:
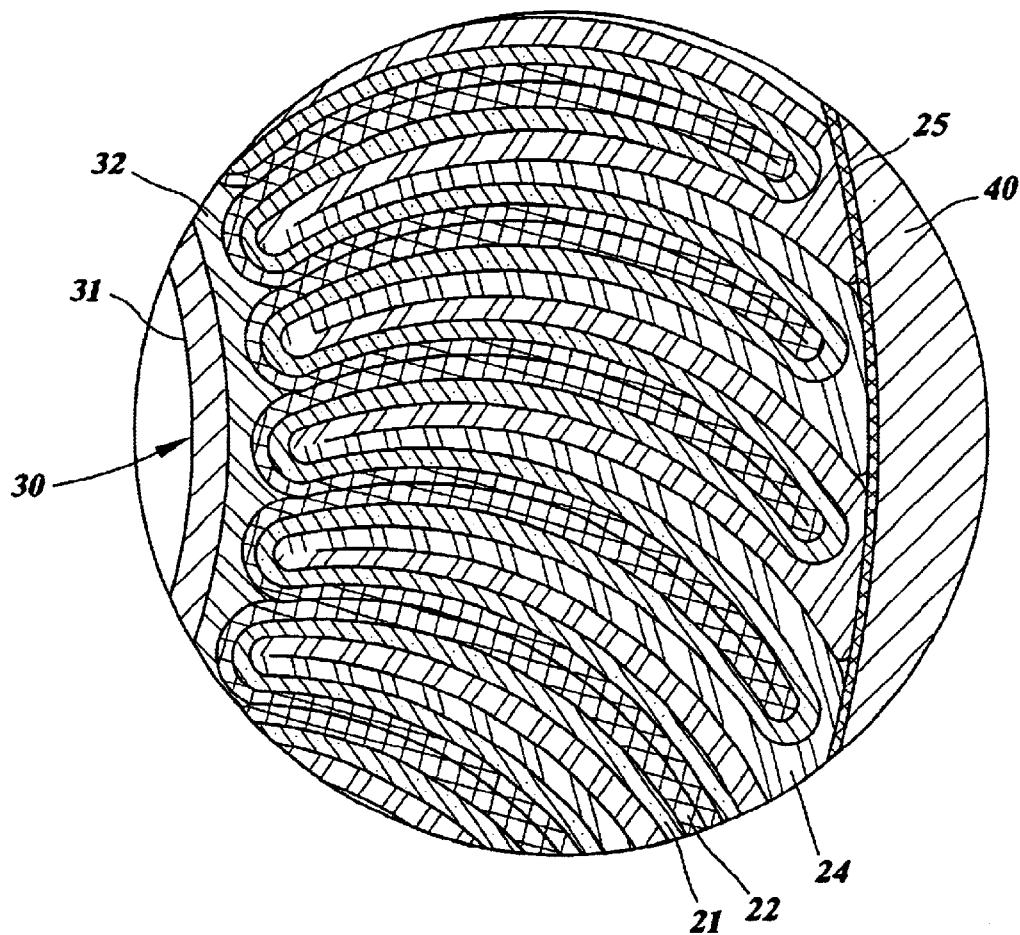
FIG. 3 is a transverse cross-sectional view taken along line 3—3 of FIG. 1.

FIG. 2 is a portion of a transverse cross-sectional view of the filter element 10 taken along line 2—2 of FIG. 1, and FIG. 3 is a portion of a transverse cross-sectional view taken along line 3—3 of FIG. 1. As shown in FIG. 2, in the region of the filter pack 20 between the sealing strips 24, the pleats are in a laid over state in which the outer drainage layer 23 is pressed against itself on its outer surface (the surface facing away from the filter layer 21) over substantially the entire height of each pleat, and the inner drainage layer 22 is pressed against itself on its inner surface (the surface facing away from the filter layer 21) over substantially the entire height of each pleat so that there is substantially no separation between adjoining legs of the pleats except at the radially inner or outer ends of the pleats. The triangular gaps between adjoining legs of the pleats at the radially inner ends thereof are filled by the resilient layer 32 forming the outer surface of the core 30 to prevent process fluid from flowing through the gaps.

At the portion of the filter element 10 illustrated in FIG. 3, the filter pack 20 has a strcture similar to that shown in FIG. 2 but further includes a sealing strip 24 on the radially outer side of the filter layer 21. The sealing strip 24 is extruded into the openings in the outer drainage layer 23 and obscures the latter in this figure, but the outer drainage layer 23 has the same shape as in FIG. 2. The sealing strip 24 both seals off the outer drainage layer 23 and fills in any spaces between the radially outer ends of the pleats and the inner periphery of the upper end cap 40, so process fluid can flow into the upper lengthwise end face of the filter pack 20 only via the inner drainage layer 22. A transverse cross-sectional view taken through the lower lengthwise end of the filter element 10 would appear similar to FIG. 3.

A filter element according to an embodiment of the present invention may include an end cap disposed at one or both lengthwise ends of the filter pack 20. End caps 40 may be used to protect the lengthwise ends, to seal the lengthwise ends against fluid flow, to help maintain the shape of the filter pack 20, or to connect the filter element 10 to another member, such as a tube sheet, a fitting within a housing, or another filter element 10. The end caps 40 can be made of any materials compatible with the fluid being filtered and the materials forming the members to which the end caps 40 are attached, including metals, ceramics, and polymeric materials.

The end caps 40 are not restricted to any particular shape. At least one of the end caps 40 and in many cases both end caps 40 will be an open end cap having an opening through which fluid can pass to enter or exit the filter element 10 through the core 30, through a lengthwise end face of the filter pack 20, or through both. The end caps 40 at opposite ends of the filter element 10 may be the same or different from each other in structure. In the embodiment of FIG. 1, the upper and lower end caps 40 are identical to each other so that either end cap 40 can be engaged with either tube sheet 50, 52. Each end cap 40 has a tubular portion 41 which fits around the outer periphery of one lengthwise end of the filter pack 20 and an annular flange 42 which overlaps a lengthwise end face of the filter pack 20. One or more struts (not shown) may extend between the end cap 40 and the core 30 and/or the stoppers 33 to enhance the structural integrity of the filter element 10. The flange 42 surrounds an opening 42a through which fluid can pass into or out of the end face of the filter pack 20. The flange 42 is not required but strengthens the end cap 40 and it easier to position the end cap 40 with respect to the filter pack 20 in the lengthwise direction of the filter element 10. Each end cap 40 is sealed to a lengthwise end of the filter pack 20 so as to prevent fluid from passing between the inner periphery of the tubular portion 41 of the end cap 40 and the outer periphery of the filter pack 20. A seal can be formed by a variety of methods, such as by adhesive bonding, melt bonding, spin welding, or by compressing a gasket or other sealing member between the end cap 40 and the filter pack 20. In FIG. 1, the tubular portion 41 of each end cap 40 has an inner periphery which is tapered towards the lengthwise end of the filter pack 20. The taper forms a press fit which compresses the radially outer ends of the pleats surrounded by the tubular portion 41 and causes the sealing strip 24 to intimately contact the inner periphery of the tubular portion 41 and to fill any gaps between the pleats and the tubular portion 41 and the end cap 40, thereby forming a fluid-tight seal. The press fit also resists movement of the end cap 40 with respect to the filter element 10 and holds the end cap 40 in place. The press fit may be supplemented by another joining method, such as bonding, to more tightly secure the end cap 40 to the filter pack 20.

The end caps 40 can be detachably connected to the tube sheets in any manner which allows fluid to enter or exit the filter element 10 through the tube sheets while preventing fluid from bypassing the filter element 10. Any known method of attaching a filter element 10 to a tube sheet in a fluid-tight manner can be employed, including piston seals, axial compression seals, and direct bonding of the end caps 40 to the tube sheets, for example. In the embodiment of FIG. 1, each of the end caps 40 is equipped with one or more sealing members 43, such as O-rings, each mounted in a corresponding groove in the end cap 40 and forming a piston seal against the inner periphery of a corresponding opening 51, 53 in one of the tube sheets.

The filter element 10 of FIG. 1 can be used to filter a process fluid either in a crossflow mode or in a dead end mode. In order to perform crossflow filtraton, the fluid ports for all three chambers 55, 56, and 57 are opened so that fluid can enter or exit from each chamber. In this state, a process fluid to be treated (shown by arrow 60) is introduced into the filter element 10 from the process fluid chamber 55 through its upper lengthwise end. The sealing strip 24 at the upper end prevents the process fluid 60 from flowing through the upper lengthwise end face of the filter pack 20 into the outer drainage layer 23 but permits it to flow into the inner drainage layer 22, so the process fluid 60 enters the inner drainage layer 22 and flows within the inner drainage layer 22 in the lengthwise direction of the filter element 10.

As the process fluid 60 flows through the inner drainage layer 22, a portion of the process fluid 60 passes through the filter layer 21, is filtered, and flows into the outer drainage layer 23 as permeate 61. The permeate 61 then flows through the outer drainage layer 23 along a path dictated by fluid pressures (such as primarily radially or radially and axially) to the radially outer ends of the pleats and exits from the filter pack 20 through the wrap member 25 and into the permeate chamber 56. The sealing strip 24 at the lower lengthwise end of the filter pack 20 forms a seal on the radially outer sides of the pleats, so none of the permeate 61 passes through the lower lengthwise end of the filter pack 20. However, the radially inner side of the pleats is not sealed, so the process fluid 60 which does not pass through the filter layer 21 flows through the lower lengthwise end face of the filter pack 20 as retentate 62 into the retentate chamber 57. The permeate 61 and retentate 62 are separately removed from the permeate chamber 56 and retentate chamber 57 and used in a desired manner.

As the process fluid 60 flows in the lengthwise direction of the filter pack 20 through the inner drainage layer 22 along the inner surface of the filter layer 21, it produces a fluid shear force that inhibits a build-up of particles on the inner surface of the filter layer 21 and increases the length of time that the filter element 10 can be used before replacement or cleaning.

If the filter element 10 is to be used for dead end filtration, the fluid ports for chambers 55 and 56 are opened, but the fluid port for chamber 57 is closed. In this state, a process fluid to be treated is introduced into the filter element 10 from the process fluid chamber 55 in the same manner as described above and flows into the inner drainage layer 22. From the inner drainage layer 22, all of the process fluid 60 flows through the filter layer 21, is filtered, and flows into the outer drainage layer 23 as filtrate, which flows from the outer drainage layer 23 through the wrap member 25 and into the permeate chamber 56. Although the radially inner side of the pleats at the lower lengthwise end of the filter pack 20 is not sealed, because the outlet to the retentate chamber 57 is closed off, substantially none of the process fluid 60 flows into the retentate chamber 57.

When desired, the filter element 10 of FIG. 1 can be cleaned to decrease the amount of solids adhering to or embedded in the filter layer 21. One method of cleaning the filter element 10 is referred to as backwashing. In order to perform backwashing, a suitable backwashing fluid is introduced into the permeate chamber 56 and is forced under pressure through the filter layer 21 in the opposite direction from which fluid flows during filtration. Namely, the backwashing fluid flows through the wrap member 25 into the outer drainage layer 23 and then flows trough the filter layer 21 into the inner drainage layer 22. The backwashing fluid can be a liquid, a gas, or a mixture of the two. The backwashing fluid can be forced into the filter element 10 by various means, such as by a pump or by compressed air introduced above the surface of a liquid backwashing fluid disposed in the permeate chamber 56. As the backwashing fluid passes through the filter layer 21, it dislodges particles trapped within the filter layer 21 or adhering to the radially inner side of the filter layer 21.

The backwashing fluid and the dislodged particles then flow in the lengthwise direction of the filter pack 20 through the inner drainage layer 22 to be discharged from the filter element 10 through one or both lengthwise ends of the filter element 10 into the retentate chamber 57 and/or the process fluid chamber 55. The backwashing fluid can be largely prevented from entering a particular chamber by closing off any conduits communicating between the interior of that chamber and the exterior of the housing. Backwashing can greatly decrease the amount of particles present in or on the surface of the filter layer 21, so that the pressure drop across the filter element 10 will be decreased when filtration is resumed.

When a liquid backwashing fluid, such as water, is forced through the filter element 10 by a compressed gas, such as air, the gas may continue to flow through the filter element 10 after all the liquid backwashing fluid has passed through the filter element 10, and there even be some degree of mixing of gas and liquid within the filter element 10. However, for the most part, the gas and liquid pass through the filter element 10 separately.

The efficacy of backwashing may be increased by producing greater mixing of gas and liquid within the filter element 10 during backwashing, such as by passing a mixture of gas and liquid through the filter element 10 throughout backwashing. It is believed that the presence of gas within a backwashing fluid enhances the ability of the backwashing fluid to loosen particles embedded in or adhering to the filter layer. A mixture of gas and liquid can be made to pass through the filter element 10 by, for example, introducing compressed gas into the permeate chamber 56 below the surface of a backwashing liquid disposed in the chamber 56 so that the gas will agitate and be mixed with the liquid. Alternatively, gas and liquid can be mixed with each other outside the permeate chamber 56 before being introduced into the chamber 56 by a pump.

Another method of cleaning a filter element which can be employed in the present invention will be referred to as crossflow cleaning. In this method, a cleaning fluid is passed through the filter element so as to flow along the surface of the filter layer, i.e., so as to produce crossflow along the filter layer rather than passing through the filter layer as in backwashing. The crossflow of the cleaning fluid detaches particles adhering to the filter layer and discharge the particles from the filter element.

A variety of fluids can be used as the cleaning fluid for crossflow cleaning. For example, the cleaning fluid can be a liquid, a gas, or a mixture of a gas and a liquid. Particularly good results can be obtained when a gas is used in conjunction with a liquid, either by passing gas and liquid sequentially through the filter element, or by passing a mixture of gas and liquid through the filter element.

Any liquids or gases which are compatible with the filter element and the environment in which cleaning takes place can be employed as the cleaning fluid. In many cases, water can be used as the liquid and air can be used as the gas, but many other fluids can be employed. For example, when particularly tenacious particles need to be removed from the filter layer, a liquid solvent may be suitable as the liquid, and when the filter layer should not be exposed to oxygen in the air, a non-reactive gas, such as nitrogen, may be employed as the gas.

The effectiveness of crossflow cleaning may be increased by maintaining a fluid pressure on the side of the filter layer opposite the side being cleaned which is equal to or greater than the fluid pressure on the side being cleaned. This pressure can prevent particles from being forced into the filter layer by the pressure of the cleaning fluid, and if the pressure on the opposite side is greater than on the side being cleaned, the pressure can force particles out of the filter layer and into the cleaning fluid. When the crossflow cleaning fluid includes a gas, the gas is preferably passed through the filter element at a rate of at least about 0.04 scfm, more preferably at least about 0.08 scfm, and still more preferably at least about 0.12 scfm per square foot of area of the surface of the filter layer along which the gas flows.

The effectiveness of the cleaning fluid can be enhanced by increasing the turbulence of the cleaning fluid in the proximity of the filter layer. Turbulence can be increased by the choice of drainage layer. For example, a diamond mesh having strands extending diagonally to the longitudinal axis of the filter element can generally produce more turbulence than a mesh such as DELNET having parallel strands extending in the lengthwise direction of the filter element. In a pleated filter element, turbulence can also be increased by packing the pleats close together with no large gaps between opposing surfaces of the pleats so that the cleaning fluid will flow inside a drainage layer adjoining the surface of the filter layer to be cleaned instead of bypassing the draining layer and flowing through the gaps between pleats. However, crossflow cleaning is also effective in filter elements with spaced apart pleats, and it can also be used with non-pleated filter elements, such as spiral wound filter elements.

The gas and liquid used as cleaning fluids in crossflow cleaning can be passed through the filter element 10 in the same or opposite directions from each other, if they are introduced sequentially, and the direction of flow of the cleaning fluid can be the same or different from the direction in which process fluid flows during filtration. The liquid in the cleaning fluid can be passed through the filter element 10 by various means, such as by a pump, which may be the same as or different from a pump used to pass process fluid through the filter element 10 during filtration, or it may be forced through the filter element 10 by compressed air or other compressed gas introduced into a chamber containing the liquid. For example, the process fluid chamber 55 can be partially or completely filled with a liquid cleaning fluid, and a compressed gas can be introduced into the upper portion of the process fluid chamber 55 above the surface of the liquid. The gas in the cleaning fluid can be supplied to the filter element 10 by a compressor, from a compressed gas tank or bottle, or from other supply of compressed gas.

Crossflow cleaning can be used with any type of filter layer, but it is particularly useful with filter layers containing a filter medium which is delicate or which has a low permeability, such as submicron or ultrafiltration membranes. Because of the low strength of the former and the high resistance to liquid and gas flow of the latter, it is difficult to produce sufficient velocity of a backwashing fluid through such a filter medium for backwashing to be effective. In contrast, since crossflow cleaning does not require flow of fluid through the filter layer, it can clean both delicate and low permeability filter media far more effectively than can backwashing. Even with filter media which are capable of being backwashed, crossflow cleaning employing a gas in conjunction with a liquid has been found to be more effective than conventional backwashing, particularly for the removal of tenacious particles, such as are deposited on a filter layer during filtration of municipal waste water and surface water.

Crossflow cleaning is far more effective and/or advantageous in removing particles from the filter element than backwash cleaning. Thus, compared to a filter element subjected to cleaning by conventional backwashing, the filter element subjected to crossflow cleaning shows much reduced terminal pressure drop. Accordingly, the filter element can be operated over a greater number of filtration/crossflow cleaning cycles than by the conventional backwash cleaning.

An example of crossflow cleaning of the filter element 10 of FIG. 1 in which a liquid and a gas are simultaneously passed through the filter element is as follows. With the fluid port for the permeate chamber 56 closed and the fluid port for the retentate chamber 57 open, a pump which is normally used to supply process fluid to the process fluid chamber during filtration is connected to a supply of cleaning water and is turned on to introduce cleaning water under pressure to the process fluid chamber 55. At the same time, compressed air is introduced into the process fluid chamber 55 from a compressed air supply through a fluid port different from the one connected to the pump for cleaning water. In the process fluid chamber 55, the water and compressed air are mixed with each other and together flow into the filter element 10 and through the inner drainage layer and along the filter layer of the filter pack 20 over the entire length of the filter element 10 to be discharged into the retentate chamber 57. After the water and air have passed through the filter element 10 for a length of time, the supply of water and air is turned off. Passage of water and air through the filter element 10 can be repeated one or more times, depending upon the state of loading of the filter element 10.

As the cleaning fluids are being passed through the filter element 10, the permeate chamber 56, which may contain liquid and/or gas, is preferably maintained at a pressure equal to or greater than that within the inner drainage layer of the filter element 10 so that the cleaning fluids will not be forced through the filter layer into the permeate chamber 56. After the completion of cleaning, the fluid port leading to the supply of compressed air is closed, the pump is connected to the supply of process fluid, and filtration can be resumed.

Crossflow cleaning in which air and water are passed through the filter element 10 sequentially can be performed in a manner similar to that described above except that the introduction of water into the process fluid chamber 55 is terminated during at least a portion of the time that compressed air is being introduced into the process fluid chamber 55 and vice versa, although there may be a timewise overlap of the two fluids passing through the filter element 10. Compressed air is quite effective in loosening particles from the filter layer, but because of its lower density, it is less effective than water in removing the loosened particles from the filter element 10. Therefore, at least the first time that compressed air alone is passed through the filter element 10 is preferably followed by water being passed through the filter element to rinse particles from the filter element.

Figure 4:
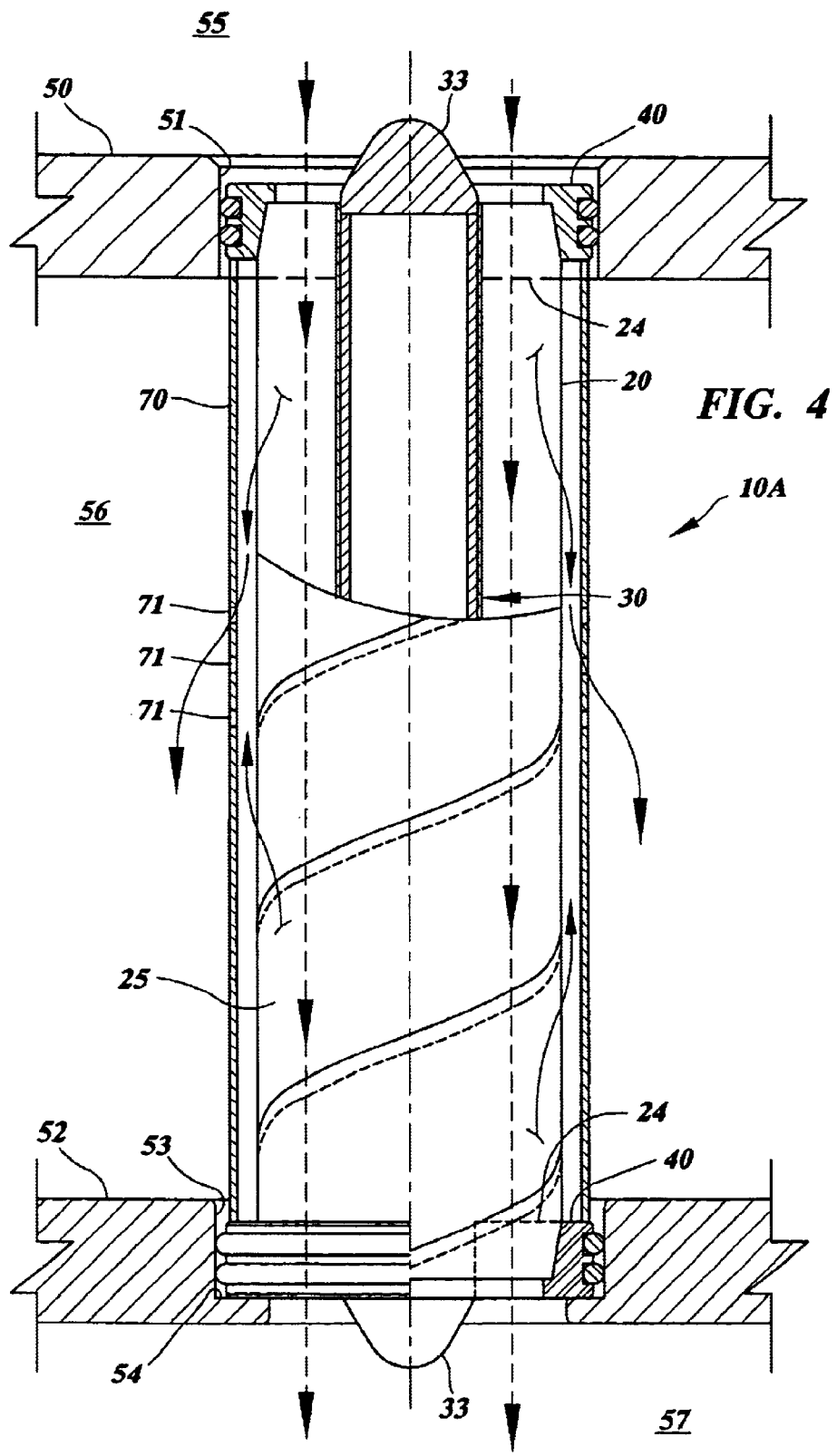
FIG. 4 is a cut-away elevation of another embodiment of a filter element according to the present invention equipped with a tube for increasing the effectiveness of backwashing.

FIG. 4 is a partially cross-sectional cutaway elevation of a filter element 10A according to an embodiment of the present invention. This embodiment is similar to the embodiment of FIG. 1, and similar components are indicated by the same reference numerals as in FIG. 1. This embodiment further includes a perforated tube 70 which surrounds the filter pack 20. The tube 70 has a solid imperforate, impermeable wall over much of its length but has perforations 71 or other openings through which backwashing fluid can flow formed in a region remote from one or more of the chambers 55, 57 into which the backwashing fluid is to be discharged from the filter element 10A.

The tube 70 prevents fluid from flowing between the filter pack 20 and the permeate chamber 56 except by flowing through the perforations 71. When the embodiment of FIG. 1 is backwashed, the backwashing fluid tends to flow preferentially into the filter element 10 near one or both lengthwise ends of the filter element 10 in the vicinity of one of the chambers 55, 57 into which the backwashing fluid is discharged from the filter element 10 because the resistance to flow will be lower in those regions. As a result, backwashing will have a greater effect near the lengthwise ends than in the regions between the ends. However, in the present embodiment, the backwashing fluid flows into the interior of the tube 70 through perforations 71 spaced from the chamber or chambers into which the backwashing fluid is discharged from the filter element 10A, so the resistance to flow of backwashing fluid through the filter element 10A is made more uniform over its length and the effect of backwashing can be more uniform.

When backwashing fluid is discharged from the filter element 10A into both the process fluid chamber 55 and the retentate chamber 57, the perforations 71 are preferably located roughly midway between the two lengthwise ends of the filter element 10A. When backwashing fluid is discharged from the filter element 10A into only one of the two chambers 55 and 57, a better backwashing effect may be obtained by forming the perforations 71 as far as possible from the chamber into which the backwashing fluid is discharged, such as at the other lengthwise end of the filter element 10A adjoining the other chamber.

It may be desirable to secure the tube 70 to the end caps 40 to increase the strength of the filter element 10A. The tube 70 may but need not be sealed to the end caps 40. Preferably the tube 70 engages the end caps 40 sufficiently tightly that substantially all fluid flow between the permeate chamber 56 and the interior of the tube 70 will be via the perforations 71 in the tube 70 rather than via the interface between the end caps 40 and the tube 70.

The tube 70 may be employed as a retaining member for retaining the pleats in a laid-over state, but as described above, it is preferable to employ a separate retaining member, such as a wrap member 25, which can better control the degree of compression of the pleats than can the tube 70. The tube 70 may contact the outer periphery of the wrap member 25, or it may be separated from the wrap member 25 by a small radial gap to facilitate the insertion of the filter pack 20 and the wrap member 25 into the tube 70.

However, any gap is preferably sufficiently small that backwashing fluid introduced into the tube 70 from the permeate chamber 56 will flow in the lengthwise direction of the filter pack 20 through the outer drainage layer rather than flowing through the gap in the lengthwise direction. Thus, the resistance to fluid flow between the perforations 71 and either of the chambers 55 and 57 is preferably lower along a flow path passing through the outer drainage layer than along a flow path passing along the gap. For example, a gap may measure 0.01 inches or smaller in the radial direction. The size of the gap can be selected based on factors such as the resistance of the outer drainage layer of the filter pack 20 to flow in the lengthwise direction relative to the resistance to flow along the gap. In order to prevent the perforations from acting as a flow restriction during dead end filtration, the total area of the perforations 71 is preferably at least as large as the cross-sectional area of the portions of the upper end face of the filter pack 20 through which process fluid can flow into the filter pack 20 from the process fluid chamber 55 (which does not include the cross-sectional area sealed off by the sealing strip 24 at the upper end of the filter pack 20).

Figure 5:
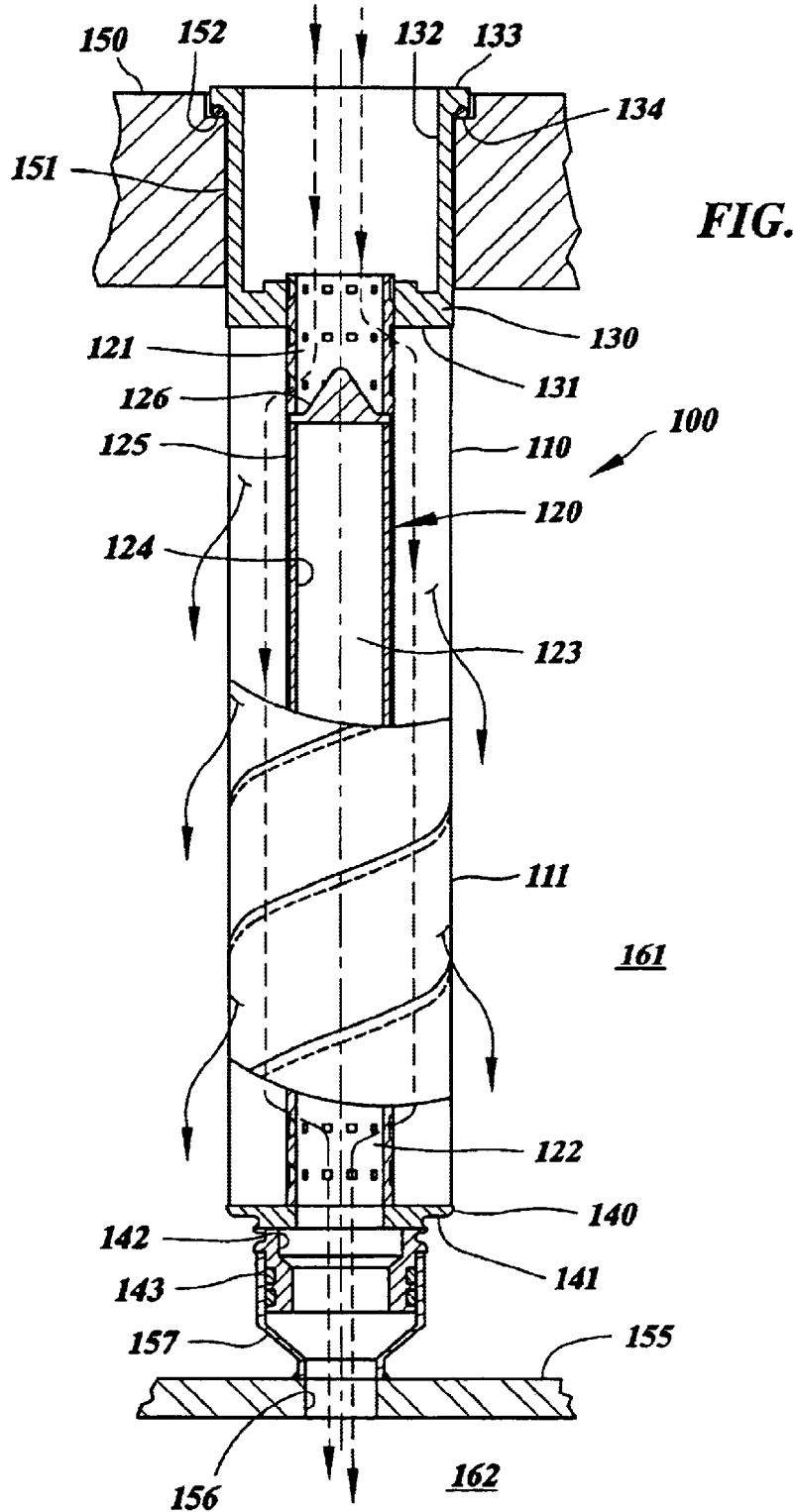
FIG. 5 is a cross-sectional elevation of another embodiment of a filter element according to the present invention having different end caps from the embodiment of FIG. 1.

FIG. 5 illustrates a filter element 100 according to another embodiment of the present invention in which process fluid enters the filter element 100 and retentate leaves the filter element 100 through a hollow center of the filter element 100 rather than through the lengthwise end faces of a filter pack 110.

Like the preceding embodiments, this embodiment includes a pleated filter pack 110, a core 120 surrounded by the filter pack 110, a wrap member 111 wrapped around the filter pack 110, and an end cap 130, 140 disposed at each end of the filter element 100. The filter element 100 is shown disposed in a housing having first and second tube sheets 150 and 155 which divide the interior of the housing into a process fluid chamber 160, a permeate chamber 161, and a retentate chamber 162. Each of the chambers is equipped with an unillustrated fluid port providing fluid communication between the interior of the chamber and the exterior of the housing. Only a single filter element 100 is shown, but a plurality of filter elements 100 may be installed in the housing in a similar manner.

The filter pack 110 may be similar in structure to that of the embodiment of FIG. 1. For example, it may comprise a three-layer composite of a filter layer, an outer drainage layer disposed on the radially outer side of the filter layer, and an inner drainage layer disposed on the radially inner side of the filter layer. The composite can be formed into axially extending pleats in a laid-over state in any of the ways described with respect to FIG. 1. The pleats are maintained in the laid-over state by the wrap member 111. Preferably, the only difference from the filter pack 10 of the embodiment of FIG. 1 is that the sealing strips have been omitted from filter pack 110.

The core 120 can have any structure which enables process fluid to pass through its upper end into the filter pack 110 and which enables retentate to flow from the lower end of the filter pack 110 into the core 120 and then be discharged from the filter element 100 at its lower end. The illustrated core 120 is open at each lengthwise end and includes an upper perforated section 121 at its upper lengthwise end, a lower perforated section 122 at its lower lengthwise end, and a blind imperforate, impermeable section 123 through which fluid cannot pass extending between the two perforated sections. Each of the perforated sections 121, 122 has a tubular wall formed with perforations or other openings through which fluid can pass between the interior of the core 120 and the filter pack 110, while the blind section 123 has a peripheral wall through which fluid cannot pass.

The blind section 123 may be similar in structure to the core 120 of FIG. 1 and include a hollow tube 124 and a resilient layer 125 which surrounds the tube 124 to fill in the triangular gaps between adjoining legs of the pleats along the inner periphery of the filter pack 110. Each end of the hollow tube 124 is sealed by a cap 126, for example, which in the present embodiment is conical in shape to produce smoother flow of fluid through the perforations into or out of the core 120, but the ends of the blind section 123 of the core 120 may be sealed in any other suitable manner. The blind section 123 preferably extends continuously over at least about 50% of the length, more preferably over at least about 75% of the length, and still more preferably over at least about 90% of the length of the filter pack 110.

The lengthwise end faces of the filter pack 110 are sealed such that fluid will enter or exit the filter element 100 via the core 120 rather than through the lengthwise end faces. The end faces may be sealed in any suitable manner. For example, they may be sealed by sealing strips, such as those used in the preceding embodiment, disposed on both the radially inner and outer sides of the filter layer at each lengthwise end of the filter pack 110. In the illustrated embodiment, each of the end faces is sealed to the corresponding end cap without the use of sealing strips, which simplifies the process of pleating the filter element 100.

Seals between the end caps 130, 140 and the filter pack 110 can be formed by a variety of methods, such as those conventionally used for joining end caps to filter packs, depending upon the materials of which the end caps and the filter pack 110 are made, such as adhesive bonding, melt bonding, spin welding, or a mechanical sealing method. In the present embodiment, each of the end caps 130, 140 is melt bonded to an opposing end face of the filter pack 110.

The end caps 130, 140 may be secured to the core 120 to increase the strength of the filter element 100, or they may be movable with respect to the core 120. It is not necessary for the end caps to be sealed to the core 120.

The shape of the end caps 130, 140 may be selected based on the manner in which they are to be connected to the tube sheets or other member. In this embodiment, the upper end cap 130 is a ferrul-type end cap including an annular plate 131 which is sealed by melt bonding to the upper end face of the filter pack 110, a tubular portion 132 which extends upward from the annular plate 131, and a flange 133 which extends radially outward from the upper end of the tubular portion 132.

A sealing member 134 which surrounds the tubular portion 132, such as an O-ring or a gasket, is axially compressed between the lower surface of the flange 133 and the upper surface of a ledge 52 formed in an opening 151 in the upper tube sheet 150 If necessary, a hold down plate, a clamp, or other suitable member can be provided to press on the flange 133 so as to maintain the sealing member 134 in compression.

The lower end cap 140 comprises an annular plate 141 which is sealed by melt bonding to the lower end face of the filter pack 110 and a tubular portion 142 which extends downwards from the annular plate 141. The tubular portion 142 is equipped with one or more sealing members 143, such as O-rings, which are mounted on its exterior and which form a piston seal against the inner periphery of a hollow tube sheet adapter 157 of conventional design which extends upward from the lower tube sheet 155 in communication with an opening 156 in the lower tube sheet 155. The end caps 130, 140 may be connected to the tube sheets in many other manners. For example, each of the end caps may be connected to the corresponding tube sheet by a piston seal, as in the embodiment of FIG. 1, or both of the end caps may be sealed to the tube sheet by a compression seal.

FIG. 5 shows two of many possible structures for the end caps, and end caps of any other desired type and shape may instead be used.

At the upper lengthwise end of the filter pack 110 surrounding the perforations in the upper perforated section 121 of the core 120, process fluid will initially flow through the inner drainage layer substantially in the radial direction of the pleats as it exits from the perforations and then will change direction to flow in the axial direction of the pleats, i.e., in the lengthwise direction of the filter element 100. At the lower lengthwise end of the filter pack 110 surrounding the perforations in the lower perforated section 122 of the core 120, retentate win initially flow through the inner drainage layer substantially in the axial direction of the pleats and then will change direction to flow in the radial direction of the pleats into the perforations. Therefore, at the upper and lower lengthwise ends of the filter pack 110, the inner drainage layer is preferably selected to provide as little resistance as possible to a change in flow direction. For example, a diamond mesh which has substantially equal resistance to flow in the axial and radial directions may be suitable in these regions.

In the region of the filter pack 110 surrounding the blind section 123 of the core 120, the flow of process fluid is substantially in the lengthwise direction of the filter element 100, so in this region, it may be advantageous to employ a material for the inner drainage layer having less resistance to flow in the axial direction than in the radial direction, such as DELNET mesh with parallel strands extending in the lengthwise direction of the filter element 100.

Different types of materials forming the inner drainage layer, such as different types of mesh, can be pleated into the composite with or without overlap between the different types m the lengthwise direction of the filter element 100. In the outer drainage layer, the direction of fluid flow is substantially the same over the length of the filter pack 110, so a single type of drainage material can be used over the entire length.

The embodiment of FIG. 5 can be operated in substantially the same manner as the embodiment of FIG. 1 during both filtration and cleaning, and there is substantially no difference in the effectiveness of the two filter elements 10 and 100. Thus, like the filter element 10 of FIG. 1, the filter element 100 of FIG. 5 can perform filtration in a crossflow mode or in a dead end mode, and it can be cleaned by backwashing or by crossflow. However, since the embodiment of FIG. 5 does not employ sealing strips, the process of corrugating the filter pack 110 and attaching it to the end caps may be somewhat easier.

In the present embodiment, the wrap member 111 is the outermost portion of the filter element 100. Like the embodiment of FIG. 4, the filter element 100 may further include a tube surrounding the filter pack 110 between the end caps to fluid from flowing between the filter pack 110 and the permeate chamber 161 except in a certain region (such as through perforations near the lengthwise center of the tube) so as to increase the uniformity of backwashing.

In the previous embodiments, a process fluid flows in the lengthwise direction of a filter element within an inner drainage layer disposed on the radially inner side of a filter layer. FIG, 6 illustrates an embodiment of a filter element 200 in which process fluid flows in the lengthwise direction of the filter element 200 within an outer drainage layer disposed on the radially outer side of a filter layer.

The filter element 200 is shown installed in a housing identical to that of the embodiment of FIG. 1 and including upper and lower tube sheets 250 and 252 which divide the interior of the housing into a process fluid chamber 255, a retentate chamber 256, and a permeate chamber 257. Each of the chambers is equipped with an unillustrated fluid port providing fluid communication between the interior of the chamber and the exterior of the housing. Only a single filter element 200 is shown, but a plurality of the filter elements 200 may be installed in the housing in a similar manner. Like the preceding embodiments, the filter element 200 includes a hollow pleated filter pack 210, a core 220 surrounded by the filter pack 210, a wrap member 215 for maintaining the pleats of the filter pack 210 in a laid-over state, an end cap 230, 235 disposed at each lengthwise end of the filter pack 210, and a tube 240 extending between the end caps and surrounding the filter pack 210.

The filter pack 210 may have any of the structures described with respect to the preceding embodiments. In the illustrated embodiment, it comprises a three-layer composite of a filter layer 211, an inner drainage layer 212, and an outer drainage layer 213. The composite is formed into axially extending pleats which are maintained in a laid-over state by an unillustrated helical wrap member like that illustrated in FIG. 1.

The process fluid is introduced into the filter element 200 through its upper lengthwise end face. In order to prevent the process fluid from flowing along the radially inner sides of the pleats, the spaces between adjoining legs of pleats on the radially inner sides thereof are sealed against the entry of fluid. Sealing may be performed in any of the ways described with respect to the previous embodiments. In the illustrated embodiment, a sealing strip 214 similar to the sealing strip of the embodiment in FIG. 1 is pleated into the composite on the radially inner side of each pleat at the upper lengthwise end of the filter element 200, whereas no sealing strip is present on the radially outer side so that the process fluid can flow into the outer drainage layer 213. The upper end cap 230 has a structure similar to that of the end caps 40 of the embodiment of FIG. 1 and can be attached to the filter pack 210 in the same manner.

The core 220 may be either a blind core as in the embodiment of FIG. 1 or an open one through which fluid can flow in the lengthwise direction of the filter element. In the present embodiment, the core 220 is perforated over its entire length so that permeate can pass through its wall and then flow along its interior. The upper lengthwise end of the core 220 is closed off by a stopper 221, for example, or other suitable means to prevent process fluid from entering it, while the lower lengthwise end is open to allow permeate to flow out of the core 220 into the permeate chamber 257.

The filter pack 210 is preferably surrounded by a member which forces the process fluid to flow over a considerable length of the filter element 200 before being discharged into the retentate chamber 256. In the present embodiment, this function is performed by a tube 240 which surrounds the filter pack 210 and which is imperforate and impervious over much of its length but has perforations 241 or other openings communicating with the retentate chamber 256 located as close as possible to the lower tube sheet 252 so that the process fluid must flow over substantially the entire length of the filter pack 210 before passing through the perforations 241 into the retentate chamber 256. Instead of having perforations 241, the tube 240 may terminate short of the lower tube sheet 252 and the retentate may flow into the retentate chamber 256 through the space between the lower end of the tube 240 and the lower tube sheet 252.

Members other than a tube 240 can be used to prevent the process fluid from flowing into the retentate chamber 256, such as a sleeve or wrap member which is disposed around the filter pack 210 and which is impervious to the process fluid and which has openings or gaps near its lower end through which retentate can flow into the retentate chamber 256. For example, the wrap member which maintains the pleats of the filter pack 210 m a laid-over state may be made of a material which prevents passage of fluid through it over most of the length of the filter pack 210. Fluid preferably flows through the outer drainage layer 213 in the lengthwise direction of the filter element 200 for at least about 50%, more preferably at least about 75%, and more preferably at least about 90% of the length of the filter pack 210 before being discharged into the retentate chamber 256.

The tube 240 may contact the filter pack 210 or the wrap member 215, if present or there may be a radial gap between them. As in the case of the embodiment of FIG. 4, any radial gap is preferably sufficiently small that process fluid flowing in the lengthwise direction of the filter element 200 will flow through the outer drainage layer 213 of the filter pack 210 rather than through the gap. Thus, the resistance to fluid flow between the perforations 241 and the process fluid chamber 255 is preferably lower along a flow path passing through the outer drainage layer 213 than along a flow path passing along a gap between the outer periphery of the filter pack 210 and the inner periphery of the tube 240.

The lower lengthwise end face of the filter pack 210 is preferably sealed to prevent flow of fluid through it into the permeate chamber 257. The end face can be sealed in any of the manners described with respect to the preceding embodiments, such as by sealing strips, adhesives, or an end cap. In the present embodiment, the lower end cap 235 is melt-sealed to the lower lengthwise end face. The lower end cap 235 has a central bore which surrounds the lower end of the core 220. The lower end cap 235 may be secured to the core 220 to increase the strength of the filter element 200, but it need not be sealed to the core 220.

Each end cap 230, 235 is connected to a corresponding one of the tube sheets 250, 252 in a fluid-tight manner. In the present embodiment, each end cap has one or more sealing members such as O-rings mounted thereon for forming a piston seal against the inner periphery of an opening 251, 253 in the corresponding tube sheet 250, 252, but they may be connected to the tube sheets in any other suitable manner, such as that illustrated in FIG. 5.

Figure 6:
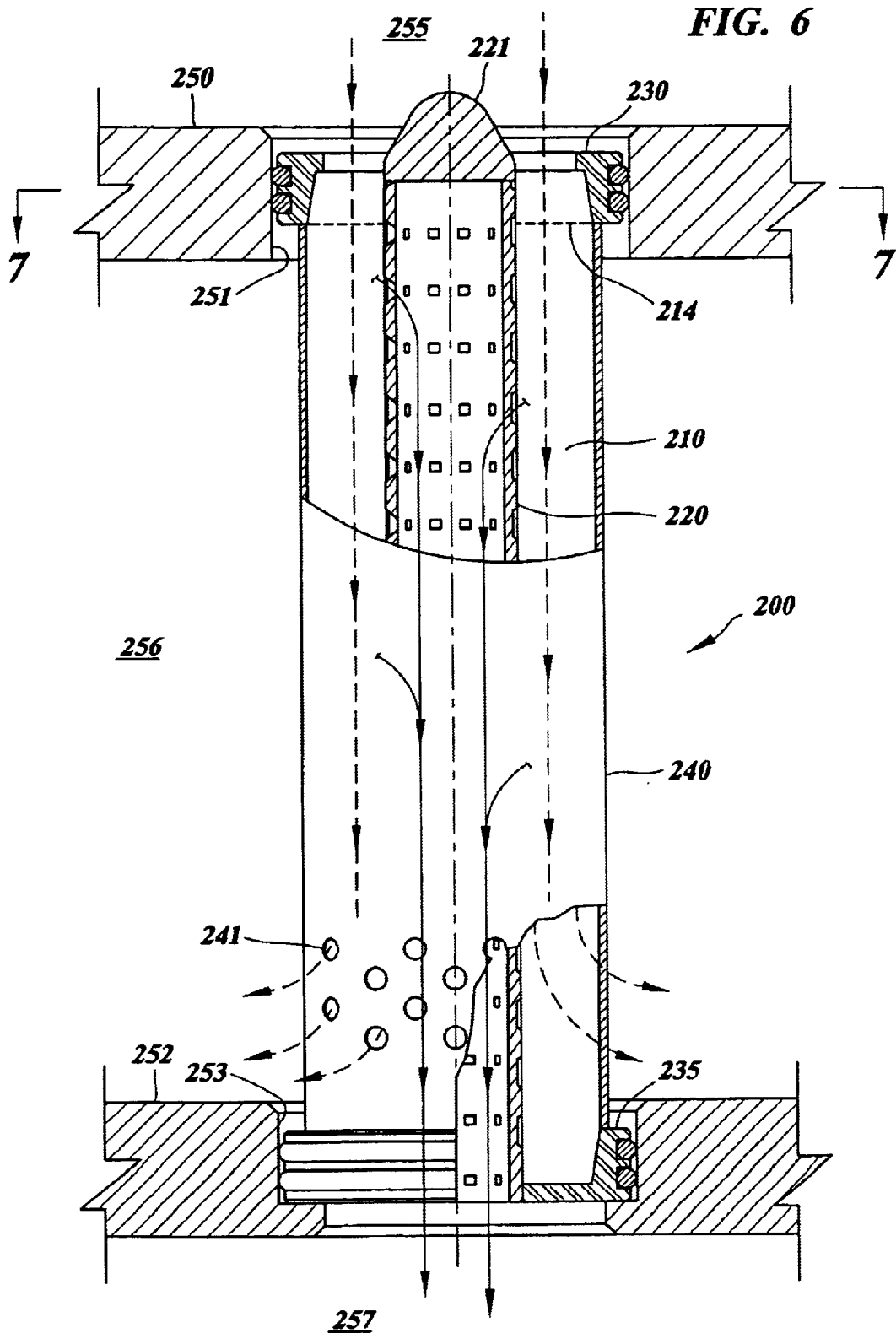
FIG. 6 is a cut-away elevation of another embodiment of a filter element according to the present invention in which process fluid flows along the radially inner sides of a filter layer.
Figure 7:
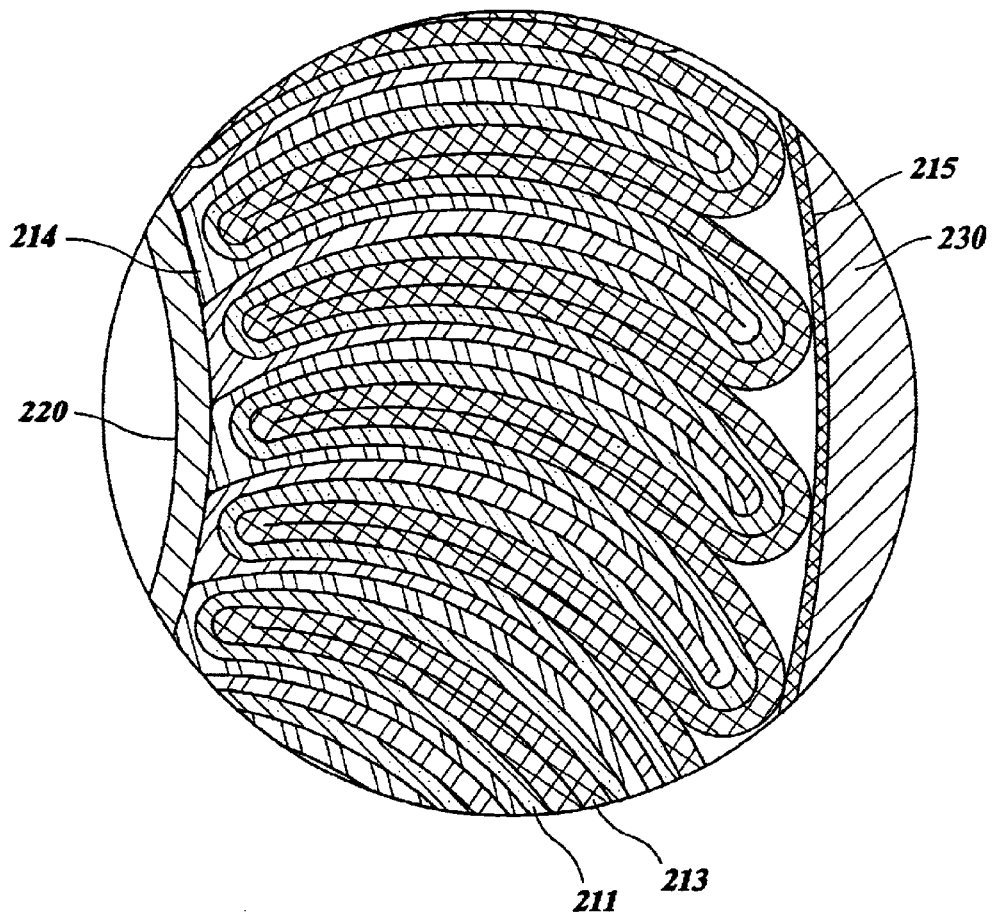
FIG. 7 is a transverse cross-sectional view taken along line 7—7 of FIG. 6.

FIG. 7 is a transverse cross-sectional view of the filter element 200 taken along line 7—7 of FIG. 6. The filter pack 2 10 has a structure similar to that shown in FIG. 2 except that a sealing strip 214 is disposed next to the radially inner surface of the inner drainage layer 212, i.e., on the side of the inner drainage layer 212 facing away from the filter layer 211. The inner drainage layer 212 has the same structure as shown in FIG. 2 but is hidden from view in this Figure by the sealing strip 214, which is extruded into the openings in the inner drainage layer 212. In the portion of the filter element 200 spaced from the sealing strip 214, a transverse cross-sectional view of the filter pack 210 would appear the same as shown in FIG. 2.

The filter element 200 of FIG. 6 can perform filtration of a process fluid in either a crossflow mode or a dead end mode. When the filter element 200 is employed for crossflow filtration, the fluid ports for all three chambers 255, 256, and 257 are opened. Process fluid is then introduced into the filter element 200 from the process fluid chamber 255 through the upper length wise end face of the filter pack 210. The inner drainage layer 212 is sealed off by the sealing strip 214, but the outer drainage layer 213 is not, so the process fluid flows into the outer drainage layer 213 and flows within the outer drainage layer 213 in the lengthwise direction of the filter element 200. The flow of process fluid within the outer drainage layer 213 along the radially outer surface of the filter layer 211 generates a fluid shear force that inhibits a build-up of particles on the radially inner surface of the filter layer 211. At the same time, a portion of the process fluid flows through the filter layer 211 into the inner drainage layer 212 to become permeate. The process fluid which does not pass through the filter layer 211 is discharged from the filter element 200 through the perforations 241 at the lower end of the tube 240 into the retentate chamber 256.

The permeate flows inside the inner drainage layer 212 towards the core 220 and then flows through the perforations in the core 220 into its center. The permeate then flows along the interior of the core 220 in the lengthwise direction of the core 220 and is discharged from the filter element 200 into the permeate chamber 257 through the open lower end of the core 220. Alternatively or additionally the lower end cap, like the upper end cap may be open and the outer drainage layer may be sealed, e.g., with a sealing strip, at the lower end of the filter pack. Permeate may then flow into the permeate chamber from the lower end of the inner drainage layer.

When the filter element 200 is to perform filtration in a dead end mode, the fluid ports for chambers 255 and 257 are opened, while the fluid port for the retentate chamber 256 is closed. In this state, a process fluid to be filtered is introduced into the outer drainage layer 213 of the filter element 200 from the process fluid chamber 255 in the same manner as for crossflow filtration. Since the fluid port for the retentate chamber 257 is closed, all of the process fluid in the outer drainage layer 213 flows through the filter layer 211 into the inner drainage layer 212 to become filtrate, and from the inner drainage layer 212, the filtrate flows into the core 220 and then exits through the lower end of the core 220 into the permeate chamber 257.

The filter element 200 can be cleaned either by backwashing or by crossflow cleaning. In order to perform backwashing, one or more suitable backwashing fluid, such as any one described with respect to FIG. 1, is introduced into the permeate chamber 257 and is forced under pressure into the lower end of the core 220. The backwashing fluid then flows radially outward through the core 220 into the filter pack 210 and passes in succession through the inner drainage layer 212 and the filter layer 211 into the outer drainage layer 213, carrying with it particles dislodged from the filter layer 211.

The backwashing fluid and dislodged particles then flow in the lengthwise direction of the filter pack 210 through the outer drainage layer 213 to the lower end of the filter element 200 and through the perforations 241 in the tube 240 into the retentate chamber 256, and they also flow to the upper end of the filter element 200 and through the upper end into the process fluid chamber 255. The backwashing fluid and dislodged particles can be prevented from flowing into one of the process fluid chamber 255 and the retentate chamber 256 by closing the fluid port for the chamber which it is desired to prevent from receiving the backwashing fluid. During backwashing, the backwashing fluid exerts a radially outer force on the filter pack 210. This force can be resisted by the tube 240 and/or by the wrap member to prevent the filter pack 210 from being damaged.

In order to clean the filter element 200 by crossflow, with the fluid ports for the process fluid chamber 255 and the retentate chamber 256 open, one or more suitable crossflow cleaning fluid, such as water and air in sequence, a mixture of water and air, or any others described with respect to the embodiment of FIG. 1, is passed through the outer drainage layer 213 of the filter pack 210 one or more times from the process fluid chamber 255 to the retentate chamber 256 or in the opposite direction to detach particles from the filter layer 211 and discharge them from the filter element 200 together with the cleaning fluid. The cleaning fluid and the particles can then be drained from the housing. As the cleaning fluid is being passed through the filter element 200, the permeate chamber 257 and the interior of the core 220 are preferably maintained at a pressure equal to or higher than that within the outer drainage layer 213 of the filter pack 210 to prevent the cleaning fluid from being forced through the filter layer 211 and possibly to force particles to the surface of the filter layer 213 where they can be more easily removed by the cleaning fluid.

A filter element in which the process fluid flows along the radially outer side of a filter layer and permeate or filtrate flows into a hollow center of the filter element such as in this embodiment and a filter element in which process fluid flows along the radially inner side of a filter layer, as in the embodiments of FIGS. 1–5, are substantially equally effective in filtration. However, it maybe easier to backwash a filter element in which backwashing fluid is introduced into the hollow center of the filter element and force radially outwards, as in the present embodiment.

Figure 8:
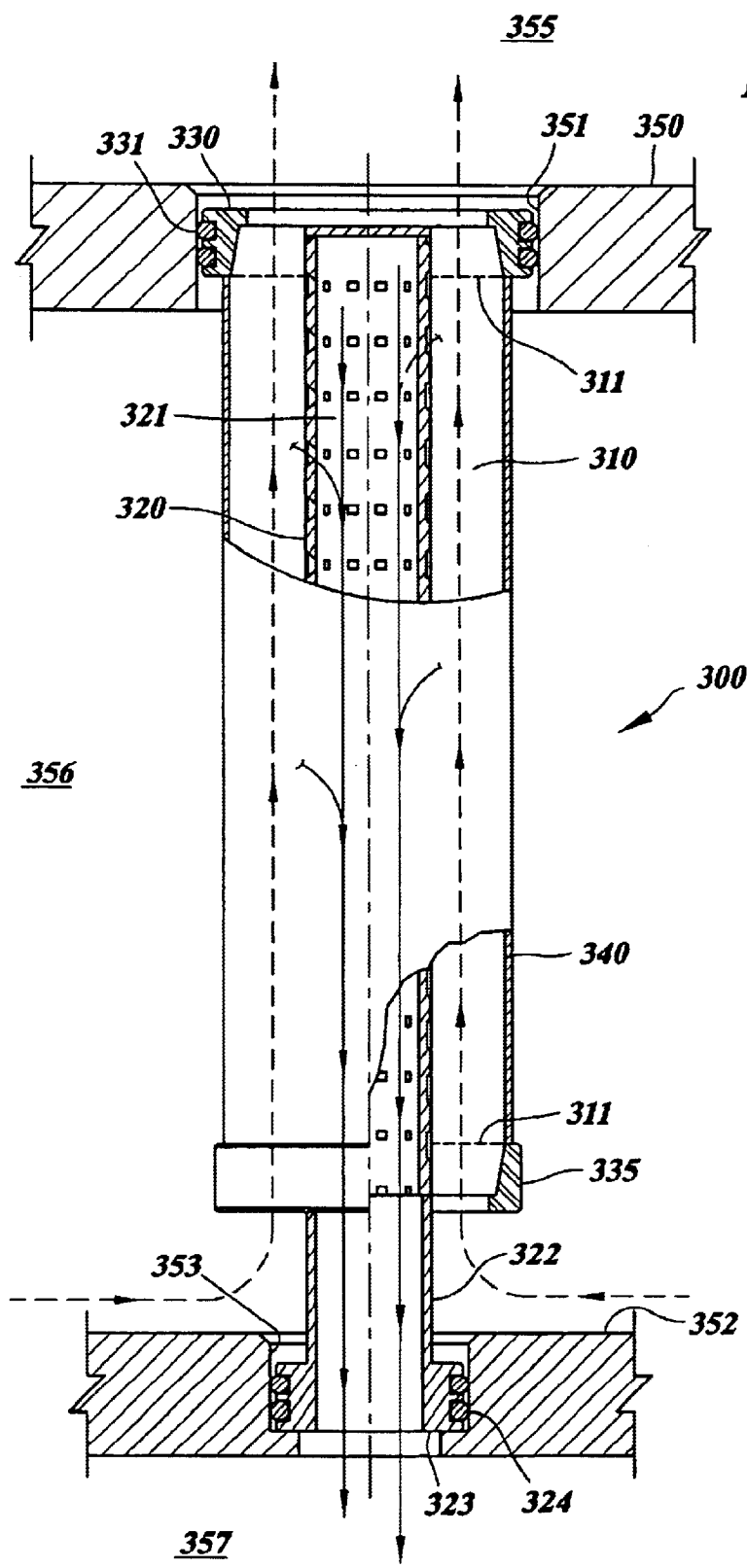
FIG. 8 is a cut-away elevation of another embodiment of a filter element according to the present invention in which the filter element is surrounded by a process fluid chamber.

FIG. 8 is a cutaway elevation of an embodiment of a filter element 300 according to the present invention in which process fluid is introduced into the filter element 300 from a process fluid chamber which surrounds the filter element 300 rather than through one of the lengthwise ends of the filter element 300. The filter element 300 is shown installed in a housing similar to that of the previous embodiment and including two tube sheets 350, 352 which divide the interior of the housing into a retentate chamber 355, a process fluid chamber 356, and a permeate chamber 357. Each of the chambers is equipped with an unillustrated fluid port providing fluid communication between the interior of the chamber and the exterior of the housing. The housing may contain a single filter element 300 or a plurality of the filter elements 300 installed in a similar manner. In contrast to the previous embodiments, the process fluid chamber 356 is located between the tube sheets 350, 352 and surrounds the filter element 300.

As in the previous embodiments, the filter element 300 includes a pleated filter pack 310, a core 320 surrounded by the filter pack 310, and an end cap 330, 335 located at each end of the filter pack 310. The filter pack 310 may have any of the structures described with respect to the preceding embodiments. For example, it may comprise a three-layer composite of an inner drainage layer, a filter layer, and an outer drainage layer formed into axially extending pleats which are maintained in a laid-over state by an unillustrated helical wrap member, like that shown in FIG. 1.

The upper and lower lengthwise ends of the filter pack 310 are sealed on the radially inner sides of each pleat so that fluid can flow into or out of the outer drainage layer through the end faces of the filter pack 310 but cannot flow into or out of the inner drainage layer. Sealing may be performed using any of the methods described with respect to the previous embodiments. In the illustrated embodiment, a sealing strip 311 similar to that used in the embodiment of FIG. 1 is pleated into the composite on the radially inner side of the inner drainage layer at both lengthwise ends of the filter pack 310. These sealing strips 311 function in the same manner as the sealing strips 24 shown in FIG. 1 to fill in any spaces between the opposing surfaces of adjoining legs of the pleats on the radially inner side of the filter layer.

The end caps 330, 335 may have any structure which enables fluid to enter or exit from the filter pack 310 on the radially outer sides of the pleats at both lengthwise ends of the filter pack 310. In the present embodiment, the upper end cap 330 is identical to the end caps 40 of the embodiment of FIG. 1 and includes one or more sealing members 331 such as O-rings for forming a piston seal against a hole 351 formed in the upper tube sheet 350. The lower end cap 335 is similar to the upper end cap 330 but is not equipped with any sealing rings since it is not sealed to a tube sheet.

The core 320 may have any structure which enables it to transport permeate in a lengthwise direction of the filter element 300 and discharge the permeate into the permeate chamber 357. In the present embodiment, it comprises a hollow tube with a perforated section 321 through which permeate can enter the center of the core 320 and a non-perforated section 322 which extends hugh the lower end cap 335 to the exterior of the filter pack 310 to engage with the lower tube sheet 352.

The upper end of the core 320 is closed off to prevent permeate from flowing into the retentate chamber 355, while the lower end of the non-perforated section 322 is open so that permeate can flow through it into the permeate chamber 357. The lower end of the non-perforated section 322 is arranged so that it can be fluidly connected to the lower tube sheet 352. For example, it may have a flange 323 at its lower end which is equipped with one or more sealing members 324, such as O-rings, which form a piston seal against the inner surface of a hole 353 in the lower tube sheet 352. The end caps may be connected to the tube sheets 350, 352 in a variety of other ways, such as in the manner shown in FIG. 5.

The filter pack 310 is surround by a member which extends between the upper and lower end caps 330, 335 and which is impervious to the process fluid to fluidly isolate the filter pack 310 from the process fluid chamber 356 except at its lower end where process fluid enters the filter pack 310. In the present embodiment, the impervious member is a tube 340 which surrounds the filter pack 310 and which is preferably sealed to both end caps 330, 335. If the filter element 300 is intended to be operated or cleaned in a crossflow mode, the tube 340 preferably fits closely around the outer periphery of the filter pack 310 or a wrap member, if present, so that fluid will flow primarily through the filter pack 310 during crossflow instead of bypassing the filter pack 310 by flowing through a space between the outer periphery of the filter pack 310 and the inner periphery of the tube 340. For example, the tube 340 may contact the outer periphery of the filter pack 310 or wrap member, or there may be a small radial gap between them. Members other than a tube 340 can be used to isolate the filter pack 310 from the process fluid chamber 356, such as a wrap member made of a material impervious to the process fluid.

When the embodiment of FIG. 8 is to perform filtration in a crossflow mode, the fluid ports for all of chambers 355, 356, and 357 are opened, and process fluid is introduced from the process fluid chamber 356 into the filter pack 310 through the opening in the lower end cap 335. The radially inner sides of the pleats are sealed off by the sealing strip 311 at the lower end of the filter pack 310, so process fluid flows into the outer drainage layer on the radially outer side of the filter layer. The process fluid flows through the outer drainage layer in the lengthwise direction of the filter pack 310 and creates a fluid shear force on the radially outer side of the filter layer which reduces the accumulation of particles on the filter layer.

A portion of the process fluid passes through the filter layer and is filtered to become permeate, while the remainder of the process fluid flows within the outer drainage layer to the upper lengthwise end of the filter pack 310 and is discharged from the upper end of the filter element 300 into the retentate chamber 355 as retentate. The permeate flows through the inner drainage layer and into the core 320, inside of which it flows in the lengthwise direction of the filter element 300 to be discharged from the lower end of the core 320 into the permeate chamber 357. The upper end of the filter pack 310 is sealed on the radially inner side of the pleats by the sealing strip 311, so the permeate is prevented from flowing into the retentate chamber 355.

When the filter element 300 is to be used for dead end filtration, the fluid ports for chambers 356 and 357 are opened, and the fluid port for the retentate chamber 355 is closed. Process fluid is introduced into the filter pack 310 through the lower end cap 335 in the same manner as during crossflow filtration and enters the outer drainage layer. Since the retentate chamber 355 is closed, all of the process fluid flows from the outer drainage layer through the filter layer and into the inner drainage layer to become filtrate, which flows from the inner drainage layer into the core 320 and then is discharged from the filter element 300 through the lower end of the core 320 into the permeate chamber 357.

The filter element 300 can be backwashed by introducing a backwashing fluid into the permeate chamber 357. The backwashing fluid is forced under pressure from the permeate chamber 357 into the core 320 and then flows radially outward through the core 320 and into the drainage layer and then passes through the filter layer and into the outer drainage layer, in the process of which it dislodges particles embedded in or adhering to the filter layer. The backwashing fluid and the dislodged particles entrained in the backwashing fluid then flow inside the outer drainage layer in the lengthwise diction of the filter element 300 to be discharged from the filter element 300 into one or both of the retentate chamber 355 and the process fluid chamber 356.

The filter element 300 can also be cleaned by crossflow. In this mode of cleaning, with the fluid ports for the process fluid chamber 356 and the retentate chamber 355 open, one or more suitable crossflow cleaning fluids is passed through the outer drainage layer of the filter pack 310 one or more times from the process fluid chamber 356 to the retentate chamber 355 or in the opposite direction, in the process of which the cleaning fluid generates a fluid shear force which detaches particles from the filter layer and discharges them from the filter element 300. After crossflow has been performed for a desired length of time, the cleaning fluid and the particles can then be drained from the housing. As the cleaning fluid is being passed through the filter element 300, the permeate chamber 357 and the interior of the core 320 are preferably maintained at a pressure equal to or higher than that within the outer drainage layer of the filter pack 310.

The embodiment of FIG. 8 is advantageous in situations in which it is desirable to have the process fluid chamber 356 between the tube sheets 350, 352 rather than above or below them because, for example, of the manner in which it is easiest to connect the housing to other equipment. During crossflow filtering or cleaning, a process fluid or cleaning fluid is able to flow over the entire length of the filter pack 310 without having to change directions, so the fluid which is performing crossflow can maintain a high velocity to produce a good crossflow so as to inhibit the build-up of particles on the radially outer side of the filter layer or to remove such particles during crossflow cleaning.

Figure 9:
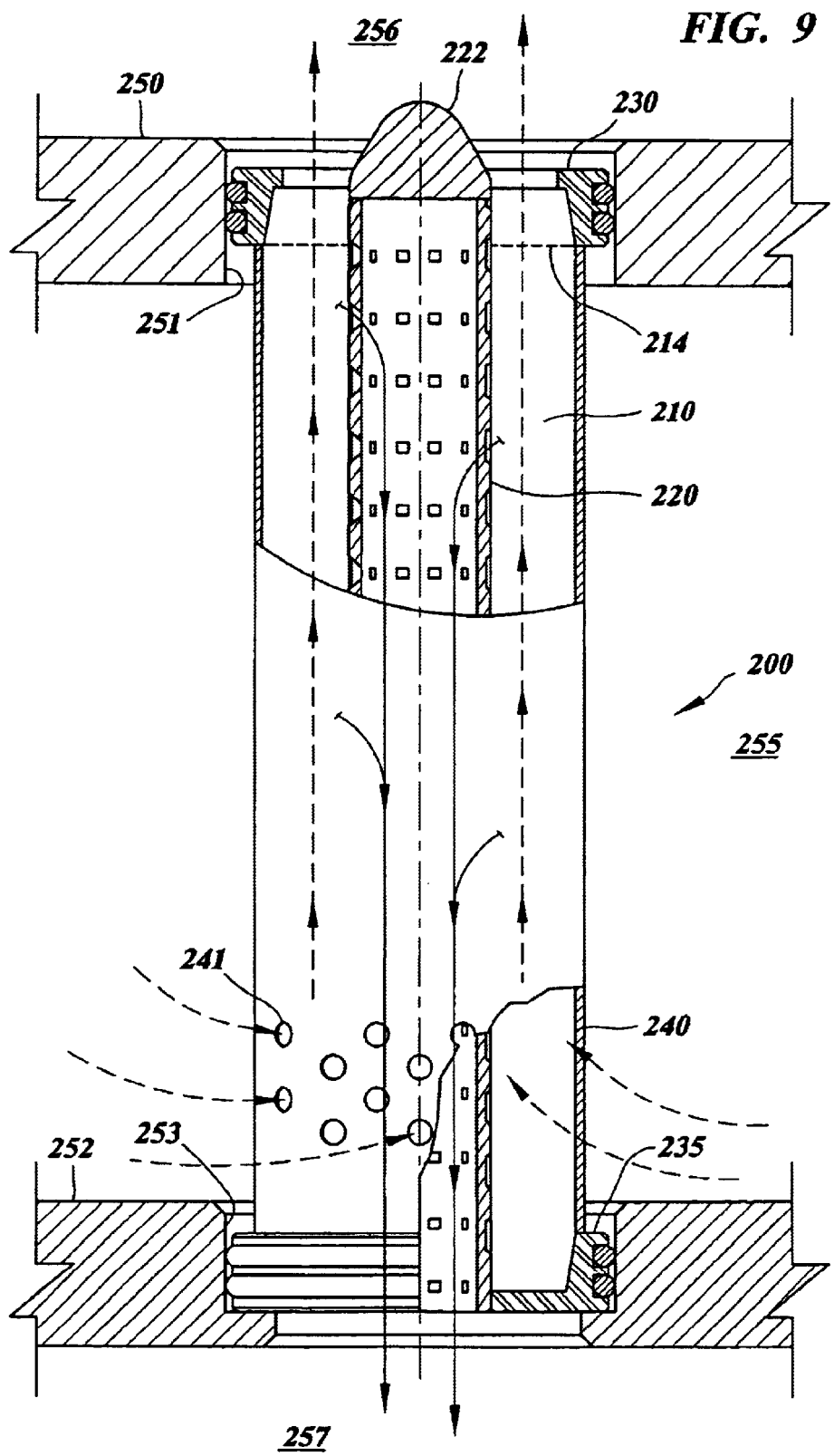
FIG. 9 is a cut-away elevation of an embodiment of a filter element according to the present invention in which retentate and permeate are discharged from opposite ends of the filter element.

In the previous examples, process fluid is introduced into a filter element through a lengthwise end of the filter element, but it is also possible for process fluid to be introduced into the filter element without passing through a lengthwise end. FIG. 9 illustrates the filter element 200 of FIG. 6 installed in a housing like that shown in FIG. 6 except that the space above the upper tube sheet 250 serves as a retentate chamber 256, the space between the tube sheets 250 and 252 serves as a process fluid chamber 255, and the space below the lower tube sheet 252 serves as a permeate chamber 257. As in the previous embodiments, the housing may accommodate a single filter element 200 or a plurality of filter elements 200.

During filtration using this arrangement in a crossflow mode, with the fluid ports for all of chambers 255, 256, and 257 open, process fluid is introduced from the process fluid chamber 255 into the filter element 200 through the perforations 241 in the tube 240. Upon passing through the perforations 241, the process fluid passes through the wrap member surrounding the filter pack 210 and into the outer drainage layer of the filter pack 210. The process fluid then flows in the lengthwise direction of the filter element 200 within the outer drainage layer towards the upper end of the filter element 200, producing a fluid shear force which inhibits the attachment of particles to the outer surface of the filter layer.

As the process fluid flows through the outer drainage layer, a portion of the process fluid flows through the filter layer and is filtered to become permeate, while the remainder exits through the upper lengthwise end face of the filter pack 210 as retentate. The permeate flows radially through the inner drainage layer and into the center of the core 220, along which it flows axially out of the lower end cap 235 and into the permeate chamber 257. The seal strip 214 at the upper end of the filter element 200 forms a seal on the radial inner side of the filter layer and prevents the permeate from flowing through the upper lengthwise end face of the filter pack 210, so all of the permeate flows into the core 220.

In order to perform filtration in a dead end mode, the fluid ports for chamber 255 and 257 are opened, and the fluid port for the retentate chamber 256 is closed. Process fluid is then introduced from the process fluid chamber 255 into the filter element 200 through the perforations 241 in the tube 240 and into the outer drainage layer of the filter pack 210 in the same manner as during crossflow filtration. Since the fluid port for the retentate chamber 256 is closed, all of the process fluid in the outer drainage layer flows through the filter layer and into the inner drainage layer to become filtrate, which then flows from the inner drainage layer into the core 220 and is discharged from the filter element 200 through the lower end of the core 220 into the permeate chamber 257.

If it is desired to backwash the filter element 200, a backwashing fluid is introduced into the core 220 from the permeate chamber 257 and is forced under pressure radially outward through the perforations in the core 220 into the filter pack 210. In the filter pack 210, the backwashing fluid flows from the inner drainage layer through the filter layer and into the outer drainage layer, in the process of which it dislodges particles inside the filter layer or adhering to its radially outer surface. The backwashing fluid with the dislodged particles entrained in it then exits from the filter element 200 through the upper lengthwise end face of the filter pack 210 into the retentate chamber 256 and/or through the perforations 241 in the tube 240 into the process fluid chamber 255. If desired, the backwashing fluid can be prevented from flowing into one of the chambers 255 or 256 by closing off conduits communicating with the chamber which is not to receive the backwashing fluid.

The filter element 200 of FIG. 9 can also be subject to crossflow cleaning in the same manner described with respect to the filter element 200 of FIG. 6.

Figure 10:
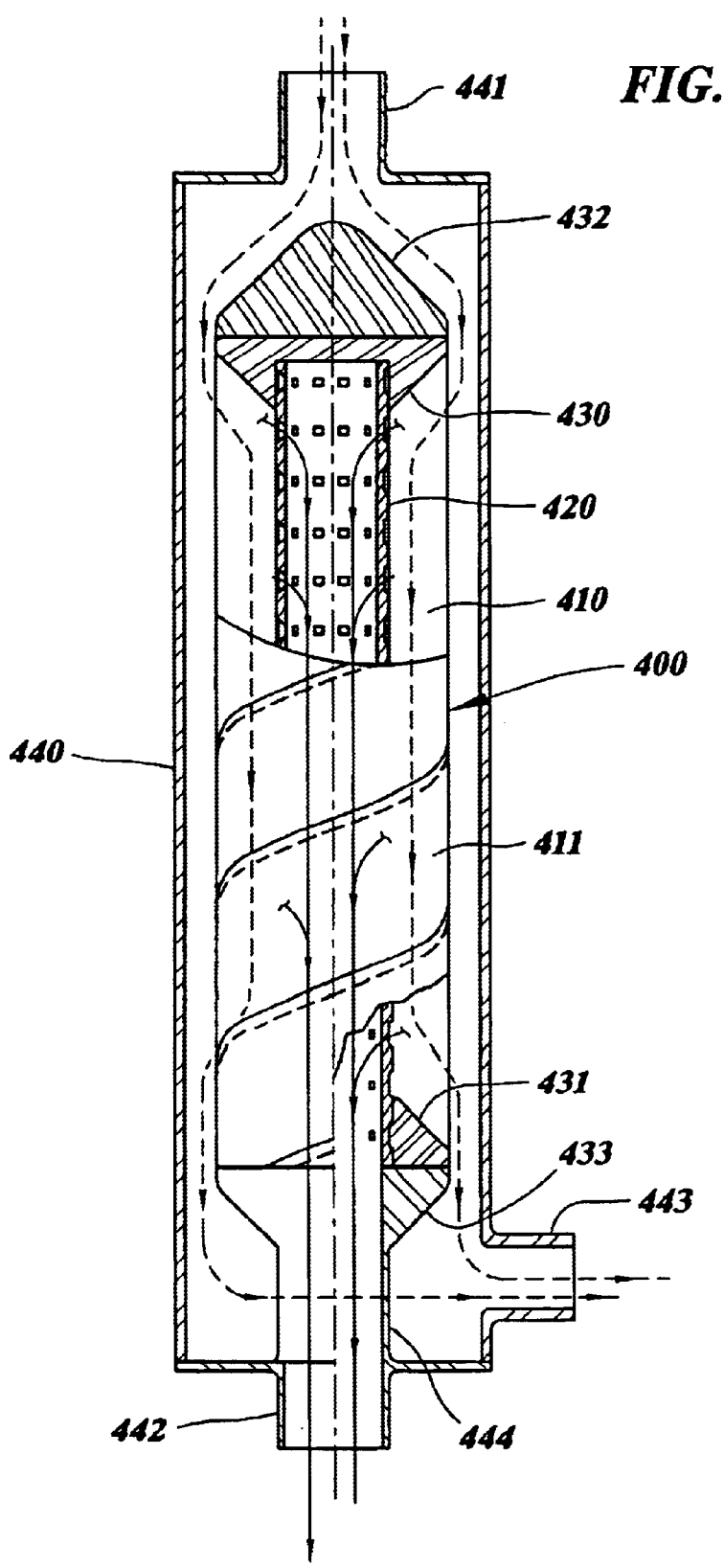
FIG. 10 is a cut-away elevation of an embodiment of a filter element according to the present invention installed in a housing without tube sheets.

A filter element according to the present invention need not be connected to a tube sheet of a housing. FIG. 10 is a cutaway elevation of a filter assembly according to the present invention including a housing 440 without a tube sheet and a filter element 400 disposed in the housing 440.

The housing 440 is in the form of an elongated tubular member surrounding the filter element 400 and including a process fluid inlet 441 at one of its ends, a permeate outlet 442 at its other end, and a retentate outlet 443 in a location spaced from the process fluid inlet 441. The retentate outlet 443 is preferably further from the process fluid inlet 441 than the lower end of the filter element 400 so that process fluid will flow over the entire length of the filter element 400 before exiting through the retentate outlet 443. Flow through the inlet 441 and outlets 442, 443 can be controlled by suitable unillustrated valves.

As in the previous embodiments, the illustrated filter element 400 includes a hollow pleated filter pack 410, a hollow perforated core 420 surrounded by the filter pack 410, and an end cap 430, 431 disposed at each lengthwise end of the filter pack 410. The filter pack 410 may have any of the configurations described with respect to the preceding embodiments, such as a configuration comprising a three-layer composite of an inner drainage layer, a filter layer, and an outer drainage layer formed into axially extending pleats which are maintained in a laid-over state by a helical wrap member 411.

In this embodiment, during crossflow filtration, a process fluid flows within the outer drainage layer in the lengthwise direction of the filter element 400, while permeate flows within the inner drainage layer into the core 420 and then flows through the core 420 to the permeate outlet 442. Therefore, the upper and lower lengthwise ends of the filter pack 410 are sealed on at least the radially inner side of the filter layer to prevent process fluid from flowing into the inner drainage layer at the upper lengthwise end and to prevent permeate from flowing through the lower lengthwise end of the inner drainage layer. Sealing may be performed in any of the ways described with respect to the preceding embodiments. In the present embodiment, each lengthwise end face of the filter pack 410 is melt-sealed to one of the end caps 430, 431 to prevent fluid from flowing through either lengthwise end face. Alternatively, sealing may be performed by the use of sealing strips pleated into the composite, for example.

The end caps 430, 431 need not have any particular shape and may be similar to those used in the preceding embodiments. The lower end cap 431 has an opening at its center through which fluid can pass between the core 420 and the permeate outlet 442. The upper end cap 430 may be either a blind end cap or an open one. Since fluid does not flow through the upper end of the core 420, it may be convenient for the upper end cap 430 to be a blind end cap which closes off the upper end of the core 420. If the upper end cap 430 is open, the upper end of the core 420 may be closed off in a different manner.

To prevent the formation of stagnant areas in the outer drainage layer, i.e., areas where the process fluid is stationary, the end caps may be beveled towards the lengthwise center of the filter element 400 to smooth the flow of fluid into and out of the lengthwise ends of the filter pack 410. Furthermore, streamlined flow smoothing members 432 and 433, which may be formed integrally with or separately from the end caps, may be disposed at the lengthwise ends of the filter element 400 to prevent the formation of stagnant areas at these ends.

The filter element 400 may be removably or permanently installed in the housing 440. In the present embodiment, the lower end of the filter element 400 is non-detachably secured within the housing 440 to a tube 444 communicating with the permeate outlet 442. The housing 440 may have any shape which enables it to permit the process fluid to flow into the filter pack 410 at its upper end and enable retentate to be discharged from the filter pack 410 at its lower end. If the filter element 400 is to be operated in a crossflow mode either during filtration or during cleaning, the inner periphery of the housing 440 preferably fits closely around the outer periphery of the filter pack 410 and a wrap member 411, if present, over most of the length of the filter pack 410 so that fluid performing crossflow will flow primarily through the filter pack 410 during crossflow instead of bypassing the filter pack 410 by flowing through a space between the outer periphery of the filter pack 410 or wrap member 411 and the inner periphery of the housing 440. Thus, the resistance to fluid flow between the process fluid inlet 441 and the retentate outlet 443 is preferably lower along a flow path passing through the outer drainage layer of the filter pack 410 than along a flow path passing along a gap between the outer periphery of the filter pack 410 and the inner periphery of the housing 440.

In FIG. 10, the inner periphery of Fe housing 440 is preferably spaced from the outer periphery of the filter element 400 by a first distance in the vicinity of the end caps 430, 431 so that fluid can easily flow into or out of the filter pack 410 at the ends of the filter pack 410, and in most of the, of the filter pack 410 between the end caps, the housing 440 has a smaller inner diameter so that the inner periphery of the housing 440 is close enough to the outer periphery of the filter pack 410 and wrap member 411 to restrict bypass fluid along the inner periphery of the housing 440. It is also possible for the filter housing 440 to have a constant diameter and for an insert, such as a sleeve, to be disposed between the outer periphery of the filter pack 410 and wrap member 411 and the inner periphery of the housing 440 to substantially fill a space along the inner periphery of the housing 440 and thereby reduce or prevent bypass of fluid.

In order to perform crossflow filtration with this embodiment, with inlet 441 and outlets 442 and 443 open, a process fluid is introduced into the housing 440 through the process fluid inlet 441. The process fluid passes through the gap between the outer periphery of the filter element 400 and the inner wall of the housing 440, and a portion thereof flows through the helical wrap member 411 and into the outer drainage layer of the filter pack 410. Within the outer drainage layer, the process fluid flows in the lengthwise direction of the filter element 400 towards its lower end. As it does so, a portion of the process fluid flows through the filter layer into the inner drainage layer to become permeate, which flows within the inner drainage layer into the core 420. The permeate then flows along the interior of the core 420 in the lengthwise direction of the core 420 and then is discharged from the housing 440 via the permeate outlet 442.

The process fluid which does not pass through the filter layer flows out of the outer drainage layer at the lower end of the filter pack 410 into the gap between the filter element 400 and the inner wall of the housing 440, and from there it is discharged from the housing 440 through the retentate outlet 443. The flow of process fluid in the lengthwise direction of the filter element 400 within the outer drainage layer along the outer surface of the filter layer produces a fluid shear force which inhibits the build-up of particles on the filter layer and thereby prolongs its life span.

In order to perform dead end filtration, the process fluid inlet 411 and the permeate outlet 442 are opened, but the retentate outlet 443 is closed. A process fluid is then introduced into the housing 440 through the process fluid inlet 441 and flows into the outer drainage layer of the filter pack 410, as during crossflow filtration. With the retentate outlet 443 closed, all of the process fluid in the outer drainage layer flows through the filter layer and into the inner drainage layer to become filtrate, which then flows into the core 420 and is discharged from the filter element 400 through the permeate outlet 442.

The filter element 400 can be backwashed by introducing a backwashing fluid into the housing 440 through the permeate outlet 442. The backwashing fluid is forced under pressure into the core 420 and then is forced radially outward through the perforations in the core 420 into the inner drainage layer of the filter pack 410, passing in succession through the inner drainage layer and the filter layer into the outer drainage layer, in the process of which it dislodges particles embedded in or adhering to the filter layer. The backwashing fluid and entrained particles then flow in the lengthwise direction of the filter pack 410 through the outer drainage layer and through the gap between the outer periphery of the filter element 400 and the inner wall of the housing 440 and are discharged from the housing 440 through one or both of the process fluid inlet 441 and the permeate outlet 442, depending on which one is open.

The filter element 400 can also be cleaned in a crossflow mode. In this mode, with the process fluid inlet 441 and the retentate outlet 443 open, one or more suitable crossflow cleaning fluid is passed through the outer drainage layer of the filter pack 410 one or more times from the process fluid inlet 441 to the retentate outlet 443 or in the opposite direction to detach particles from the filter layer and discharge them from the filter element 400. The cleaning fluid and detached particles can then be drained from the housing through either inlet 441 or outlet 443. As the cleaning fluid is being passed through the filter element 400, the interior of the core 420 is preferably maintained at a pressure equal to or higher than that within the outer drainage layer of the filter pack 410 to enhance the effectiveness of the crossflow in the outer drainage layer.

Because the housing 440 of the filter assembly shown in FIG. 10 can closely surround a filter element 400, the assembly has a low hold-up volume of fluid (the volume of fluid present in the portions of the housing 440 surrounding the filter element 400), and it can be made both lightweight and compact, so it is particularly useful as deposable filter assembly, since it is desirable to minimize the amount of materials which are discarded. The filter assembly is also highly suitable for use in locations Where there is limited space available for installation.

The cost of a filter housing is typically more heavily dependent on the diameter of the housing than on its length. Thus, for two housings having the same volume, the housing having the smaller diameter of the two will usually be less expensive manufacture than the housing having the larger diameter, even though the less expensive housing will have a greater length. Therefore, designers of filtration system frequently try to minimize the diameter of a filter housing by increasing its length.

In order to make effective use of the volume of a long filter housing, it is generally advantageous for the filter elements disposed in the housing to be as long as possible or for a plurality of filter elements to be connected in series inside the housing so that the filter element or elements will extend over much of the length of the housing. However, when a filter element is operated in crossflow either during filtration or cleaning, the effectiveness of crossflow usually decreases as the length of the filter element increases. This is because the resistance to crossflow through the filter element increases as its length increases, so at practical fluid pressures, the fluid performing crossflow may not have sufficient velocity to be effective. Similarly, when the same fluid is passed through a plurality of filter elements connected in series, the combined resistance to flow of all the filter elements may result in the velocity of the fluid performing crossflow being ineffective. Thus, with a conventional crossflow filter element, a single short filter element is more effective than a long filter element or a plurality of filter elements connected in series.

Figure 11:
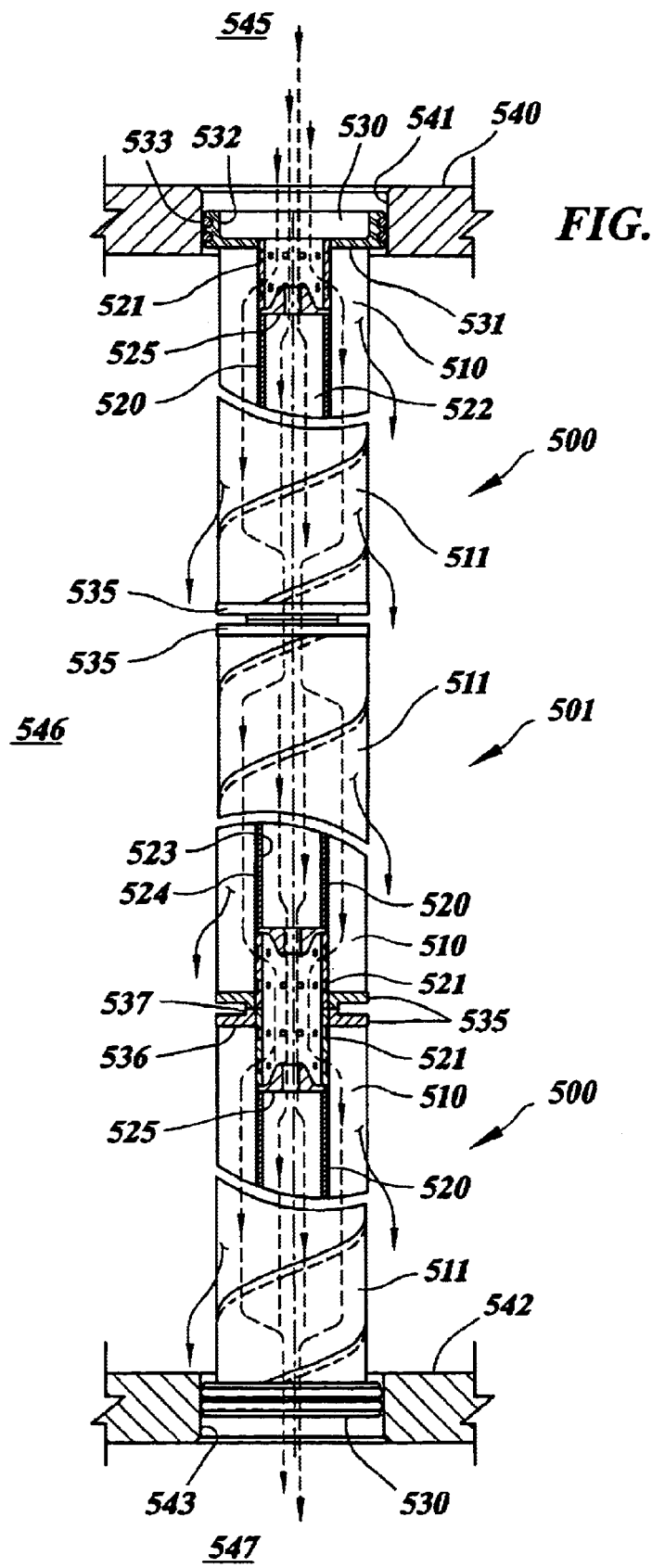
FIG. 11 is a cut-away elevation of a filter arrangement according to the present invention in which a plurality of filter elements are connected in series.

FIG. 11 shows an arrangement in which a plurality of filter elements 500, 501 according to the present invention are connected to each other to form a series, but in which the resistance to flow through the filter elements can be maintained at a sufficiently low level to achieve effective crossflow velocities. The illustrated arrangement comprises a series of three elements, but a smaller or larger number of filter elements may be linked together in the same manner. Each filter element includes a hollow pleated filter pack 510 a core 520 surrounded by the filter pack 510, and an end cap 530 or 535 disposed at each lengthwise end of the filter pack 510.

Filter elements 500 and 501 are preferably identical to each except for the end caps, filter element 500 having two end caps 530 and 535 of different structure, and filter element 501 having two end caps 535 of the same structure. The series of elements are disposed in a housing and mounted on upper and lower tube sheets 540 and 542 which partition the interior of the housing into a process fluid chamber 545, a permeate chamber 546, and a retentate chamber 547. Each of the chambers is equipped with an unillustrated fluid port providing fluid communication between the interior of the chamber and the exterior of the housing. FIG. 11 shows only a single series of filter elements, but a plurality of similar series may be installed in the housing in the illustrated manner.

As in the preceding embodiments, the filter pack 510 may have a wide variety of forms, such as the form of a three-layer composite of an inner drainage layer, a filter layer, and an outer drainage layer, with the composite being formed into axially extending pleats which are maintained in a laid-over state by a helical wrap member 511. End caps 530 are adapted to be connected to the upper tube sheet 530 or the lower tube sheet 542 in a fluid-tight manner. In this embodiment, each of end caps 530 comprises a flat plate 531 having a central hole through which fluid can pass, a tubular portion 532 extending from the plate 531, and one or more O-rings 533 or other sealing members mounted on the exterior of the tubular portion 532 for forming a piston seal against an interior surface of an opening 541 or 543 formed in a corresponding one of the tube sheets 540 or 542. However, the end caps 530 may be connected to the tube sheets in any other suitable manner, such as in the manner shown in FIG. 5. Each of end caps 535 is arranged such that fluid can flow through two adjoining end caps 535 from one filter element to the next filter element in the series without leaking into the permeate chamber 546.

A fluid connection between adjoining filter elements 500, 501 can be formed in a variety of ways, with or without the filter elements being secured to each other. For example, a hollow connecting member may be installed between adjoining filter elements 500, 501 to interconnect them, the end caps 535 themselves may be equipped with connecting members by means of which they can be coupled to adjoining filter elements, the end caps 535 can be simply compressed in the axial direction against a gasket or other sealing member to form a seal between opposing surfaces of opposing end caps 535, or the end caps 535 can be directly secured to each other by a variety of joining methods. In the present embodiment, each of end caps 535 includes a flat plate 536 which opposes a lengthwise end face of the filter pack 510 of the filter element and which has a central hole through which fluid can pass. A tubular portion 537 extends from the plate 536 surrounding the hole in the plate 536. The end surface of the tubular portion 537 is rigidly secured to the end surface of the tubular portion 537 of the end cap 535 of the adjoining filter element by melt bonding, for example, thereby forming a rigid connection which enables the series of filter elements to be installed in and removed from the housing as a single unit.

Each of the filter elements is structured such that during crossflow filtration, process fluid flows along the radially inner sides of the pleats and permeate flows along the radially outer sides of the pleats.

Each of the cores 520 is similar in structure to the core of the embodiment of FIG. 5 in that it includes a perforated section 521 having a wall through which fluid can pass between the interior of the core 520 and the filter pack 510 at each of its lengthwise ends and a blind section 522 having a wall which is impermeable to fluid extending between the two perforated sections 521. As in the embodiment of FIG.

5, the blind section 522 includes a tubular wall 523 and an outer surface 524 formed of a resilient material which fills gaps between adjacent pleats of the filter pack 510 at the radially inner ends of the pleats. In contrast to the core of the filter element of FIG. 5, process fluid is able to flow through core 520 in the lengthwise direction over its entire length to enable a portion of the process fluid to bypass the filter pack 510 of one filter element and flow into the next filter element in the series. Each core 520 may have a flow restriction disposed downstream of the perforated section 521 at the upper end of the core 520 to restrict flow into the blind section 522 of the core 520 so that a portion of the process fluid will flow into the filter pack 510 rather than bypassing the filter pack 510 by flowing solely through the core 520.

Each filter element may have one or more flow restrictions. In the present embodiment, a flow restriction in the form of a flow restricting member 525 is disposed at each lengthwise end of the blind section 522 of each core 520. Each flow restricting member 525 comprises a member having a disk-shaped flange which is sandwiched between one of the perforated sections 521 and the blind section 522 of the core 520. The flow restricting member 525 has an orifice at its center with a diameter sized to produce a desired resistance to flow into or out of the blind section 522 of the core 520. The surface of the flow restricting member 525 facing the perforated section 521 may be sloped with respect to the axis of the filter element 500, 501 to prevent the formation of a stagnant region in the perforated section 521.

Although the size of the orifices in the flow restricting members 525 may differ among the filter elements, for ease of manufacture, it may be preferable if all the orifices have the same dimensions. A flow restriction is not limited to the shape of the flow restricting members 525 shown in FIG. 11, and any structure capable of increasing resistance of fluid flow through the core 520 in the lengthwise direction of the core 520 can be employed. For example, the wall of a core 520 may be pinched inwards to produce a flow restriction.

The size of the orifices of the flow restricting members 525 is preferably selected such that a flow path passing through the two flow restricting members 525 and the blind section 522 of a single core 520 between the upper and lower perforated sections 521 of the core 520 provides less Ice to flow than a flow path passing between the two perforated sections 521 of the core 520 through the filter pack 510. As a result, process fluid flowing through the flow restricting members 525 and blind section 522 of the core 520 will retain much of its kinetic energy when its reaches the lower end of the filter element 500 or 501 and can effectively produce crossflow in the next filter element in the series of filter elements over the entire series. Thus, the arrangement of FIG. 11 can achieve the spatial efficiencies of a long filter element or of a series of filter elements while still maintaining effective crossflow velocities in the filter elements, and it enables the effective use of a long housing having a small diameter.

During crossflow filtration using the arrangement of FIG. 11, a process fluid flows within the inner drainage layer and permeate flows within the outer drainage layer of each filter pack 510. Therefore, the upper lengthwise end of each filter element 500, 501 is arranged so that process fluid can enter the inner drainage layer from outside of the filter element but not enter the outer drainage layer and such that the process fluid is prevented from leaking into the permeate chamber 546. The lower lengthwise end of each filter element is arranged such that process fluid and retentate can leave the filter element and flow into the upper end of the next filter element in the series or into the retentate chamber 547 but is prevented from leaking into the permeate chamber 546. The ends of the filter elements can be configured in a variety of ways to achieve these objectives. In the present embodiment, the lengthwise end of each filter pack 510 is sealed to the corresponding end cap 530, 535 by melt bonding, for example, so that all flow into or out of the lengthwise ends of the filter elements is through the holes at the centers of the end caps 530, 535 without any flow through the lengthwise end faces of the filter packs 510.

However, the lengthwise end faces need not be sealed in this manner, and process fluid could be allowed to flow from one filter element 500, 501 to the next through the lengthwise end faces of the filter packs. For example, sealing strips could be used to seal the outer drainage layer at the lengthwise end face of each filter pack 510, while process fluid could be allowed to flow through the lengthwise end faces from the inner drainage layer of one filter element into the inner drainage layer of the next filter element in the series.

In order to perform crossflow filtration, with the fluid ports for all three of chamber 545, 546, and 547 open, a process fluid is introduced into the uppermost filter element 510 in the series from the process fluid chamber 545 through the upper tube sheet 540. The process fluid flows into the upper perforated section 521 of the core 520. A portion of the process fluid flows through the perforations in the upper perforated section 521 into the filter pack 510, while the remainder of the process fluid flows through the upper flow restricting member 525 into the blind section 522 of the core 520, through the length of the blind section 522, through the lower flow restricting member 525 at the lower end of the blind section 522, and into the lower perforated section 521. The proportion of process fluid which flows into the filter pack 510 or through the core 520 is determined by the relative resistance to flow provided by the filter pack 510 and by the flow restricting members 525.

The process fluid which passes through the perforations in the upper perforated section 521 flows into the inner drainage layer of the filter pack 510 and flows within the inner drainage layer in the lengthwise direction of the filter element 500, 501 and creates a fluid shear force on the radially inner side of the filter layer which inhibits the accumulation of particles on the filter layer. A portion of the process fluid passes through the filter layer and into the outer drainage layer to become permeate, while the remainder of the process fluid flows within the inner drainage layer to the lower lengthwise end of the filter pack 510. The permeate flows from the outer drainage layer through the wrap member 511 into the permeate chamber 546. The lower lengthwise end of the filter pack 510 of the uppermost filter element 500 is sealed by an end cap 535, so the retentate flows through the perforations into the lower perforated section 521 of the core 520 and is united with the process fluid which passed through the blind section 522 of the core 520.

The combined retentate and process fluid are then discharged from the uppermost filter element 500 into the upper end of the next filter element 501 in the series to become process fluid for the next filter element 501, in which the above-described process of a portion of the process fluid passing through the filter pack 510 and a portion flowing through the core 520 without entering the filter pack 510 is repeated. Process fluid and retentate which reach the lower end of filter element 501 are introduced into the next filter element 500 in the series as process fluid, and finally, process fluid and retentate which reach the lower end of the last filter element 500 in the series are discharged into the retentate chamber 547 through the lower tube sheet 542.

If it is desired to perform dead end filtration, a process fluid is introduced into the uppermost filter element from the process fluid chamber 545 through the upper tube sheet 540 in the same manner as during crossflow filtration but with the fluid ports for chambers 545 and 546 open and the fluid port for the retentate chamber 547 closed. Since all of the cores 520 are interconnected by the orifices in the flow restricting members 525, the process fluid can flow into the perforated sections 521 of each core 520 and then flow through the perforated sections 521 into the inner drainage layer of the filter pack 510 of each filter element. From the inner drainage layer, the process fluid will flow through the filter layer and into the outer drainage layer to become filtrate, which will flow radially outward from each filter element into the permeate chamber 546.

The filter arrangement of FIG. 11 can be subjected to backwashing by introducing a suitable backwashing fluid into the permeate chamber 546. The backwashing fluid is forced under pressure from the permeate chamber 546 through the wrap member 511 into the outer drainage layer of each filter pack 510 and then flows through the filter layer into the inner drainage layer. As the backwashing fluid passes through the filter layer, it dislodges particles embedded within the filter layer or adhering to the radially inner side of the filter layer.

The backwashing fluid and the dislodged particles then flow in the lengthwise direction of the filter pack 510 through the inner drainage layer to the lengthwise ends of the filter pack 510 and into the perforated sections 521 of the core 520. The backwashing fluid and particles then flow through the cores 520 of one or more of the filter elements 500, 501 to be discharged into the process fluid chamber 545 and/or the retentate chamber 547, depending on which of the fluid ports of these chambers is open.

If desired, the filter arrangement of FIG. 11 can also be cleaned in a crossflow mode. In this mode, the fluid ports for the process fluid chamber 545 and the retentate chamber 547 are opened, and one or more suitable crossflow cleaning fluid is passed through the inner drainage layer of the filter pack 510 of each filter element along the same path that process fluid passes during crossflow filtration, although the direction of flow may be either from the process fluid chamber 545 to the retentate chamber 547 or in the opposite direction. As is the case with process fluid during crossflow filtration, in each filter element, a portion of the cleaning fluid will flow through the inner drainage layer of the filter pack 510, while the remainder of the cleaning fluid will flow along the center of the core 520 of the filter element. In this manner, the cleaning fluid can be maintained at a high energy as it flows over the length of the series of filter elements to produce a high fluid shear force which can detach particles from the filter layer of each filter pack 510 and discharge them from the filter elements.

The cleaning fluid and the particles can be drained from the chamber of housing into which they are discharged. As the cleaning fluid is being passed through the filter elements, the permeate chamber 546 surrounding the filter elements is preferably maintained at a pressure equal to or higher than that within the inner drainage layers of the filter packs 510 to enhance the effectiveness of the crossflow in the inner drainage layers by preventing the cleaning fluid from flowing through the filter layers into the outer drainage layers.

In each of the preceding embodiments, a single fluid stream to be treated (a process fluid stream) is introduced into a fluid treatment element, and all fluids discharged from the fluid treatment element (both retentate and permeate) are derived from the single process fluid stream. Additionally, the preceding fluid treatment elements were described by way of example in the context of filtration and were referred to as filter elements. A fluid treatment element according to the present invention, including any of the embodiments described herein, can also be employed for applications in which at least one and more frequently two separate fluid streams are introduced into the fluid treatment element, and material or mass transfer takes place between the two fluid streams through a fluid treatment layer as the fluid streams pass through the fluid treatment element.

Figure 12:
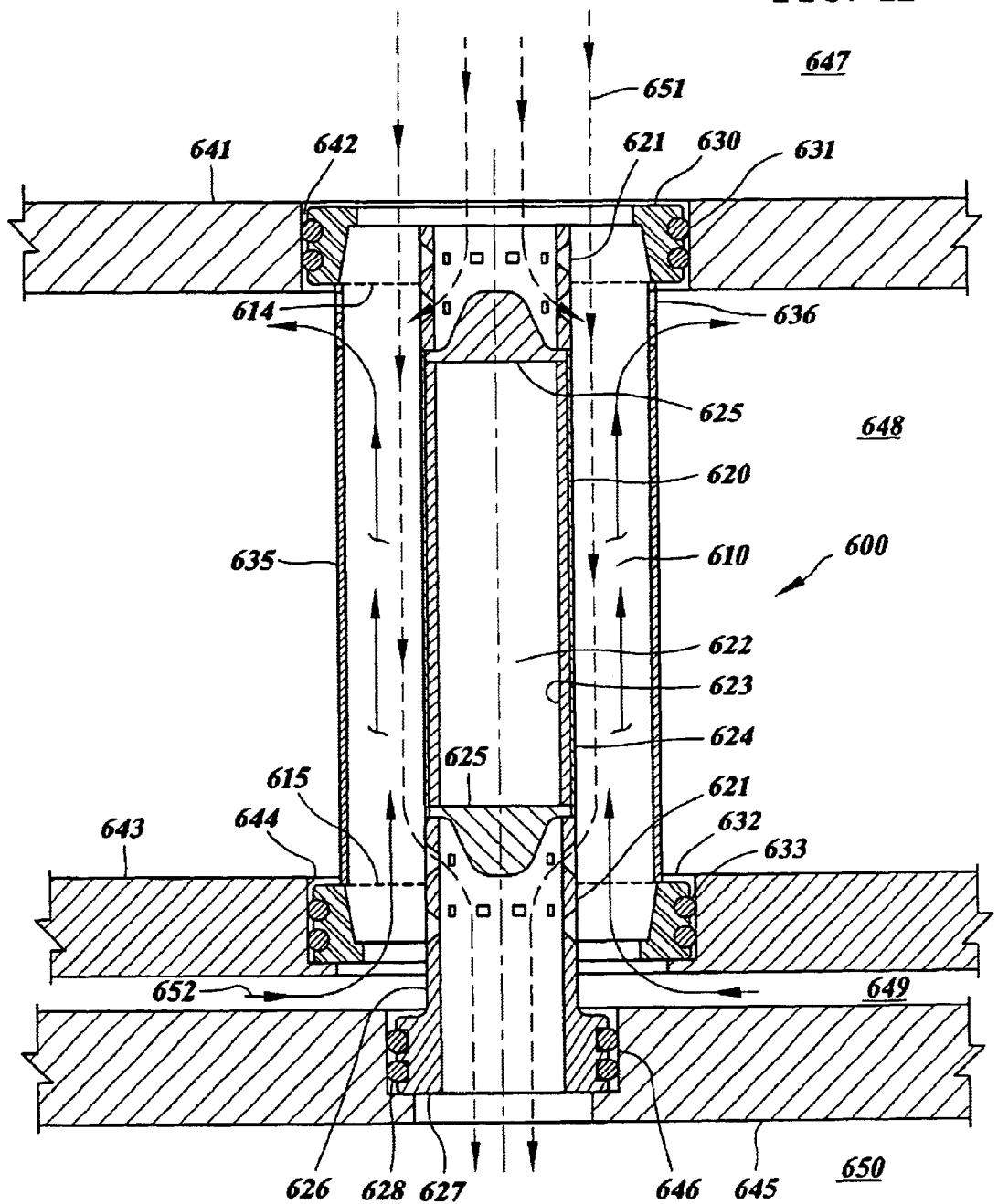
FIG. 12 is a cross-sectional elevation of an embodiment of a filter element according to the present invention having two inlet fluid streams.

FIG. 12 illustrates an example of a fluid treatment element 600 suitable for transferring a material between two inlet fluid streams through a fluid treatment layer. The fluid treatment element 600 is shown installed in a housing having three tube sheets 641, 643, and 645 dividing the interior of the housing into first through fourth chambers 647–650. Each of the chambers is equipped with an unillustrated fluid port providing fluid communication between the interior of the chamber and the exterior of the housing. A first fluid stream 651 can flow through the fluid treatment element 600 in its lengthwise direction between the first chamber 647 into the fourth chamber 650, and a second fluid stream 652 can flow through the fluid treatment element 600 in its lengthwise direction between the second chamber 648 and the third chamber 649. FIG. 12 shows only a single fluid treatment element 600, but a plurality of such elements 600 may be installed in the housing in a similar manner.

As in the preceding embodiments, the fluid treatment element 600 includes a hollow pleated fluid treatment pack 610, a core 620 surrounded by the fluid treatment pack 610, and an end cap 630, 632 disposed at each lengthwise end of the fluid treatment pack 610.

The fluid treatment pack 610 can have any of the configurations described with respect to the preceding embodiments. For example, it may comprise a composite including an inner drainage layer, a fluid treatment layer, and an outer drainage layer, with the composite being formed into axially extending pleats which are preferably in a laid-over state. The pleats may be maintained in a laid-over state by an unillustrated helical wrap member, for example, as in the preceding embodiments.

The rate of transfer of material across the fluid treatment layer between the two fluid streams 651, 652 can be enhanced if at least the fluid stream from which material is being transferred is undergoing turbulent flow. Turbulence of a fluid stream can be promoted by selecting the drainage layer through which the fluid stream passes in the lengthwise direction of the fluid treatment element 600 so that the fluid stream must follow a tortuous path. For example, in those regions of the fluid treatment pack 610 where the fluid streams are flowing in substantially the lengthwise direction of the fluid treatment element 600, turbulence may be promoted by using a diamond mesh with strands extending diagonally to the direction of fluid flow (to the lengthwise direction of the fluid treatment element 600) as a drainage mesh rather than a DELNET mesh or similar mesh with parallel strands extending in the lengthwise direction of the fluid treatment element 600.

The first fluid stream 651 is passed through the inner drainage layer in the lengthwise direction of the fluid treatment element 600, while the second fluid stream 652 is passed through the outer drainage layer in the lengthwise direction of the fluid treatment element 600, with material transfer taking place between the two fluid streams as they flow between the ends of the fluid treatment element 600. Therefore, the upper lengthwise end of the fluid treatment element 600 is arranged to permit the first fluid stream 651 to flow into the inner drainage layer but not into the outer drainage layer, while the lower lengthwise end of the fluid treatment element 600 is arranged to permit the second fluid sin 652 to flow into the outer drainage layer but not into the inner drainage layer. For example, the outer drainage layer may be scaled off at the upper lengthwise end of the fluid treatment pack 610 by a seal strip disposed on the radially outer side of the fluid treatment layer so that the second fluid stream 652 cannot flow through the upper lengthwise end face of the fluid treatment pack 610, and the inner drainage layer may be sealed off at the lower lengthwise end of the fluid treatment element 600 by a seal strip disposed on the radially inner side of the fluid treatment layer so that the first fluid stream 651 cannot flow through the lower lengthwise end face of the fluid treatment pack 610.

The core 620 of this embodiment is similar to that of the embodiment of FIG. 4 and includes first and second open ends, a perforated section 621 in the vicinity of each lengthwise end of the fluid treatment pack 610, and a blind section 622 extending between the perforated sections 621. The blind section 622 comprises a hollow tube 623 surrounded by a resilient sleeve 624 which can fill the triangular gaps between the radially inner ends of adjoining pleats to prevent the first fluid stream from flowing along the gaps. At its lower end, the core 620 has an nonperforated section 626 which adjoins the lower perforated section 621 and extends the lengthwise direction of the fluid treatment element 600 away from the fluid treatment pack 610. The nonperforated section 626 is arranged to be sealed to the third tube sheet 645. For example, in this embodiment, it includes a flange 627 at its lower end having one or more sealing members 628 such as O-rings mounted in grooves in its exterior for forming a piston seal against the inner periphery of an opening 646 in the third tube sheet 645.

With this structure, the first fluid stream 651 can flow into the inner drainage layer at the upper lengthwise end of the fluid treatment pack 610 both by flowing axially through the upper lengthwise end face of the fluid treatment pack 610 and by flowing into the open upper end of the core 620 and then radially outwardly into the inner drainage layer through the perforations in the upper perforated section 621. However, it is not necessary for the first fluid stream 651 to have two flow paths into the inner drainage layer, and one of the flow paths can be omitted. For example, the upper lengthwise end face of the fluid treatment pack 610 may be completely sealed off, as in the embodiment of FIG. 5, so that the first fluid stream 651 can enter the upper lengthwise end of the fluid treatment pack 610 only through the core 620, or the core 620 may be closed off at its upper end like the core 30 shown in the embodiment of FIG. 1 so that the first fluid stream 651 can enter the fluid treatment pack 610 only through the upper lengthwise end face thereof.

Each of the illustrated end caps 630, 632 is identical in structure to the end caps of the embodiment of FIG. 1 and is attached to the fluid treatment pack 610 in the same manner as in that embodiment, with each end cap having one or more sealing members 631, 633 forming a piston seal against a corresponding opening 642, 644 in one of the tube sheets. However, the end caps may have other structures and may be connected to the tube sheets in other ways. For example, as described above, the upper end cap 630 may be one which seals off the upper lengthwise end face of the fluid treatment pack 610.

The two fluid streams 651, 652 may flow in the same or opposite lengthwise directions of the fluid treatment pack 610. In situations in which the rate of material transfer between the two fluid streams depends on the difference between the two streams in the concentration of the material to be transferred, it is usually more efficient if the two fluid streams flow in opposite lengthwise directions, since flow in opposite directions will produce a greater change in the concentration of the material being transferred compared to when flow takes place in the same direction.

The fluid treatment pack 610 is surrounded by a member which is impermeable to the second fluid stream 652 and which prevents the second fluid stream 652 from being discharged into the second chamber 648 until it has passed over a significant length of the fluid treatment pack 610. In the present embodiment, the impermeable member comprises a rigid tube 635, but it may have other forms, such as that of a flexible sleeve or wrap member of an impermeable material. At its lower lengthwise end, the tube 635 is sealed to the lower end cap 632, while at its upper lengthwise end, it has one or more perforations 636 or other openings through which the second fluid stream 652 can exit from the tube 635 into the second chamber 647. To give the fluid treatment element 600 greater strength, the tube 635 may be secured to the upper end cap 630, but it is also possible for the tube 635 to terminate short of the upper end cap 630 and for the second fluid stream 652 to flow through a gap between the upper end cap 630 and the upper end of the tube 635.

The tube 635 preferably fits closely around the fluid treatment pack 610 and a wrap member, if present, so that the second fluid stream 652 will flow through the outer drainage layer of the fluid treatment pack 610 rather than bypassing the fluid treatment pack 610 by flowing through a gap between the outer periphery of the fluid treatment pack 610 and the inner periphery of the tube 635. Thus, the resistance to fluid flow between the lower lengthwise end face of the fluid treatment pack 610 and the perforations 636 in the tube 635 is preferably lower along a flow path passing through the outer drainage layer of the fluid treatment pack 610 than along a flow path passing between the outer periphery of the fluid treatment pack 610 and the inner periphery of the tube 635.

In order to make effective use of the area of the fluid treatment pack 610, the paths of the first and second fluid steams preferably overlap each other within the fluid treatment pack 610 in the lengthwise direction of the filter element 600 for at least about 50%, more preferably at least about 75%, and still more preferably at least about 90% of the length of the fluid treatment pack 610.

Transfer of material between the two fluid streams may take place from the first fluid stream 651 to the second fluid stream 652 and/or from the second fluid stream 652 to the first fluid stream 651, depending upon the nature of the fluid streams and of the fluid treatment layer. From the standpoint of effectiveness of the fluid treatment element 600, the direction in which transfer takes place generally does not matter.

The fluid treatment layer can be selected based on the type of material transfer which it is desired to perform between the two fluid streams. One example of a suitable application of the fluid treatment element 600 is one in which one or both of the fluids streams is a solution, and the fluid treatment layer permits transfer of a solute (such as dissolved molecules, ions, or gases) between the two solutions without transfer of the solvent in which the solute is dissolved.

Figure 13:
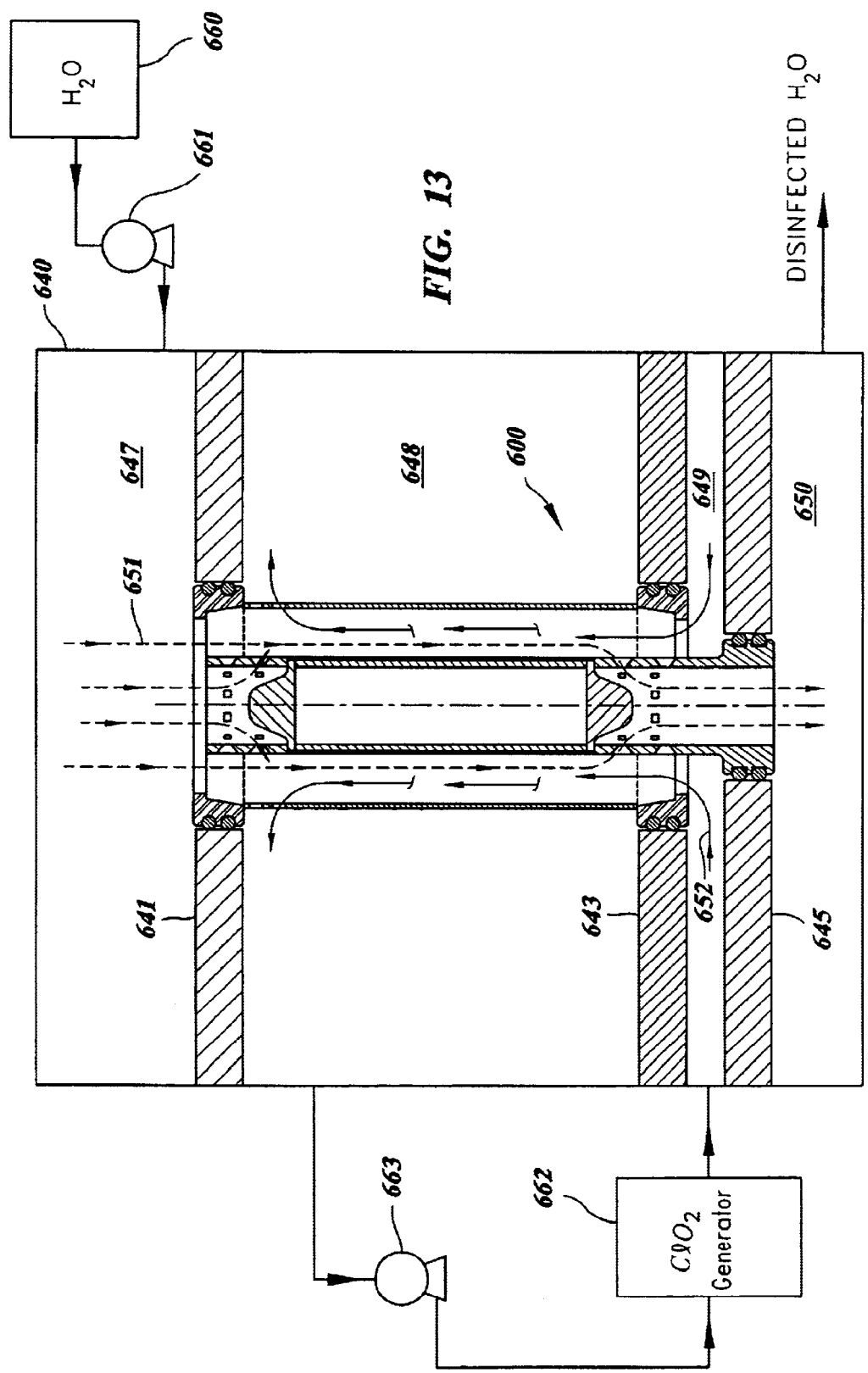
FIG. 13 is a block diagram of a system for disinfection of water employing the filter element of FIG. 12.

One application of significant economic importance in which the fluid treatment element 600 of FIG. 12 can be employed is in the disinfection of water using chlorine dioxide ($ClO_2$), which is an effective and rapid oxidant and biocide. FIG. 13 schematically illustrates an example of a system for disinfecting water using the fluid treatment element 600 of FIG. 12. A housing 640 containing the fluid treatment element 600 includes first through fourth chambers 647–650.

A first fluid stream 651 containing water to be disinfected is introduced by a pump 661 into the first chamber 647 of the housing 640 from a water source 660 (a tank, a reservoir, a water line, etc.), while a second fluid steam 652 comprising an aqueous solution of $ClO_2$ is introduced by a pump 663 into the third chamber 649 of the housing 640 from a $ClO_2$ generator 662. The fluid treatment clement 600 contains a fluid treatment layer comprising a fluid treatment medium which is permeable to dissolved $ClO_2$ but is impermeable to water at the operating pressures of the fluid treatment element 600. The $ClO_2$ can flow through the fluid treatment layer from the fluid stream having a higher concentration of $ClO_2$ to the fluid stream having a lower concentration. In the present embodiment, the second fluid stream 652 when introduced into the lower end of the fluid treatment element 600 has a higher concentration of $ClO_2$ than the first fluid stream 651 when the latter is introduced into the upper end of the fluid treatment element 600, so $ClO_2$ is transferred across the fluid treatment layer from the second fluid stream 652 to the first fluid stream 651, thereby disinfecting the latter.

The fluid treatment layer can be any type of fluid treatment medium permitting the transfer of $ClO_2$ between the two fluid streams while preventing the transfer of the water in which the $ClO_2$ is dissolved. One example of a suitable fluid treatment layer is a hydrophobic gas pore membrane having gas-filled pores through which gases (including $ClO_2$ dissolved in an aqueous solution can pass by pervaporation but through which water cannot pass. Such hydrophobic membranes, examples of which are described in U.S. Pat. No. 4,683,039 entitled "Membrane Pervaporation Process", can be made of various materials. Two examples of suitable, readily available materials are PTFE and PVDF.

The $ClO_2$ generator 662 can employ any of a variety of known processes for producing $ClO_2$. A type of $ClO_2$ generator which is particularly preferred because of its efficiency and ease of control is an electrolytic generator which performs electrochemical conversion of sodium chlorite into sodium dioxide. Such a $ClO_2$ generator is described in detail in International Publication No. WO 94/26670. The $ClO_2$ generator 662 will typically have a plurality of feed lines and discharge lines, but for simplicity of illustration, only a single discharge line leading from the $ClO_2$ generator 662 to the housing 640 and a single feed line leading from the housing 640 back to the $ClO_2$ generator 662 via pump 663 are shown in FIG. 13.

After the first fluid stream 651 passes through the fluid treatment element 600, it is introduced into the fourth chamber 650 of the housing 640. It is now enriched in $ClO_2$ and disinfected, so it can be removed from the housing 640 for its intended use, such as in a municipal water supply suitable for drinking water. The second fluid stream 652 is discharged from the fluid treatment element 600 into the second chamber 648. At this time, its level of $ClO_2$ has been depleted by transfer of $ClO_2$ to the first fluid stream 651, so the second fluid stream 652 is returned from the housing 640 to the $ClO_2$ generator 662 to have its level of $ClO_2$ increased, after which it is resupplied to the housing 640. However, the second fluid stream 652 may instead be discarded or otherwise used after being discharged from the housing 640.

Depending upon the nature of the $ClO_2$ generator 662, the second fluid stream 652 may contain chemicals which it is undesirable to introduce into the first fluid stream 6S1. For example, when the $ClO_2$ generator 662 is an electrolytic cell, the second fluid stream 652 may contain dissolved sodium chlorite ($NaClO_2$). However, because the sodium chlorite is not in gaseous form, it cannot pass through the fluid treatment layer, so the first fluid stream 651 remains uncontaminated by the sodium chlorite.

If the fluid treatment medium is permeable to a backwashing fluid, the fluid treatment element 600 may be cleaned by backwashing by introducing a backwashing fluid into one or more of the fluid chambers and forcing the backwashing fluid under pressure to flow through the fluid treatment medium into one or more of the fluid chambers together with particles dislodged from the fluid treatment medium by the backwashing fluid. For example, if backwashing fluid is introduced at the same pressure into both of chambers 647 and 650, the backwashing fluid will flow into the inner drainage layer through the perforated sections of the core 620. The backwashing fluid will then flow through the fluid treatment layer into the outer drainage layer and be discharged from the fluid treatment clement 600 into one of both of chambers 648 and 649, together with particles detached from the fluid treatment element by the backwashing fluid. Alternatively, backwashing fluid can be introduced into one or both of chambers 648 and 649 and discharged from the fluid treatment element 600 into one or both of chambers 647 and 650.

In situations in which the fluid treatment medium is not permeable to backwashing fluid, either side of the fluid treatment layer of the fluid treatment element 600 can be cleaned in a crossflow mode, either separately or at the same time. In order to clean the radially outer side of the fluid treatment layer, one or more suitable crossflow cleaning fluid can be passed through the outer drainage layer of the fluid treatment pack 610 one or more times from the third chamber 649 to the second chamber 648 to detach particles from the fluid treatment layer and discharge them into one of the chambers from which they can be drained. In order to clean the radially inner side of the fluid treatment layer, one or more suitable crossflow cleaning fluid can be passed through the inner drainage layer of the fluid treatment pack 610 one or more times from the first chamber 647 to the fourth chamber 650.

Figure 14:
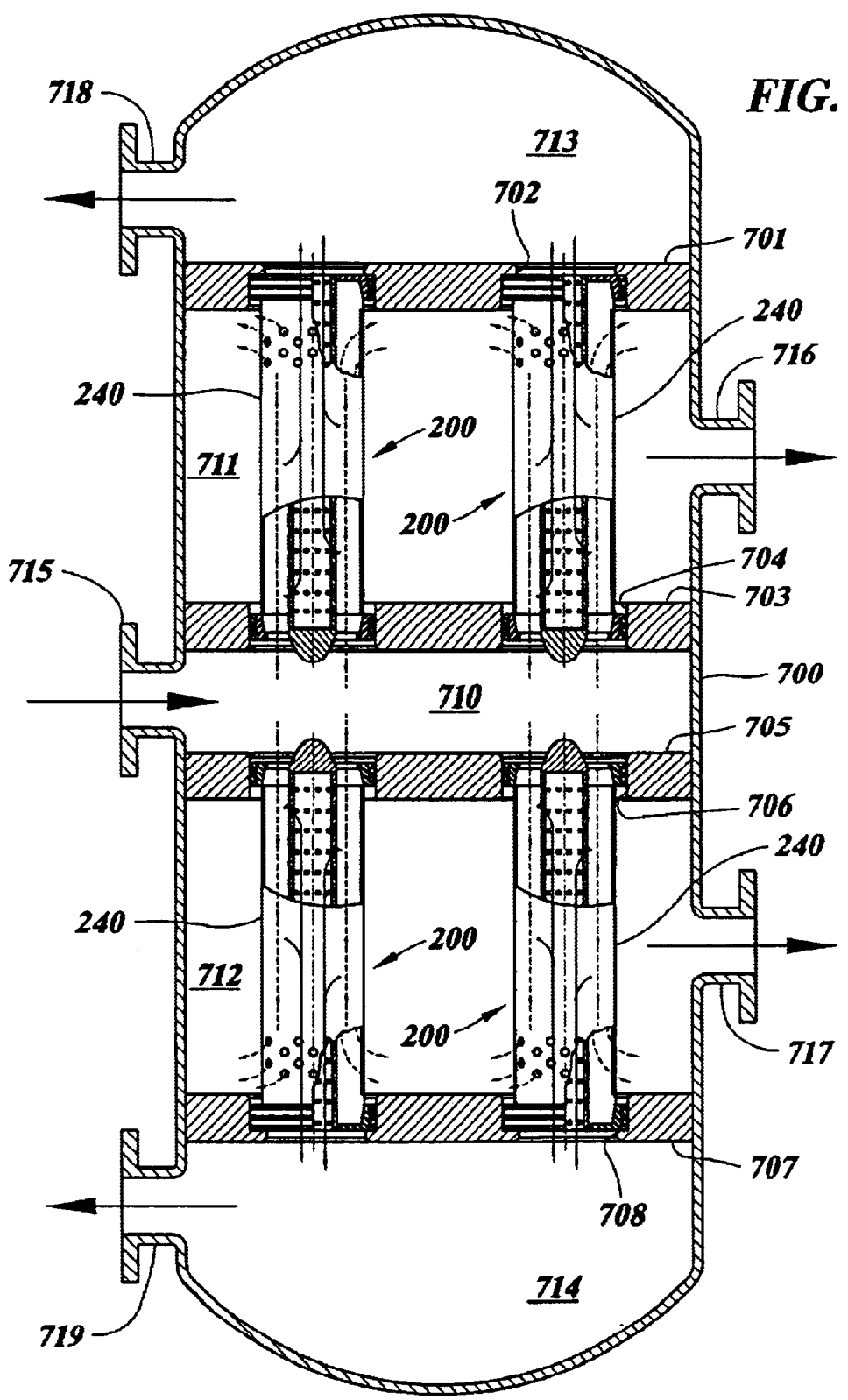
FIG. 14 is a schematic cross-sectional elevation of a housing equipped with a plurality of filter elements according to the present invention.

FIG. 14 illustrates an example of a filter assembly in which a plurality of filter elements according to the present invention are accommodated at a plurality of levels within a housing 700. The housing 700 includes four tube sheets 701, 703, 705, and 707 which divide the interior of the housing 700 into a process fluid chamber 710, a first retentate chamber 711, a second retentate chamber 712, a fast permeate chamber 713, and a second permeate chamber 714.

A process fluid port 715, a first retentate port 716, a second retentate port 717, a first permeate port 718, and a second permeate port 719 communicate between the exterior of the housing 700 and the process fluid chamber 710, the first retentate chamber 711, the second retentate chamber 712, the first permeate chamber 713, and the second permeate chamber 714, respectively. Each of the filter elements 200 is mounted on two of the tube sheets with one of its lengthwise ends communicating with the process fluid chamber 710, its other lengthwise end communicating with one of the permeate chambers 713 or 714, and with the portion of the filter element between its lengthwise ends disposed in one of the retentate chambers 711 or 712.

Each of the filter elements 200 may be of any type in which process fluid flows along the radially outer sides of the pleats and permeate flows along the radially inner sides of the pleats. In the illustrated embodiment, each of the filter elements 200 is identical to the filter element 200 illustrated in FIG. 6, so a detailed description of their structure will be omitted. Only four filter elements 200 are illustrated in this Figure with two filter elements 200 mounted on each tube sheet, but there is no restriction on the number of filter elements 200 mounted on each tube sheet, and there need not be the same number of filter elements 200 in each retentate chamber.

The housing 700 may include a plurality of detachable sections which enable the housing 700 to be opened and closed to permit the installation and removal of the filter elements 200. For example, the housing 700 may have two sections which are detachably joined to each other between the second and third tube sheets 703 and 705. When the sections are separated from each other, the filter elements 200 can be inserted into openings 704 and 706 in the second and third tube sheets 703 and 705 until the ends of the filter elements 200 abut against ledges formed in corresponding openings 702 and 708 in the first and fourth tube sheets 701 and 707. However, the housing 700 may be divided into more than two sections. For example, it may have three sections which are detachable from each other such that the filter elements 200 can be inserted into the tube sheets from the permeate chamber sides of tube sheets 701 and 707.

In order to perform crossflow filtration with this arrangement, with all of fluid ports 715–719 open, a process fluid is introduced into the process fluid chamber 710 and flows through the openings 704 and 706 in the second and third tube sheets 703 and 705, through a lengthwise end face of the filter pack of each filter element 200, and into the outer drainage layer of each filter element 200. The process fluid flows within the outer drainage layer in the lengthwise direction of each filter element 200 towards the lengthwise end of the filter element 200 remote from the process fluid chamber 710, creating a fluid shear force on the radially outer side of the filter layer which slows the build-up of particles on the radially outer side. At the same time, a portion of the process fluid passes through the filter layer of the filter element 200 and into the inner drainage layer to become permeate.

The permeate then flows through the inner drainage layer into the interior of the perforated core and then flows in the lengthwise direction of the core to exit from a lengthwise end of the filter element 200 into one of the permeate chambers 713 and 714 and is discharged from the housing 700 through the corresponding permeate port 718 or 719. The portion of the process fluid which does not pass through the filter layer is discharged from the filter element 200 as retentate through the perforations in the tube 240, flows into one of the retentate chambers 711 or 712, and then is discharged from the housing 700 through the corresponding retentate outlet 716 or 717.

In order to perform dead end filtration with the arrangement of FIG. 14, fluid ports 715, 718, and 719 arm opened and fluid ports 716 and 717 are closed. In this state, a process fluid is introduced into the process fluid chamber 710 and flows into the outer drainage layer of each filter element 200 in the same manner as during crossflow filtration. Since fluid ports 716 and 717 are closed, all of the process fluid in the outer drainage layers flows through the filter layers into the inner drainage layers to become filtrate, and from the inner drainage layers, the filtrate flows into the cores and then exits through the open ends of the cores into one of the permeate chambers 713 or 714.

The filter elements 200 can be backwashed by introducing a suitable backwashing fluid into the permeate chambers 713 and 714 through the permeate ports 718 and 719. The backwashing fluid flows under pressure into the cores of the filter elements 200 and then flows radially outward through the perforations in the cores into the inner drainage layers. It then flows radially outward from the inner drainage layers through the filter layers into the outer drainage layers. As the backwashing fluid flows through the filter layers, it dislodges particles within the filter layers or adhering to the radially outer sides thereof.

The backwashing fluid and dislodged particles then flow axially through the outer drainage layer into the process fluid chamber 710 through a lengthwise end face of each filter element 200 and/or into the retentate chambers 711 or 712 through the perforations formed in the tubes 240. If desired, the process fluid inlet 715 can be closed off to prevent backwashing fluid from flowing into the process fluid chamber 710, or one or both of the retentate outlets 716 or 717 can be closed off to prevent fluid from flowing into one or both of the retentate chambers 711 or 712.

The filter elements 200 can also be cleaned in a crossflow mode. In this mode of operation, one or more suitable crossflow cleaning fluid is passed through the outer drainage layer of the filter pack of each filter element one or more times from the process fluid chamber 710 to one or both retentate chambers 711 and 712 or in the opposite direction to detach particles from the filter layers and discharge them from the filter elements 200 into one or more of the chambers, from which the particles can be drained together with the cleaning fluid. If one of the retentate ports 716, 717 is open and the other is closed during crossflow cleaning, the filter elements 200 in just one of the retentate chambers 711, 712 can be cleaned. When the cleaning fluid is being passed through a filter element 200, the interior of the core 220 of the filter element 200 and the permeate chamber 713 or 714 with which the core 220 communicates are preferably maintained at a pressure equal to or higher than that within the outer drainage layer of the filter pack of the filter element 200 to enhance the effectiveness of the crossflow in the outer drainage layer.

Flow of fluid through the housing 700 is not restricted to the directions described above, and the various chambers of the housing 700 are not restricted to the functions described above. For example, process fluid could be introduced into chambers 711 and 712 of the housing 700 instead of into the middle chamber 710, and retentate could then be removed from the housing 700 via the middle chamber 710, with permeate still flowing into chambers 713 and 714. Alternatively, if the filter elements 200 are replaced with ones like those shown in FIGS. 1 or 4, for example, in which process fluid flows along the radially inner sides of a filter layer, chambers 711 and 712 can serve as permeate chambers, chamber 710 can serve as a process fluid chamber or a retentate chamber, and chambers 713 and 714 can serve as retentate chambers or process fluid chambers. Thus, depending upon the structure of the filter elements and the desired direction of flow between the chambers, any one of the chambers can function as a process fluid chamber, a retentate chamber, or a permeate chamber.

Because the filter elements 200 in the arrangement of FIG. 14 are accommodated at a plurality of levels within the housing 700 on a plurality of tube sheets, the housing 700 has a smaller diameter and is more economical to manufacture than a housing which accommodates the same number of identical filter elements at a single level on a single tube sheet Furthermore, the length of the filter elements can be maintained sufficiently small that they can undergo crossflow effectively, yet at the same time they can make efficient use of the volume of the housing 700.

Figure 15:
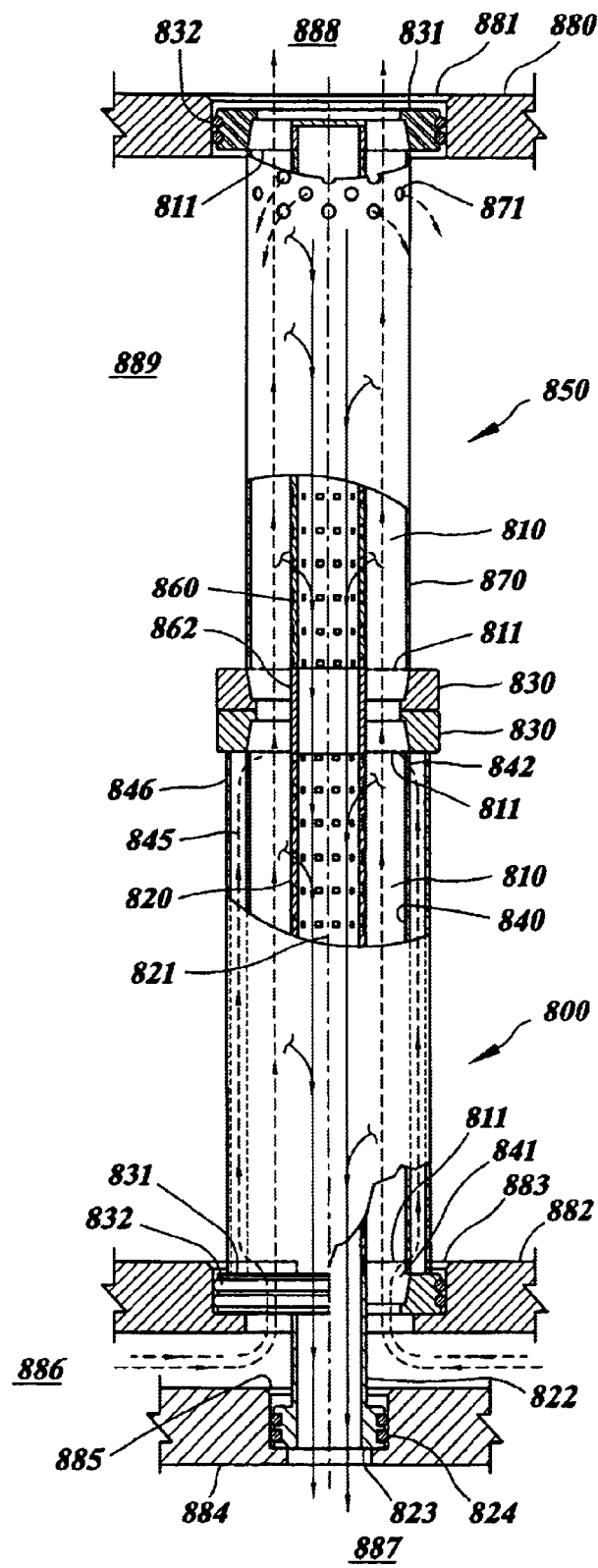
FIG. 15 is a cut-away elevation of a filter arrangement having a plurality of filter elements according to the present invention connected in series.

FIG. 15 illustrates another arrangement in which a plurality of filter elements according to the present invention can be connected in series and in which the resistance to flow through each filter element can be maintained at a sufficiently low level to achieve effective crossflow velocities. Although only two filter elements 800 and 850 are shown, a larger number of filter elements may be connected together in series in the same manner. The filter elements are shown installed in a housing similar to that illustrated in FIG. 12 including three tube sheets 880, 882, 884 which partition the interior of the housing into a process fluid chamber 886, a permeate chamber 887, a fist retentate chamber 888, and a second retentate chamber 889. Each of the chambers is equipped with an unillustrated fluid port providing fluid communication between the interior of the chamber and the exterior of the housing.

FIG. 15 shows only a single series of filter elements, but a plurality of such series can be installed in the housing in the illustrated manner. At least the filter element 800 located closest to the process fluid chamber 886 (the lower filter element in FIG. 15) is constructed such that a portion of the process fluid which enters it bypasses the filter pack of filter element 800 so that the process fluid can be supplied to one or more subsequent filter elements 850 in the series with greater energy than if the process fluid passed through the filter pack of filter element 800.

The lower filter element 800 includes a pleated filter pack 810, and it may include a perforated core 820 which is surrounded by the filter pack 810 and is open at both lengthwise ends so that fluid can enter the upper end of the core 820 from,the upper filter demerit 850 and can be discharged from the lower end of the core 820 into the permeate chamber 820. It may further include an upper end cap 830 which is adapted to be connected in series with the lower end of the upper filter element 850 and a lower end cap 831 which is adapted to be fluidly connected to an opening 883 in the second tube sheet 882.

The upper filter element 850 likewise includes a pleated filter pack 810 and a perforated core 860 which is surrounded by the filter pack 810. The upper end of core 860 is closed off, while its lower end is open so that it can fluidly communicate with the upper end of the core 820 of the lower filter element 800. The upper filter element 850 is equipped with a lower end cap 830 which is adapted to be connected in series with the upper end of the lower filter element 800 and an upper end cap 831 which is adapted to be fluidly connected to an opening 831 in the first tube sheet 880.

Each filter pack 810 may have any of the structures described with respect to the preceding embodiments. For example, it may comprise a three-layer composite of an inner drainage layer, a filter layer, and an outer drainage layer ford into axially extending pleats which are maintained in a laid-over state by an unillustrated helical wrap member. During filtration, process fluid is intended to flow through the outer drainage layer while permeate is intended to flow through the inner drainage layer, and process fluid or retentate is intended to be able to pass through each lengthwise end face of the filter packs. Therefore, at each lengthwise end of the filter elements, the pleats are sealed off on the radially inner sides of the filter layer and are open on the radially outer sides of the filter layer to enable fluid to flow through the lengthwise end face of the filter pack into or out of the outer drainage layer but not into or out of the inner drainage layer. The pleats may be sealed off in any suitable manner. In this embodiment, the pleats are sealed off by a sealing strip 811, similar to the sealing strip 215 of FIG. 7, disposed on the radially inner side of the inner drainage layer at each lengthwise end of the filter pack 810.

The core 810 of the lower filter element 800 comprises a hollow tube with a perforated section 821 through which permeate can enter the center of the core 820 from the filter pack 810 and a non-perforated section 822 which extends through the lower end cap 831 to the exterior of the filter pack 810. The lower end of the non-perforated section 822 can be fluidly connected with the third tube sheet 884 in any suitable manner. For example, it may have a flange 823 at its lower end which is equipped with one or more sealing members 824, such as sealing rings, which form a piston seal against the inner surface of a hole 885 in the third tube sheet 884.

The lower end cap 831 of the lower filter element 800 and the upper end cap 831 of the upper filter element 850, which may be the same or different from each other, may have any structure which enables them to be connected to the openings 881 and 883 in the corresponding tube sheets 880 and 882. For example, they may have a structure similar to that of die end caps of the embodiment of FIG. 1, with each end cap 831 equipped with one or more sealing members 832 such as O-rings for forming a piston seal against the interior of one of the openings 881 and 883. The other end caps 830 may have any structure such that fluid can flow through two adjoining end caps 830 between the two filter elements 800 and 850 without leaking into the retentate chamber 889. In the present embodiment, end caps 830 are similar in structure to end caps 831 but are not equipped with sealing members. Adjoining end caps 830 are directly joined and sealed to each other by melt bonding. However, any other ways of fluidly connecting them to each other can be employed, such as the various methods described with respect to end caps 535 of FIG. 11, with or without rigidly secured the adjoining filter elements to each other.

The upper end of the core 820 of the lower filter element 800 and the lower end of the core 860 of the upper filter element 850 are fluidly connected to each other in any manner such that permeate can flow from core 860 into core 810 while remaining isolated from process fluid flowing from the lower filter element 800 into the upper filter element 850. For example, the opposing ends of the cores 820 and 860 can be directly bonded or otherwise joined to each other, or a connecting member can be used to interconnect them. In this embodiment, the opposing ends of the cores 820 and 860 are set back from the lengthwise end faces of the filter packs 810, and a tube 862 having a non-perforated wall is inserted into the opposing end faces of the filter packs 810 so that permeate can flow between the two cores through the tube 862. The sealing strips 811 in the filter packs 810 form a seal against the outer surface of the tube 862 and prevent permeate from flowing between the outer surface of the tube 862 and the inner periphery of the filter pack 810.

Each filter pack 810 is surrounded by a member which is impermeable to the process fluid and which confines the process fluid to the filter pack 810 until the process fluid has passed over a significant length of the filter pack 810. In the present embodiment, the impermeable members comprise a rigid tube 840 disposed around the filter pack 810 of the lower filter element 800 and a rigid tube 870 disposed around the filter pack 810 of the upper filter element 800, but they may have other forms, such as that of a flexible sleeve or wrap member of an impermeable material. Tube 840 of the lower filter element 800 may but need not be secured the end caps 830 and 831. Tube 870 of the upper filter element 850 is sealed to the lower end cap 830, while at its upper lengthwise end, process fluid can flow from the interior of tube 870 into the retentate chamber 889 via one or more perforations 871 or other openings in tube 870 or through gaps between tube 870 and the upper end cap 831.

The lower filter element 800 includes a bypass passage 845 through which process fluid can flow to reach the filter pack 810 of the upper filter element 850 while largely or entirely bypassing the filter pack 810 of the lower filter element 800. In the present embodiment, the bypass passage 845 is defined by a generally cylindrical space between the outer periphery of tube 840 and a bypass tube 846 which surrounds tube 840 and is separated from tube 840 by a radial gap. The bypass tube 846, which can be made of any material impervious to the process fluid, is sealed at its lengthwise ends to the end caps of the lower filter element 800. The size of the radial gap between tube 840 and the bypass tube 846 can be selected based on the desired flow rate through the bypass passage 845 but is preferably such that the bypass passage 845 provides less resistance to flow in the lengthwise direction of the filter element 800 than does the filter pack 810 of the lower filter element 800.

Process fluid can enter the bypass passage 845 at the lower end of the lower filter element 800 by flowing through openings 841 (such as perforations) in tube 840, through a gap between the lower end of tube 840 and the lower end cap 831, through a passage formed through the lower end cap 831, or along any other suitable route, while it can flow out of the bypass passage 845 at the upper end of the lower filter element 800 through openings 842 such as perforations in tube 840, through a gap between tube 842 and the upper end cap 830, through a passage formed through the upper end cap 830, or along a different route. At the upper end of the lower filter element 800, the process fluid which passed through the bypass passage 845 is combined with the retentate which passed through the outer drainage layer of the filter pack 810 of the lower filter element 800, and the combined fluid is introduced into the filter pack 810 of the upper filter element 850 as process fluid. At the upper end of the upper filter element 850, retentate is discharged both through the openings 871 at the upper end of tube 870 and through the lengthwise end face of the filter pack 810.

Alternatively, the openings 871 in tube 870 can be omitted and all the retentate can flow through the upper lengthwise end face of the filter pack 810, or the lengthwise end face of the filter pack 810 may be sealed off and all the retentate may be discharged from the upper filter element 850 through the openings 871 in tube 870. Because of the bypass passage 845, the overall resistance to flow through the filter elements is decreased, so process fluid can be supplied to the upper filter element 850 with more energy than if two identical filter elements were connected in series and all process fluid which had passed through the filter pack 810 of the upper filter element had already passed through the filter pack 810 of the lower filter element.

The arrangement of FIG. 15 can perform filtration in either a crossflow mode or a dead end mode. During crossflow filtration, with the fluid ports for each of chambers 886–889 open, process fluid is introduced into the series of filter elements from the process fluid chamber 886 through the lower lengthwise end face of the filter pack 810 of the filter element 800 closest to the process fluid chamber 886. The inner drainage layer of the filter pack 810 is sealed off at its lower lengthwise end by a sealing strip 811 but the outer drainage layer is not, so the process fluid flows into the outer drainage layer at the lower lengthwise end of filter element 800. A portion of the process fluid flows within the outer drainage layer in the lengthwise direction of the filter element, while the remainder of the process fluid flows through the perforations 841 at the lower end of tube 840 and into the bypass passage 845 between tube 840 and bypass tube 846.

The process fluid flowing through the outer drainage layer generates a fluid shear force on the radially outer surface of the filter layer which inhibits the build-up of particles on that surface. A portion of the process fluid flowing through the outer drainage layer flows through the filter layer into the inner drainage layer to become permeate. The permeate flows inside the inner drainage layer into the core 820 and then flows downwards along the interior of the core 820 in the lengthwise direction of the core 820 into the permeate chamber 887. The portion of the process fluid flowing through the outer drainage layer which does not pass through the filter layer becomes retentate.

The process fluid flowing through the bypass passage 845 flows through the openings 842 at the upper end of tube 840 and flows into the outer drainage layer of the filter pack 810 of the lower filter element 800. There, it is combined with the retentate which flowed over the length of the filter pack 810 of the lower filter element 800, and the two fluid streams are together discharged from the lower filter element 800 through the upper lengthwise end face of the filter pack 810 and flow into the inner drainage layer of the filter pack 810 of the upper filter element 850 as process fluid. In the upper filter element 850, the process fluid flows in the outer drainage layer in the lengthwise direction of the filter element 850 to generate a fluid shear force on the radially outer side of the filter layer which inhibits the build-up of particles on the filter layer.

A portion of the process fluid passes through the filter layer and into the core 860 to become permeate, while the remainder of the process fluid is discharged as retentate from the upper end of the upper filter element 850, either through the upper lengthwise end face of the filter pack 810 into the first retentate chamber 888 or through the openings 871 in tube 870 of the upper filter element 850 into the second retentate chamber 889. The permeate which enters the core 860 of the upper filter element 850 flows in the lengthwise direction of the core 860 into the core 820 of the lower filter element 800 and then is discharged from the lower end of core 820 into the permeate chamber 887.

In order to perform dead end filtration, the fluid ports for chambers 886 and 887 are opened, and those for chambers 888 and 889 are closed. In this state, process fluid is introduced into the series of filter elements from the process fluid chamber 886 in the same manner as during crossflow filtration and flows into the outer drainage layer of each filter element. As the fluid ports for chambers 888 and 889 are closed, all of the process fluid fin the outer drainage layers flows through the filter layers into the inner drainage layers to become filtrate and from the inner drainage layers, the filtrate flows into the cores 820 and 860 and then flows down the length of both cores to be discharged into the permeate chamber 887.

The filter elements 800, 850 can be backwashed by introducing a backwashing fluid into the permeate chamber 887. The backwashing fluid is forced under pressure from the permeate chamber 887 into the cores 820 and 860 of both filter elements and is forced radially outward through the perforations in the cores into the inner drainage layers of the filter packs 810. The backwashing fluid then passes in succession through the inner drainage layers and the filter layers into the outer drainage layers, in the process of which it dislodges particles embedded in or adhering to the filter layers. The backwashing fluid and entrained particles then flow in the lengthwise direction of the filter packs 810 through the outer drainage layers and are discharged from the filter elements into one or more of the process fluid chamber 886, the first retentate chamber 888, and the second retentate chamber 889. In addition to passing through the outer drainage layer of the lower filter element 800, a portion of the backwashing fluid may flow through the bypass passage 845 into the process fluid chamber 886, depending upon the resistance to flow through the various flow paths.

The filter element 800, 850 can also be cleaned in a crossflow mode. In crossflow cleaning, one or more suitable crossflow cleaning fluid is passed through the inner drainage layer of the filter pack 810 of each filter element one or more times from the process fluid chamber 886 to one or both of the retentate chambers 888, 889 or in the opposite direction to detach particles from the filter layers and discharge then from the filter elements into one or more of the chambers, from which the particles and the cleaning fluid can be drained. The cleaning fluid will flow through the filter elements along the same path as taken by process fluid during crossflow filtration.

Thus, in the lower filter element 800, a portion of the cleaning fluid will flow through the outer drainage layer of the filter element 800, while the remainder will flow through the bypass passage 845. Since the latter has a lower resistance to flow than the outer drainage layer, the velocity of the cleaning fluid can be maintained higher than if all the cleaning fluid passed through the outer drainage layer, resulting in the cleaning fluid being able to more effectively perform crossflow cleaning of the filter elements. When the cleaning fluid is being passed through the filter elements, the permeate chamber 887 and the interior of each core of the filter elements are preferably maintained at a pressure equal to or higher than that within the outer drainage layer of the filter packs 810 to enhance the effectiveness of the crossflow in the outer drainage layer.

In an arrangement having more than two filter elements connected in series, there may be a plurality of filter elements having a bypass page 845. Namely, a plurality of filter elements closest to the process fluid chamber 886 may be equipped with a bypass passage 845 like that of the lower filter element 800 of FIG. 15, while the remaining filter element in the series may be without a bypass passage, like the upper filter element 850 of FIG. 15.

As in the arrangement of FIG. 11, the arrangement of FIG. 15 can achieve spatial efficiencies like those obtained with a long filter element or a series of filter elements, thus making it possible to minimize the diameter of a housing containing a large number of filter elements while still maintaining effective crossflow velocities in the filter elements.

Figure 16:
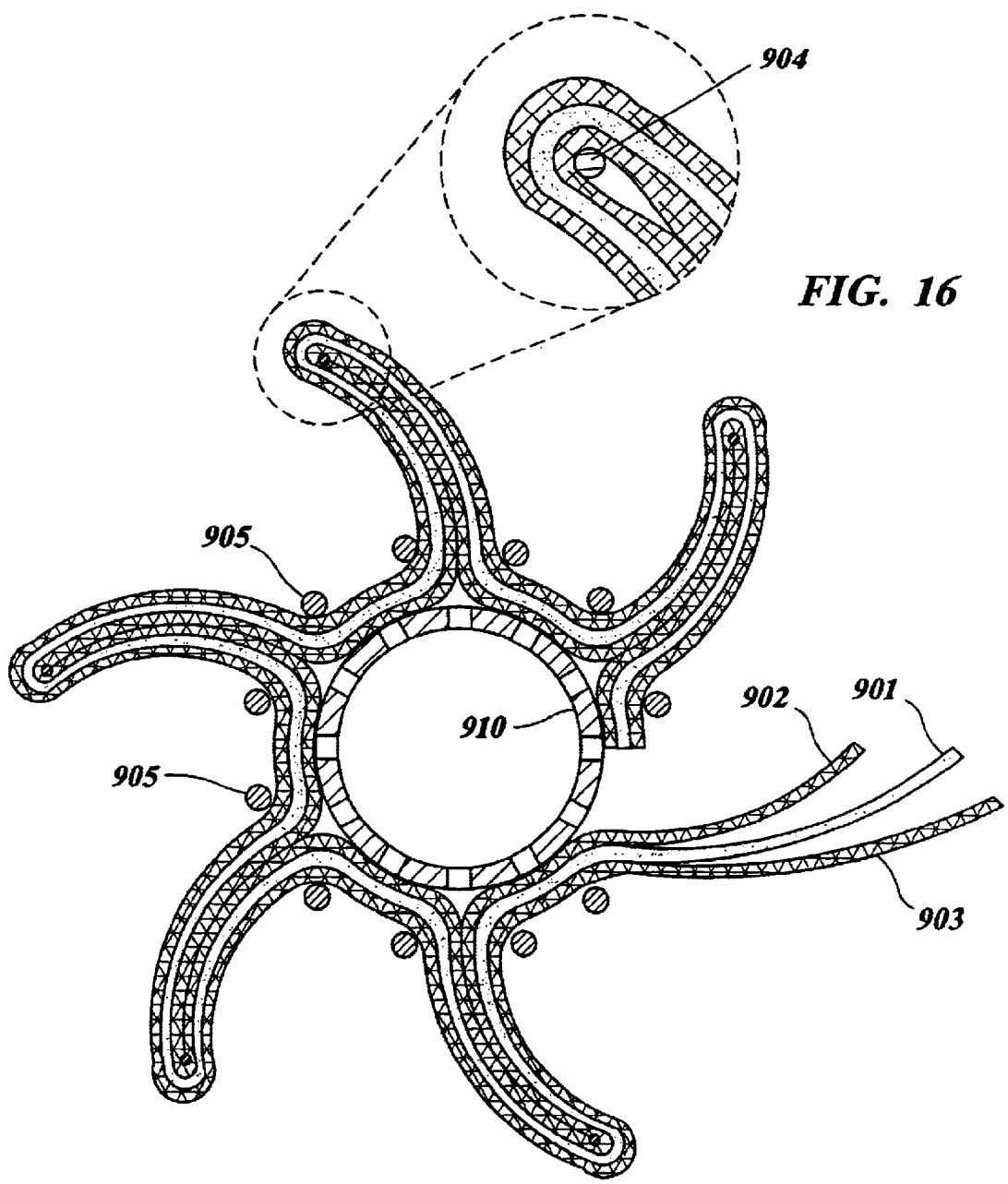
FIG. 16 is a transverse cross-sectional view of a filter pack which can be employed in a filter element according to the present invention in a partially assembled state.
Figure 17:
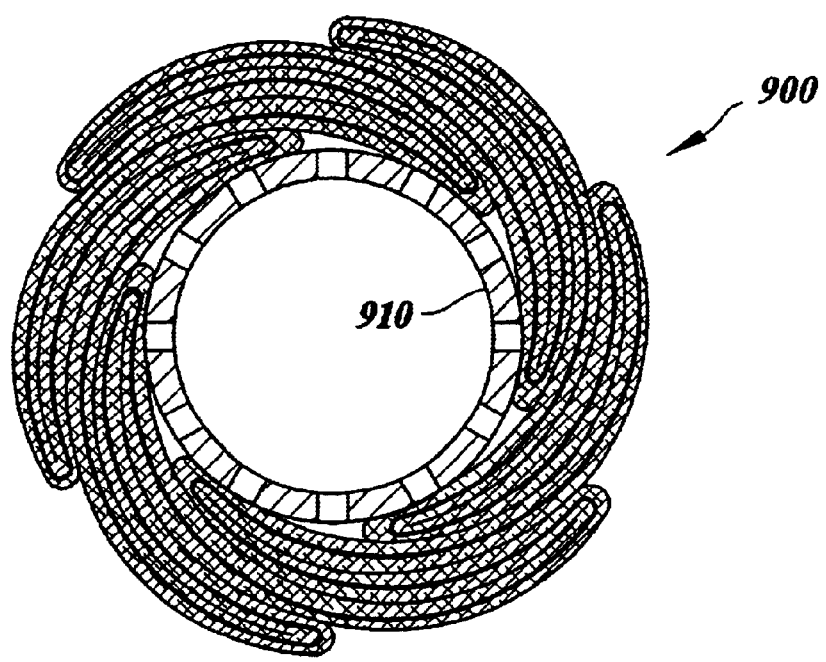
FIG. 17 is a transverse cross-sectional view of the filter pack of FIG. 16 in an assembled state.

FIGS. 16 and 17 are transverse cross-sectional views of another example of a pleated filter pack 900 which can be employed in a filter element according to the present invention. FIG. 16 shows the filter pack 900 in a partially assembled state, and FIG. 17 shows the filter pack 900 in an assembled state. Like the previous filter packs, such as the filter pack 20 shown in FIG. 2, the filter pack 900 comprises a multi-layer composite including a filter layer 901, an inner drainage layer 902, and an outer drainage layer 903 disposed on the opposite side of the filter layer 901 from the inner drainage layer 902. As in the embodiment of FIG. 1, the composite may include various additional layers, such as cushioning layers. The layers 901–903 may be formed of any suitable materials, such as those described with respect to the embodiment of FIG. 2. In the previous filter packs including the filter pack 20 illustrated in FIG. 2, the radially inner ends, i.e., the roots, of the pleats of the filter pack 20 are placed as close together as possible, and preferably each of the plurality of roots abuts the adjacent roots. However, in the filter pack 900 of FIGS. 16 and 17, there is a larger separation between the radially inner ends of the pleats, i.e., the roots are spaced from one another. This results in one leg of each pleat contacting a leg of an adjoining pleat over a smaller percentage of its height compared to the filter pack 20 shown in FIG. 2, but the overall structure of the filter pack 900 is the same as for the filter pack 20 shown in FIG. 2. The filter pack 900 is shown installed around a perforated core 910, but it may be used with any of the other types of cores described with respect to the preceding embodiments. Further, the filter pack 900 may be used with any of the previous sealing strips, end caps, retaining members, outer tubes, and/or housings.

The filter pack 900 can be formed into axially extending pleats either before or after it is disposed around the core 910. FIG. 16 illustrates the filter pack 900 being formed into pleats around the core 910. One example of a method of forming a filter pack into pleats in this manner which can be employed in the present invention is described in detail in U.S. Pat. No. 3,386,5 83. Briefly, in this method, the three-layer composite comprising layers 901–903 is passed around a plurality of elongated rods 904, 905 detachably mounted on an unillustrated frame and extending in the lengthwise direction of the core 910. The rods include a group of outer rods 904 spaced a distance from the core 910 and a group of inner rods 905 disposed closer to the core 910 than the outer rods 904. The composite is passed around the radially outer sides of the outer rods 904 so that each of the outer rods 904 is located inside the peak of one of the pleats, while the composite is passed between the exterior of the core 910 and each of the inner rods 905 so that the composite is held against the core 910 by the inner rods 905. After the two ends of the composite have been sealed to each other over the length of the filter pack 900 to form a side seal, the outer rods 904 are displaced in the circumferential direction of the core 910 to lay the pleats over, i.e., to displace the radially outer end of each pleat with respect to its radially inner end in the circumferential direction of the core 910 until each pleat is pressed against an adjoining pleat.

A retaining member, such as a helical wrap member, is then disposed around the filter pack 900 to maintain the pleats in a laid-over state. The rods 904, 905 can then be withdrawn from the filter pack 900, after which the filter pack 900 appears as shown in FIG. 17, with the retaining member omitted for each of illustration. If suitable for the application, all or a portion of the lengthwise end faces of the filter pack 900 can be sealed by any of the methods described with respect to the previous embodiments to prevent fluid from flowing through the lengthwise end faces or to allow it to flow into or out of only one of the drainage layers. The filter pack 900 can be used in any of the above-described embodiments of the present invention in place of many of the previous filter packs including a filter pack 20 like that shown in FIG. 2, so a detailed explanation of filtering using this filter pack 900 or cleaning of the filter pack 900 will be omitted.

Figure 18:
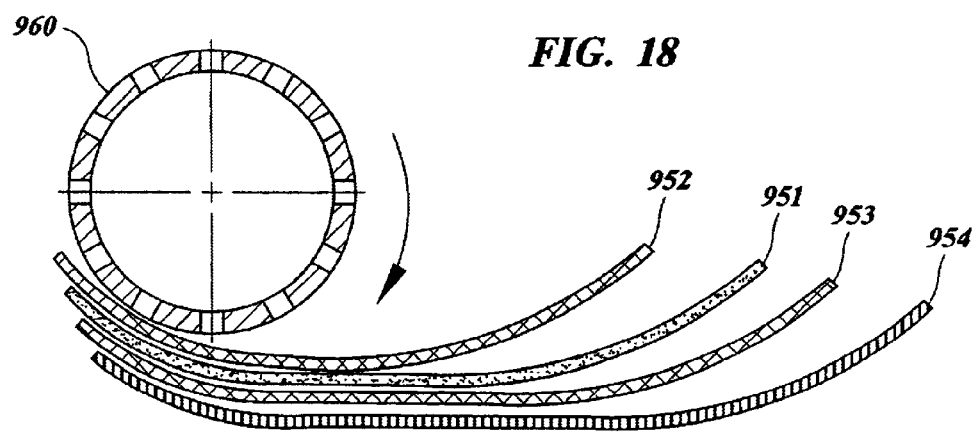
FIG. 18 is a transverse cross-sectional view of another example of a filter pack which can be employed in a filter element according to the present invention in a partially assembled state.
Figure 19:
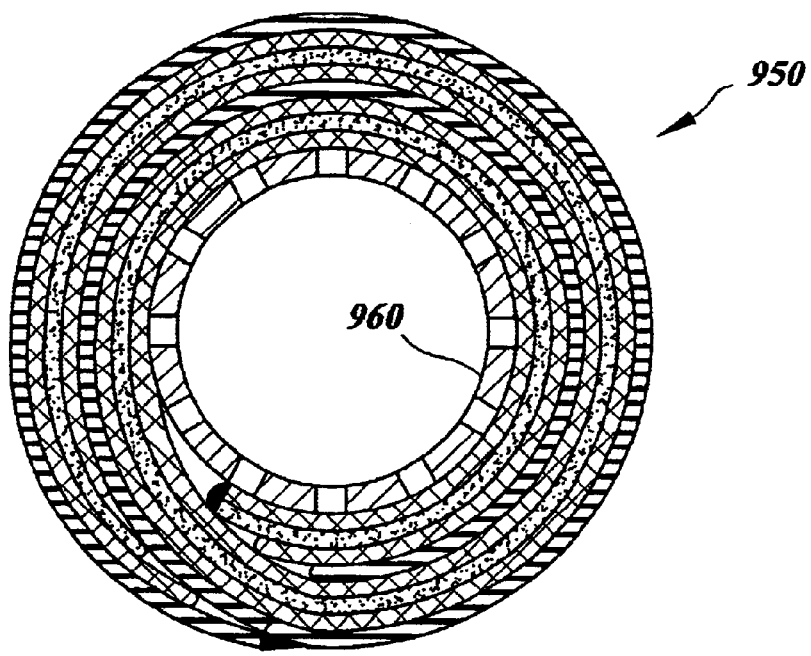
FIG. 19 is a transverse cross-sectional view of the filter pack of FIG. 18 in an assembled state.

FIGS. 18 and 19 are transverse cross-sectional views of another example of a filter pack 950 which can be used in a filter element according to the present invention with the sealing strips, cores, end caps, retaining members, outer tubes and/or housing of any of the previous embodiments. FIG. 18 shows the filter pack 950 in a partially assembled state, and FIG. 19 shows the filter pack 950 in an assembled state. In contrast to the filter packs of the previous embodiments, which are pleated, this filter pack 950 is a spirally wound filter pack having a plurality of layers which are wrapped spirally around a core 960 one or more times. The filter pack 950 comprises a multi-layer composite including a filter layer 951, an inner drainage layer 951 on the radially inner side of the filter layer 951, and an outer drainage layer 952 on the radially outer side of the filter layer 951.

If layers 951–953 are to be wrapped around the core 960 more than one time, the composite further includes a separating layer 954 which separates the inner drainage layer 952 from the outer drainage layer 953 and prevents fluid from flowing directly from one of the drainage layers to the other and bypassing the filter layer 951. The separating layer 954 may be made of a material which is impervious to the fluids passing through the drainage layers, or it may be made of a material which has properties similar to the filter layer 951 so that even though fluids may flow through the separating layer 954, substances which are intended to be removed by the filter layer 951 cannot pass through the separating layer 954 between the two drainage layers 952, 953. The filter layer 951 and the drainage layers 952, 953 may have the same properties as described with respect to the corresponding layers of the preceding embodiment. The composite may also include cushioning layers or various other suitable layers. The layers forming the filter pack 950 can be wrapped around the core 960 any desired number of tunes. The layers can be prevented from unwinding by securing the separating layer 954 to itself at its outer end.

Alternatively, a retaining member, such as a helical wrap member, may be disposed around the wrapped layers. If necessary, all or a portion of the lengthwise end faces of the filter pack 950 can be sealed by any of the methods described with respect to a pleated filter pack to prevent fluid from flowing through the lengthwise end faces or to allow it to flow into or out of only one of the drainage layers. A spiral wound filter pack can in general be employed in any of the embodiments of the filter according to the present invention in place of a pleated filter pack, with the filter layer 951 and the drainage layers 952, 953 of a spiral wound filter pack performing the same functions as the corresponding layers in a pleated filter pack. Thus, a spiral wound filter pack can be used to perform both crossflow filtration and dead end filtration, and the filter pack can be cleaned by backwashing or by crossflow cleaning.

Figure 20:
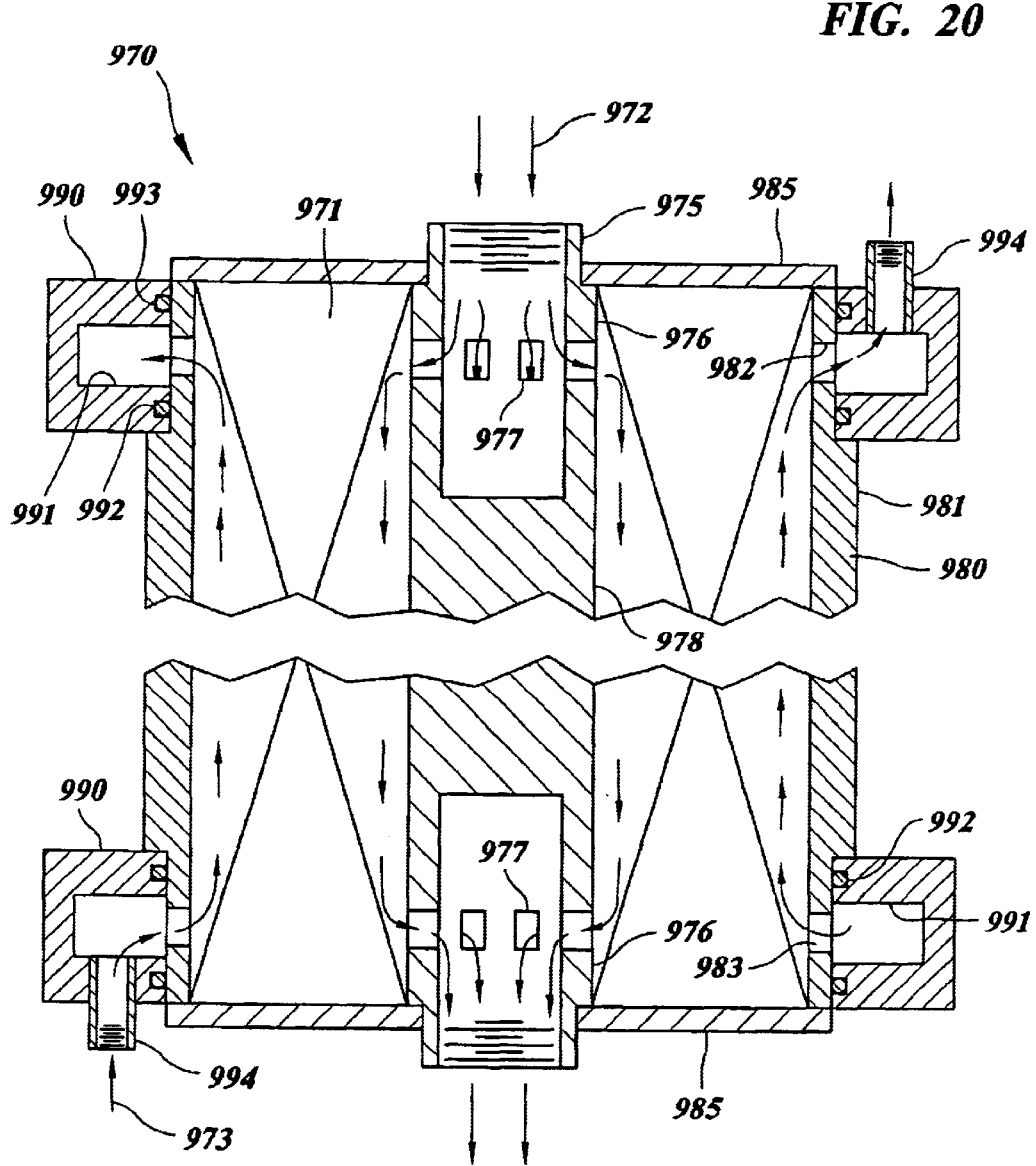
FIG. 20 is a cross-sectional elevation of another embodiment of a filter element according to the present invention.
Figure 21:
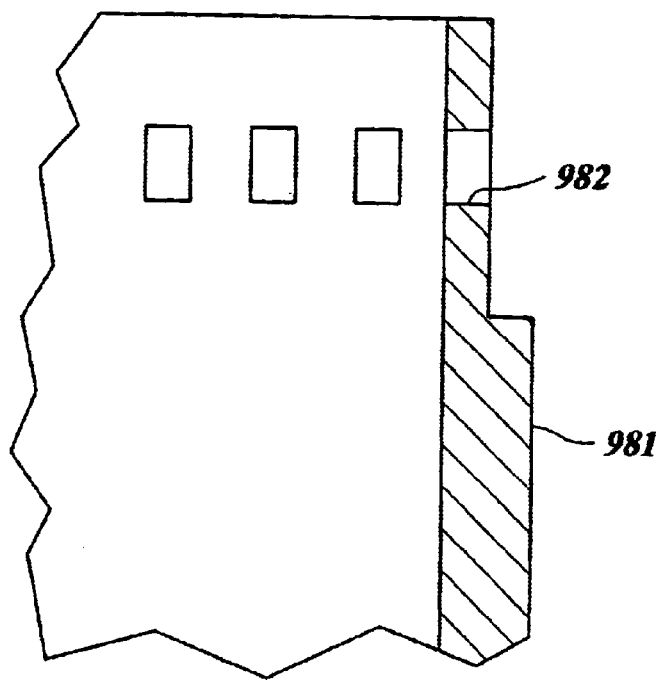
FIG. 21 is a cross-sectional elevation of a portion of the outer wall of the casing of the filter element of FIG. 20.
Figure 22:
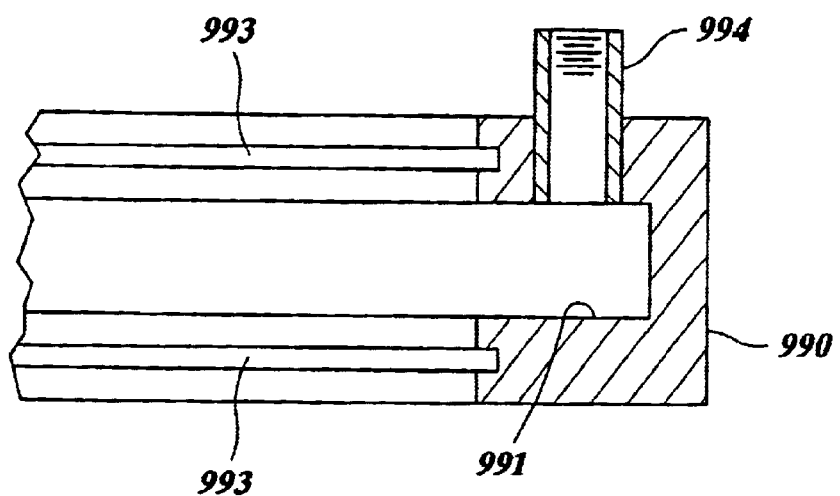
FIG. 22 is a cross-sectional elevation of a portion of one of the manifolds of the filter element of FIG. 20.

FIGS. 20–22 illustrate another embodiment of a fluid treatment element 970 according to the present invention. The fluid treatment element 970 is shown being used for material transfer between two fluid streams 972, 973 in the manner described with respect to FIGS. 12 and 13, but the fluid treatment element 970 can also be used for any of the types of fluid treatment described with respect to the other embodiments, such as dead end filtration or crossflow filtration to remove particles from a fluid.

As shown in FIG. 20, which is a cross-sectional elevation, the fluid treatment element 970 includes a pleated fluid treatment pack 971, a core 975 surrounded by the fluid treatment pack 971, and a casing 980 which surrounds the fluid treatment pack 971 and isolates the fluid treatment pack 971 from the environment so that fluid can enter or leave the fluid treatment element 970 only through certain openings in the casing 980.

The fluid treatment pack 971 may be configured in any of the ways described with respect to the preceding embodiments. For example, it may comprise a multi-layer composite including an inner drainage layer, a fluid treatment layer, and an outer drainage layer formed into axially extending pleats or spirally wound around the core 975. When the fluid treatment pack 971 is pleated, the pleats may be radial pleats having spaces between adjoining pleats, but more preferably the pleats are pressed against each other. For example, the pleats may be in a laid-over state and configured as shown in FIG. 2. When the pleats are laid-over, the fluid treatment pack 971 may be surrounded by an unillustrated helical wrap member for maintaining a laid-over state.

Like the core 620 of the embodiment of FIG. 12, the core 975 of FIG. 20 has first and second open ends, a perforated region 976 communicating with each of the open ends and having one or more openings 977 through which fluid can pass, and a blind region 978 through which there is no flow of fluid extending between the perforated regions 976. The openings 977 are shown rectangular, but they may have any other desired shape. The blind section 978 preferably extends continuously over at least about 50% of the length, more preferably over at least about 75% of the length, and still more preferably over at least about 90% of the length of the fluid treatment pack 971. The blind region 978 may be hollow, as in the embodiment of FIG. 12, or it may be solid, as shown in FIG. 20. Although not shown in the figures, the core 975 may include a resilient layer on the outer periphery of the blind region 978 to fill spaces between the radially inner ends of adjoining pleats and prevent fluid from bypassing the fluid treatment pack 971 by flowing between the inner periphery of the fluid treatment pack 971 and the outer periphery of the core 975.

The core 975 may be equipped with threads (either internal or external or other type of connector at each of its open ends by means of which it can be connected to members for supplying fluid to or removing fluid from the core 975. The core 975 is shown as extending to the exterior of the casing 980 so that the core 975 can be connected to external members, but the core 975 may instead be disposed entirely within the casing 980, and fluid ports communicating with the ends of the core 975 can be formed on the casing 980.

The casing 980 includes an outer wall 981 which surrounds the outer periphery of the fluid treatment pack 971 and first and second end plates 985 which cover the lengthwise ends of the fluid treatment pack 971. In the present embodiment, each of the end plates 985 is formed separately from the outer wall 981, but one or both of the end plates 985 may be integrally formed with the outer wall 981. The outer wall 981 is shown as being formed as a single member, but it may instead comprise a plurality of sections which are joined together in a fluid-tight manner.

The outer wall 981 may have any desired transverse cross-sectional shape, but it will usually have a cross-sectional shape similar to that of the fluid treatment pack 971, such as circular. Near each of its lengthwise ends, the outer wall 981 has one or more openings through which fluid can flow into or out of the interior of the casing 980. In the present embodiment, there are a plurality of openings 982, 983 spaced around the circumference of the outer wall 981 at its upper and lower lengthwise ends, respectively, each opening 982, 983 extending through the thickness of the outer wall 981 between its interior and exterior. As shown in FIG. 21, which is a cross-sectional elevation of a portion of the upper end of the outer wall 981, the illustrated openings 982, 983 are rectangular as viewed in elevation, but they may have any desired shape.

Each opening 982, 983 communicates with an upper or lower manifold 990 of the filter element 970 surrounding the outer wall 981. The lower manifold 990 distributes fluid supplied to it from a source of fluid to all the openings 983 at the lower end of the fluid treatment element 970, and the upper manifold 990 collects fluid which has been discharged from the openings 982 at the upper end of the fluid treatment element 970 and provides the collected fluid to an unillustrated portion of a fluid system in which the fluid treatment element 970 is installed.

FIG. 22 is a cross-sectional elevation of a portion of one of the manifolds 990. The other manifold 990 may be similar in structure to the illustrated one. Each manifold 990 is an annular member having an inner periphery which is sized to fit around the outer surface of the outer wall 981. It includes an annular groove 991 which extends completely around its inner periphery and surrounds the outer ends of the openings 982, 983 in the outer wall 981. Each manifold 990 is sealed to the outer wall 981 in a fluid-tight manner. In the present embodiment, each manifold 990 is equipped with O-rings 992 which are received in corresponding grooves 993 formed in its inner periphery and which form a seal against the outer wall 981, but many other methods of sealing can be employed, such as use of sealing rings mounted on the outer wall 981, or direct bonding or welding of the manifolds 990 to the outer wall 981. The manifolds 990 may be either detachably or permanently mounted to the outer wall 981.

The illustrated manifolds 990 can slip over the lengthwise ends of the outer wall 981 of the casing 980 and be held in place by friction between the O-rings 992 and the outer surface of the outer wall 981. To position the manifolds 990 with respect to the openings 982 and 983, the outer wall 981 of the casing 980 is formed with steps against which the manifolds 990 abut when the grooves 991 in the manifolds 990 surround the openings 982, 983. Each manifold 990 may also include one or more fittings by means of which the manifold 990 can be fluidly connected to external equipment. For example, each of the illustrated manifolds 990 is equipped with an internally threaded nipple 994 which communicates between the groove 991 and the exterior of the manifold 990.

Each lengthwise end face of the fluid treatment pack 971 is sealed so that fluid is prevented from flowing between the end faces and the ends plates 985 of the casing 980. A seal can be formed by a variety of methods. If the end plates 985 or the fluid treatment pack 971 is made of a thermoplastic material, a seal can be conveniently formed by melt bonding the fluid treatment pack 971 and the end plates 985 to each other. Other possible sealing methods include adhesive bonding, use of gaskets, and use of seal strips as described with respect to the previous embodiments. It is particularly convenient if the entire casing 980 is thermoplastic so that the end plates 985 can be melt bonded to the fluid treatment pack 971, to the core 975, and to the outer wall 981. When the fluid treatment layer of the fluid treatment pack 971 is made of a fluoropolymer, such as PTFE or PVDF, it is convenient if the casing 980 is also made of a fluoropolymer. However, as long as the casing 980 and other portions of the fluid treatment element 970 are compatible with the fluid treatment pack 971 and the fluid being processed, there are no restrictions on the materials of construction.

In FIG. 20, a first fluid stream 972 is shown being introduced into the upper end of the core 975, and a second fluid stream 973 is shown being introduced into the lower manifold 990, although the first fluid stream 972 may instead be introduced into the lower end of the core 975, and the second fluid stream 973 may be introduced into the upper manifold 990. The first fluid stream 972 flows through the openings 977 in the upper perforated region 976 of the core 975 and into the inner drainage layer of the fluid treatment pack 971. Because the openings 977 are distributed around the circumference of the core 975, the first fluid stream 972 is uniformly distributed to the inner drainage layer around the inner periphery of the fluid treatment pack 971. The first fluid stream 972 enters the inner drainage layer and then flows through the inner drainage layer in the lengthwise direction of the fluid treatment pack 971 until it reaches the lower perforated region 976, where it flows through openings 977 into the core 975 to be discharged from the fluid treatment element 970 through the lower open end of the core 975.

The second fluid stream 973 which is introduced into the lower manifold 990 is uniformly distributed around the circumference of the fluid treatment pack 971 into the outer drainage layer through the openings 983 at the lower end of the outer wall 981. The second fluid stream 973 flows into the outer drainage layer and then flows within the outer drainage layer in the lengthwise direction of the fluid treatment pack 971. As it does so, material transfer takes place between the first and second fluid streams 972, 973 across the fluid treatment layer of the fluid treatment pack 971. When the second fluid stream 973 reaches the upper end of the fluid treatment pack 971, it flows through the openings 982 at the upper end of the outer wall 981 and into the upper manifold 990. There, the fluid discharged from all of the openings 982 is collected and discharged from the fluid treatment element 970.

The first and second fluid streams 972, 973 are shown as flowing in opposite lengthwise directions of the fluid treatment element 970, but as described with respect to the embodiment of FIG. 12, they may flow in the same lengthwise direction.

If the fluid treatment layer of the fluid treatment pack 971 is permeable to liquid, the fluid treatment element 970 of FIG. 20 can be used for a dead end mode or a crossflow mode of operation by suitably controlling the flow of fluid into or out of the core 975 or the manifolds 990. For example, a fluid to be filtered can be introduced into both ends of the core 975 or into one end of the core 975 with the other end closed off, and after the fluid is subjected to dead end filtration, filtrate can be removed from one or both manifolds 990. Alternatively, a fluid to be filtered can be introduced into the casing 980 through both manifolds 990 or through one of the manifolds 990 with the other manifold 990 closed, and after the introduced fluid undergoes dead end filtration, filtrate can be removed from the fluid treatment element 970 through one or both ends of the core 975.

Crossflow filtration can be performed, for example, by introducing a process fluid into one end of the core 975 and removing retentate from the opposite end, while permeate can be removed from the fluid treatment element 970 through one or both manifolds 990. The fluid treatment element 970 can also be cleaned by backwashing or crossflow cleaning in much the same way as described with respect to the embodiment of FIG. 12. Thus, the fluid treatment element 970 of FIG. 20 has many possible modes of use.

Figure 23:
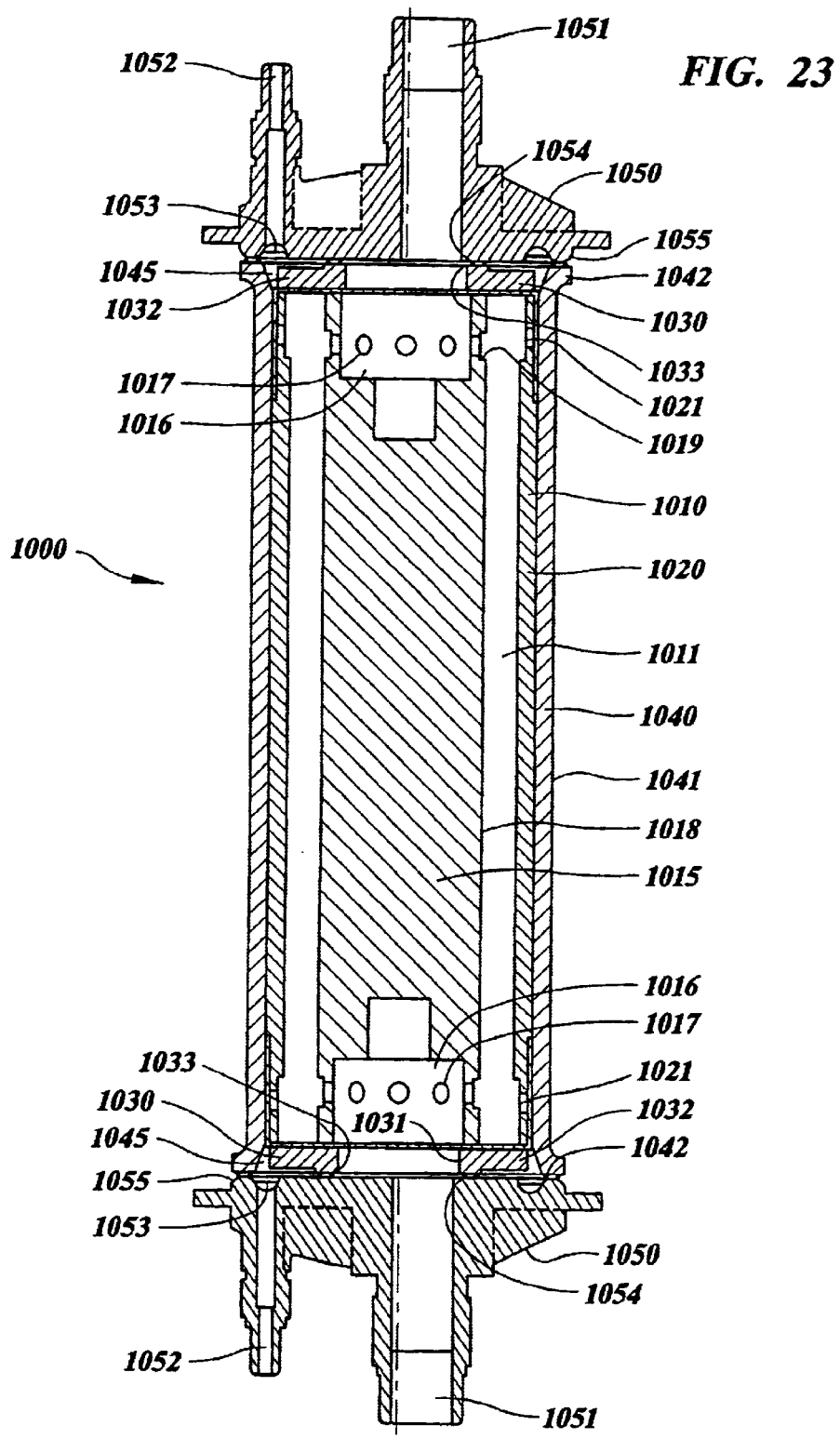
FIG. 23 is a cross-sectional elevation of a fluid treatment element according to another embodiment of the present invention.

The outer ends of the openings 982, 983 in the outer wall 981 can open onto locations other than the outer periphery of the outer wall 981. For example, they can open onto the lengthwise end surfaces of the outer wall 981, and a manifold can be built into the end plates 985 to distribute fluid to or receive fluid from the openings. The plurality of openings at each lengthwise end of the outer wall 981 may also be replaced with other arrangements for distributing fluid around the periphery of the fluid treatment pack 971. For example, a single through hole can be formed through the outer wall 981 at each of its lengthwise ends, and a circumferentially extending groove communicating with the inner end of the through hole can be formed in the inner periphery of the outer wall 981 at each of its ends. When a fluid is introduced into the outer end of one of the through holes, it can be distributed around the periphery of the fluid treatment pack 971 by flowing along the groove. Similarly, fluid flowing out of the fluid treatment pack 971 into the groove can be collected in the through hole. In this case, a manifold can be dispensed with, and a pipe or other conduit can be directly connected to the outer end of each through hole. FIG. 23 is a cross-sectional elevation of another embodiment of a fluid treatment element 1000 according to the present invention. This element 1000 is particularly suited for material transfer between two fluid streams, but it can also be used for other types of fluid treatment, such as dead end filtration and crossflow filtration.

The illustrated element 1000 includes a fluid treatment subassembly 1010 comprising a pleated fluid treatment pack 1011 and a housing 1040 which surrounds the subassembly 1010 and isolates the fluid treatment pack 1011 from the environment so that fluid can enter or leave the fluid treatment element 1000 only through fluid ports of the housing 1040.

In addition to the fluid treatment pack 1011, the fluid treatment subassembly 1010 includes a core 1015 surrounded by the fluid treatment pack 1011, a tube 1020 which surrounds the fluid treatment pack 1011, and end caps 1030 secured to the ends of the fluid treatment pack 1011 and the tube 1020. The fluid treatment pack 1011 maybe configured in any desired manner, such as in any of the ways described with respect to the preceding filter pack embodiments. For example, it may comprise a multi-layer composite including an inner drainage layer, a fluid treatment layer, and an outer drainage layer formed into axially extending pleats or spirally wound around the core 1015. When the fluid treatment pack 1011 is pleated, the pleats may be radial pleats having spaces between adjacent pleats, but more preferably the pleats are pressed against each other. For example, the pleats may be in a laid-over state and configured as shown in many of the previous figures, including FIG. 2. When the pleats are laid over, the fluid treatment pack 1011 may be surrounded by an unillustrated helical wrap member for maintaining a laid-over state.

Like the core 620 of the embodiment of FIG. 12, the core 1015 of FIG. 23 may have first and second open ends, a perforated region 1016 communicating with each of the open ends and having one or more openings 1017 through which fluid can pass, and a blind region 1018 through which there is no flow of fluid extending between the perforated regions 1016. The blind region 1018 preferably extends continuously over at least about 30% of the length, preferably at least about 50% of the length, more preferably over at least about 75% of the length, and still more preferably over at least about 90% of the length of the fluid treatment 1011.

The blind region 1018 may be hollow, as in the embodiment of FIG. 12, or it may be solid, as shown in FIG. 23. Although not shown in the figures, the core 1015 may include a sealing material, including any of the previously disclosed sealing materials, on the outer periphery of the blind region 1018 to fill spaces between the radially inner ends of adjoining pleats and prevent fluid from bypassing the fluid treatment pack 1011 by flowing between the inner periphery of the fluid treatment pack 1011 and the outer periphery of the core 1015. However, in applications, especially applications involving aggressive substances such as acids or bases, it may be preferable to avoid the use of a sealing material. To improve the flow distribution of fluid through the openings 1017, a circumferential groove 1019 interconnecting the openings 1017 may be formed in the exterior surface of the core 1015.

The tube 1020 and the end caps 1030 together define a casing which surrounds the fluid treatment pack 1011, with the tube 1020 surrounding the outer periphery of the fluid treatment pack 1011 and the end caps 1030 covering the lengthwise ends of the fluid treatment pack 1011. In the present embodiment, the tube 1020 and the end caps 1030 are formed separately from each other, but one or both of the end caps 1030 may be integrally formed with the 1020.

The tube 1020 may have any desired transverse cross-sectional shape, but it will usually have a cross-sectional shape similar to that of the fluid treatment pack 1011, such as circular, so as to closely surround the fluid treatment pack 1011. A sealing material may also be disposed between the tube 1020 and the outer periphery of the fluid treatment pack 1011 to prevent fluid bypass between the fluid treatment pack 1011 and the tube 1020. Near each of its lengthwise ends, the tube 1020 has one or more openings 1021 of any desired shape extending through the wall of the tube 1020 between its interior and exterior through which fluid can flow into or out of the interior of the tube 1020. The openings 1021 may be spaced around the circumference of the tube 1020 to better distribute the flow of fluid through the openings 1021 around the circumference.

Preferably, the openings 1021 are located as close as possible to the lengthwise ends of the fluid treatment pack 1011, such as within about 20% of the length of the fluid treatment pack 1011 and more preferably within about 10% of the length of the fluid treatment pack 1011 from its lengthwise ends so that fluid flowing between the openings 1021 at opposite lengthwise ends of the tube 1020 will pass through as much of the length of the fluid treatment pack 1011 as possible to maximize contact between the fluid and the fluid treatment layer in the fluid treatment pack 1011. Between the openings 1021 at the upper end and the openings 1021 at the lower end, the tube 1020 is blind, i.e., without any through holes, so that there is no flow through the wall of the tube 1020 except through the openings 1021.

Each of the end caps 1030 is an open end cap having an opening 1031 at its center through which fluid can flow into or out of one of the perforated regions 1016 of the core 1015. Each end cap 1030 is sealed to a lengthwise end face of the fluid treatment pack 1011 to prevent fluid from passing through the lengthwise end face. It may also but need not be sealed to the core 1015 or the tube 1020. The end caps 1030 need not be secured to other components of the fluid treatment subassembly 1010, but it may be convenient if they are since this will enable the subassembly 1010 to be handled as a single unit without the components of the subassembly 1010 becoming detached from each other. A seal between each end cap 1030 and the fluid treatment pack 1011 can be formed by any method suitable for the materials of which the end caps 1030 and the fluid treatment pack 1011 are made, such as by any of the methods described with respect to the embodiment of FIG. 20.

The housing 1040 includes an open-ended outer wall 1041 and first and second covers 1050, each of which is secured to and sealed to one of the ends of the outer wall 1041. The covers 1050 are shown as being formed separately from the outer wall 1041, but one of the covers 1050 may be formed integrally with the outer wall 1041. Each of the covers 1050 includes a first fluid port 1051 communicating between the exterior of the fluid treatment element 1000 and the interior of one of the perforated regions 1016 in the core 1915, and a second fluid port 1052 isolated from the first fluid port 1051 and communicating between the exterior of the fluid treatment dement 1000 and the openings 1021 atone end of the tube 1020 of the subassembly 1010.

Each cover 1050 is sealed to one of the end caps 1030 in any suitable manner so that fluid cannot flow directly between the first and second fluid ports 1051 and 1052 of a cover 1050 while bypassing the fluid treatment pack 1011. Alternatively, one or both of the end caps may be eliminated and the end(s) of the tube, the fluid treatment pack, and/or the core may be sealed directly to the cover(s). The lengthwise ends of the fluid treatment subassembly 1010 and the outer wall 1041 of the housing 1040 in the vicinity of the openings 1021 in the tube 1020 are shaped to provide one or more flow channels between the two through which fluid can flow between the openings 1021 and the second fluid port 1052 on the adjoining cover 1050. For example, the inner periphery of the outer wall 1041 can be spaced from the outer periphery of the tube 1020 to define an annular space 1045 between the outer wall 1041 and the tube 1020 in this region, or the outer wall 1041 and the tube 1020 may contact each other, with grooves being formed in one or both members to define flow channels communicating with the openings 1021. The fluid ports 1051 and 1052 can be used for flowing a gas or liquid. In certain embodiments, e.g., where a gas and a liquid are processed, the smaller port can be used for flowing the gas and the larger port for the liquid.

An annular groove 1053 communicating with the second fluid port 1052 may be formed in the end surface of each cover 1050 to help fluid spread around the periphery of the space 1045 between the tube 1020 and the outer wall 1041 of the housing 1040. A seal is preferably formed between the outer surface of the tube 1020 and the inner surface of the outer wall 1041 of the housing 1040 at a location between the openings 1021 at opposite ends of the tube 1020 around the circumference of the tube 1020 to prevent fluid from bypassing the fluid treatment pack 1011 by flowing in the lengthwise direction of the fluid treatment element 1000 between the opposing surfaces of the tube 1020 and the outer wall 1041.

A seal may be formed in any suitable manner, such as by a sealing member disposed between the two surfaces, by bonding or otherwise joining the tube 1020 and the outer wall 1041 to each other in a fluid-tight manner, or by selecting the dimensions of the tube 1020 and the outer wall 1041 so that they fit together sufficiently tightly to form a fluid-tight seal. For example, an adequate seal may be formed between the tube 1020 and the outer wall 1041 by an interference fit, such as a press fit or a shrink fit.

One or both covers 1050 may be detachably secured to the outer wall 1041 of the housing 1040 to enable the fluid treatment subassembly 1010 to be replaced. Alternatively, if the entire fluid treatment element 1000 is intended to be discarded when the fluid treatment pack 1011 reaches its useful life, the covers 1050 may be welded, bonded, or otherwise permanently secured to the outer wall 1041 of the housing 1040.

In applications involving the treatment of corrosive fluids or requiring an extremely low level of impurities, a fluid treatment element composed entirely of thermoplastic fluoropolymers is particularly suitable because of the extreme chemical inertness of fluoropolymers and the ability of thermoplastics to be joined directly to each other without the use of adhesives. Some examples of fluoropolymers which can be employed for the components of the fluid treatment element include PTFE and PVDF, and TFE containing copolymers such as PFA, AF, and, FEP. The most preferred method of sealing or joining fluoropolymer components of the fluid treatment element to each other is melt bonding because it avoids the use of adhesives. In melt bonding, one or both of the components to be joined to each other is heated to melt a portion of at least one of the components.

Heating may be performed by a variety of techniques, such as convective, conductive, inductive, frictional, sonic or radiant heating. The temperature to which the components are heated is typically above the glass transition or softening temperature of the component but below the temperature at which the heated material will freely flow or decompose. The components are then brought together and allowed to cool until the molten material solidifies, thereby bonding the components to each other. The melt bonding of the end caps 1010 and the outer wall 1041 to the cover 1050 can be facilitated by providing one of more of these components with a sacrificial weld feature which can be melted without causing deformation of adjoining portions of the components. In the present example, each end cap 1030 includes a base 1032 and a weld feature comprising an annular neck 1033 extending from the base 1032 toward the opposing cover 1050.

Each cover 1050 includes a weld feature comprising a first annular ridge 1054 which extends from the bottom surface of the cover 1050 in alignment with the neck 1033 of the opposing end cap 1030. At each of its lengthwise ends, the outer wall 1041 of the housing 1040 has an outwardly flaring lip 1042. Each cover 1050 includes another weld feature comprising a second annular ridge 1055 concentric with the first ridge 1054 and extending from the bottom surface of the cover 1050 in alignment with the top surface of the lip 1042. In order to reduce spreading in the radial direction of molten plastic formed during melt bonding, each of the weld feats may be chamfered along its inner and/or outer periphery to create a space bordered by the chamfer into which molten plastic can flow.

An example of a method of assembly the fluid treatment element of FIG. 23 is as follows. The fluid treatment subassembly 1010 is first assembled by melt bonding the end caps 1030 to the lengthwise end faces of the fluid treatment pack 1011 and optionally to the lengthwise ends of the core 1015 and the tube 1020. The outer wall 1041 of the housing 1040 is then shrink fitted around the subassembly 1010 to form a fluid-tight seal between the two intermediate the openings 1021. Next, the lip 1042 at one lengthwise end of the outer wall 1041 and the neck 1033 of the end cap 1030 at one lengthwise end of the subassembly 1030 and the two ridges 1054, 1055 of one of the covers 1050 are heated by radiant heating to above their glass transition temperature. Then, the cover 1050 is pressed against the outer wall 1040 and the end cap 1010, with ridge 1054 contacting the neck 1033 of the end cap 1030 and ridge 1055 contacting the upper surface of the lip 1042 of the outer wall 1041.

The molten portions of these components are then allowed to cool to simultaneously bond the cover 1050 to the outer wall 1041 and the end cap 1030 to the cover 1050. The above process can then be repeated to melt bond the other cover 1050 to the other end cap 1030 and to the other lengthwise end of the outer wall 1041. The resulting fluid treatment element has excellent corrosion resistance because of its use of all fluoropolymer components and because components are sealed to each other without the use of adhesives or elastomers.

Each fluid port 1051 and 1052 may be equipped with a connector, such as threads, a hose barb, a LUER-LOK™ fitting, or a FLARE TEK™ fitting to enable the fluid port to be connected to external equipment or to be equipped with a cap if the fluid port is to be closed during operation of the fluid treatment element 1000. A FLARE TEK fitting is particularly suitable for applications requiring excellent corrosion resistance or high purity, since such a fitting can form a seal without the need for elastomeric seals, sealing tape, or other sealing members.

Any of the fluid ports 1051 and 1052 can be used either for introducing a fluid into the fluid treatment element 1000 or removing a fluid therefrom. Fluid flowing through the first fluid ports 1051 may pass through the fluid treatment pack 1011 in the same lengthwise direction or the opposite lengthwise direction from fluid flowing through the second fluid ports 1052.

In one possible mode of operation of the fluid treatment element 1000 for performing material transfer, a first fluid Sam is introduced into the fluid treatment element 1000 through one of the first fluid ports 1051, such as the one at the upper end of FIG. 23. The first fluid stream flows into the perforated region 1016 at the upper end of the core 1015, flows radially outward through the openings 1017 in the upper perforated region 1016, and flows into the inner drainage layer of the fluid treatment pack 1011. The openings 1017 in the perforated region 1016 are distributed around the circumference of the core 1015, so the first fluid stream is uniformly distributed into the inner drainage layer around the inner periphery of the fluid treatment pack 1011.

The first fluid stream then flows within the inner drainage layer in the lengthwise direction of the fluid treatment pack 1011 until it reaches the lower perforated region 1016 of the core 1015, where it flows radially inwards through the openings 1017 in the core 1015 and then is discharged from the fluid treatment clement 1000 through the first fluid port 1051 in the lower cover 1050. At the same time, a second fluid stream is introduced into the fluid treatment clement 1000 through one of the second fluid ports 1052, such as the one at the lower end of the element 1000. The second fluid stream flows into the annular space 1045 between the tube 1020 and the outer wall 1041 of the housing 1040 and then flows radially inwards through the openings 1021 at the lower end of the tube 1020.

The second fluid stream then flows into the outer drainage layer of the fluid treatment pack 1011 and flows within the outer drainage layer in the lengthwise direction of the fluid treatment pack 1011 towards the upper end of the fluid treatment element 1000. As it does so, material transfer takes place between the first and second fluid streams through the fluid treatment layer of the fluid treatment pack 1011. When the second fluid stream reaches the upper end of the fluid treatment pack 1011, it flows radially outward through the openings 1021 at the upper end of the tube 1020 and into the annular space 1045 between the tube 1020 and the outer wall 1041 of the housing 1040. The second fluid stream then flows into the second fluid port 1052 in the upper cover 1050 to be discharged from the fluid treatment element 1000.

If the fluid treatment layer of the fluid treatment pack 1011 is permeable to the fluid being treated, tie fluid treatment element 1000 can be used for a dead end mode or a crossflow mode of operation. For example, in order to perform dead end filtration, a fluid to be filtered can be introduced into both of the first fluid ports 1051 or into one of the first fluid ports 1051 with the other fist fluid port 1051 closed off, and after the fluid passes through the fluid treatment layer in the fluid treatment pack 1011 and is filtered, filtrate can be removed from one or both of the second fluid ports 1052. Attentively, a fluid to be filtered can be introduced into the fluid treatment through both of the second fluid ports 1052 or through one of the second fluid ports 1052 with the other second fluid port 1052 closed off, and after the introduced fluid has undergone dead end filtration, filtrate can be removed from the fluid treatment element 1000 through one or both of the first fluid ports 1051.

Crossflow filtration can be performed, for example, by introducing a fluid into one of the first fluid ports 1051 and removing retentate from the other first fluid port 1051, while permeate can be removed from the fluid treatment element 1000 through one or both of the second fluid ports 1052. Alternatively, a fluid to be treated can be introduced into the fluid treatment element 1000 through one of the second fluid ports 1052 and retentate can be removed through the other of the second fluid ports 1052, while permeate can be removed through one or both of the first fluid ports 1051. The fluid treatment element 1000 can be cleaned by backwashing or crossflow cleaning in a manner similar to that described with respect to the embodiment of FIG. 12.

The present invention further provides a fluid treatment arrangement for contacting a liquid with a gas that is soluble in the liquid. The fluid treatment arrangement may include any of the previously described fluid treatment elements, including the fluid treatment element 1000 shown in FIG. 23. Thus, the fluid treatment arrangement may include a housing and a pleated fluid treatment layer having first and second sides and defining a first flow path and a second flow path along the first and second sides, respectively. The fluid treatment arrangement further includes a source of the gas connected to the first flow path of the fluid treatment clement and a source of the liquid connected to the second flow path of the fluid treatment element. The fluid treatment arrangement is of benefit, e.g., in dissolving gases in liquids. Such an arrangement provides one or more advantages, e.g., the solution obtained is free or substantially free of gas bubbles and the gas dissolution rate or the gas transfer rate is enhanced.

It is believed that fluid treatment elements of the present invention facilitate a diffusive transfer of the soluble gas across the fluid treatment layer or medium. This is different from direct dissolution of a gas in a liquid in a sparging mode. When the gas pressure is greater than that of the liquid pressure, sparging or bubbling occurs. The bubbles tend to coalesce to form larger bubbles, and the coalesce reduces the area of contact between the gas molecules and the solvent molecules. Since the area of contact is diminished, the resulting amount of material transfer into the solution as well as the transfer rate are low. To achieve diffusive transfer, the fluid treatment arrangement is preferably operated so that the pressure on the liquid side is greater than on the gas side. When the gas pressure is greater than that of the liquid pressure, a sparging mode of transfer or bulk flow occurs. Bulk flow of gas through the medium is less preferred.

The gas transfer can be carried out either in a single pass mode or in a recirculation mode. In the single pass mode, the gas is admitted on and directed along one side of the fluid treatment layer and the liquid is admitted on and directed along the other side. The gas and the liquid are not recirculated. Instead, the gas passes along the fluid treatment medium and exits the fluid treatment element and is disposed of suitably. Similarly, the liquid passes along the fluid treatment medium and exits the element. In the recirculation mode, at least one of the fluids, e.g., the liquid is recirculated. As the liquid passes along the fluid treatment medium repeatedly, the concentration of the gas increases. Thus, solutions of greater concentrations can be prepared by the recirculation mode. For example, liquid solutions containing a gas up to its solubility limit can prepared, e.g., water solutions containing ozone up to about 25% by weight of the solution can be prepared. In certain embodiments, both gas and liquid can be recirculated.

The fluid treatment arrangement in the recirculation mode generally includes a liquid bath or tank. A sensor that measures the concentration of the solute, e.g., ozone, may be placed at an outlet of the tank. Any suitable sensor can be employed. For example, an UV sensor can be employed to measure ozone. The liquid from the tank is pumped to the inlet of the fluid treatment element. The liquid exits the fluid treatment element and returns to the tank.

The liquid and gas can be passed at any suitable flow rate or pressure. For example, water can be passed at a flow rate of up to about 40 lpm, typically from about 1 lpm to about 30 lpm, and preferably at a flow rate of from about 8 lpm to about 20 lpm; and the gas, e.g., ozone, can be passed at a flow rate of up to about 8 slpm, typically from about 1 slpm to about 4 slpm, and preferably from about 2 to 3 slpm. The liquid pressure will depend upon the liquid flow rate. For example, the liquid pressure can be greater than about 2 psi, typically from about 5 psi to about 30 psi, and preferably from about 20 psi to about 25 psi. Thus, e.g., the liquid incoming pressing can be from about 5 psi to about 10 psi when the outgoing liquid flow rate is from about 16 lpm to about 20 lpm.

The gas pressure can be greater than about 0.1 psi, typically from about 3 psi to about 25 psi, and preferably from about 15 psi to about 22 psi. The fluid treatment medium is generally impermeable to the liquid. For example, the medium may be liquophobic such that the liquid does not wet the fluid treatment medium. The gas pressure is less than the liquid exit pressure.

The gas, e.g., a mixture of ozone and oxygen, is admitted to and directed along the other side of the fluid treatment medium. Ozone can be generated by an electrical discharge type ozone generator. The concentration of ozone can be greater than about 1 $g/m^3$, and it is typically in the range of about 50 to about 250 $g/m^3$, and preferably from about 150 to about 250 $g/m^3$. The gas can be admitted co-currently or countercurrently.

In accordance with another embodiment, the present invention provides a fluid treatment arrangement for degassing a liquid containing a dissolved gas. The degassing arrangement may be similar to the gas contacting arrangement, each including a fluid treatment element. The degassing arrangement may further include a source of the liquid connected to the first flow path and a difference in pressure between the first and second flow paths. The difference in pressure can be suitably provided, for example, by connecting the second flow path to a source of vacuum. Alternatively, the first flow path can be maintained at a higher pressure than the second flow path by providing a pressure regulator. The first and second flow paths can be connected to two independent pressure or vacuum sources and controlled at the desired pressure difference.

Thus, in accordance with the preset invention, water can be degassed to remove dissolved oxygen. It is possible to achieve an oxygen concentration in water of less than a few parts per billion (ppb), preferably 1 ppb or less oxygen. In certain embodiments, a liquid can be first degassed and then a second gas can be dissolved. For example, water can be degassed to remove the dissolved oxygen, and HF or HCl can then be dissolved.

In the gas contacting or degassing arrangement described above, the fluid treatment element is preferably cylindrical, as shown in FIG. 23. Further, the first and second flow paths pass along the fluid treatment layer in any suitable direction, preferably in opposite directions. The fluid treatment pack of the fluid treatment element preferably includes at least two drainage layers, with a first drainage layer on the first side of the fluid treatment medium and a second drainage layer on the second side of the fluid treatment medium, the first and second flow paths passing within the first and second drainage layers, respectively. The drainage layers can be woven or nonwoven mesh, preferably nonwoven mesh. In a preferred embodiment, the fluid treatment layer has axially extending, laid-over pleats as previously described.

The fluid treatment assembly can be constructed of any suitable materials, e.g., metals, plastics, elastomers, and/or ceramics. For use in a challenging environment such as contacting aggressive or corrosive gases or liquids, the materials of choice is preferably a stable polymer, e.g., a fluoropolymer. Thus, for example, the components of the fluid treatment element such as the fluid treatment layer or medium, each drainage layer, cushioning layer, wrap member, cage, tube, core stopper, and endcaps, can be constructed of a fluoropolymeric material, preferably a perfluoropolymeric material.

Any suitable fluoropolymeric material, e.g., a homopolymer or a copolymer comprising tetrafluoroethylene (TFE) monomer can be used. An example of such a homopolymer is polytetrafluroethylene (PTFE).

An example of a copolymer is one that comprises TFE and at least one monomer selected from the group consisting of a perfluoroalkylvinylether, perfluoroalkoxydioxole, and perfluoroolefin having 3 or more carbon atoms. An example of a perfluoroalkylvinylether is perfluoromethylvinylether or perfluoropropylvinylether. An example of a perfluoroalkoxydioxole is pefluoro-2,2-dimethyl-1,3-dioxole. An example of a perfluoroolefin is perfluoropropylene. Examples of suitable copolymers include a copolymer of TFE and perfluoroalkylvinylether (PFA), a copolymer of TFE and pefluoro-2,2-dimethyl-1,3-dioxole (PDD), and copolymer of TFE and perfluoropropylene such as FEP copolymer.

Copolymers comprising a TFE monomer have a melting or softening point lower than that of PTFE and/or are more readily processable in the melt or solution. For example, whereas PTFE has a melting point of 327° C., a TFE-FEP copolymer has a melting point of 260° C., a TFE-PFA copolymer has a melting point of 305° C., and a TFE-PDD copolymer has a melting point of 285° C. The PTFE and FEP copolymers are available from commercial polymer houses, c.g., the DuPont Co. in Wilmington, Del.

Suitable copolymers of TFE and PDD include those available commercially as TEFLON AF™ 1600 and AF 2400 copolymers from the DuPont Co. The AF 1600 copolymer reportedly has a PDD content of about 65% by mole and a TFE content of about 35% by mole, and the AF 2400 copolymer reportedly has a PDD content of about 85% by mole and a TFE content of about 15% by mole.

The fluid treatment layer of the fluid treatment element employed in the above gas contacting or degassing arrangements preferably includes a microporous or finer membrane. It is further preferred that the fluid treatment layer, particularly the microporous membrane, comprises PTFE. The microporous membrane can have a pore rating of greater than 0.01 $\mu$m, typically, an average pore rating of from about 0.01 $\mu$m to about 10.0 $\mu$m, and preferably an average pore rating of from about 0.05 $\mu$m to about 0.2 $\mu$m. In certain embodiments, the fluid treatment medium comprises a nonporous membrane.

The gas contacting arrangements in accordance with the present invention can be employed to dissolve any suitable gas in any suitable liquid. Typically, the gases include aggressive or reactive gases such as oxidizers, reducers, disinfectants, acids, and bases. Examples of such gases include ozone, oxygen, $ClO_2$, $CO_2$, HCl, HF, $NH_3$, and combinations thereof. These gases can be pure gases or gases in combination with other gases, e.g., inert gases such as nitrogen or argon. Examples of suitable liquids include water, e.g., deionized water, corrosive liquids such as solutions of acids or alkalis, e.g., sulfuric acid or an alkali metal hydroxide. For example, hydrochloric or sulfuric acid is effective in removing metallics. If combined with ozone, which is effective in destroying organics, the resulting ozone-acid solution can effectively remove metallics as well as organics in single pass.

Certain embodiments of the present invention can be used to transfer a dissolved gas from liquid to another. The mass or material transfer through the fluid treatment medium can be accomplish by creating a suitable gradient, e.g., a concentration gradient, a pressure gradient, a temperature gradient, or combination thereof.

In accordance with an embodiment of the present invention, the fluid treatment arrangement or element can be used to provide point of use chemical generation capability. For example, a gas cylinder containing a chemical, e.g., a corrosive gas such as HF, can be shipped to a chemical manufacturing plant instead of shipping a large volume of a dilute solution of HF in water. The manufacturer can then contact the gas with water by the use of the fluid treatment element and produce the solution of desired concentration. This can lead to potential cost savings for the manufacturer, e.g., in shipping costs.

Further, certain processes, e.g., biological, pharmaceutical, beverage, and/or food production processes, involve the addition of a gas to the reaction mixture in order to speed up or terminate a reaction. It is desirable that such addition of gas is carried out so that bubbles are avoided as bubbles tend to damage or disturb the reaction or the reagents. For example, bubbles can contribute to foaming. The shear forces of the foam may damage the bacterium or yeast involved in the fermentation process. The present invention provides a fluid treatment arrangement that can transfer gases to reaction or processes without significant foaming or bubble formation. The fluid treatment elements of the present invention can also serve as artificial lungs. Transfer of gases such as $CO_2$ to water, e.g., water used in the microelectronics industry, can provide a convenient way to adjust the conductivity of water without adding ions such as metallic ions.

In accordance with another embodiment, the present invention provides a method for contacting a liquid with a gas that is soluble in the liquid comprising providing a fluid treatment assembly comprising a pleated fluid treatment layer having a first and a second side and defining a first flow path and a second flow path along the first and second sides, respectively; passing the gas along the first flow path; passing the liquid along the second flow path; and passing at least a portion of the gas through the fluid treatment element to obtain a solution of the gas in the liquid.

In accordance with yet another embodiment, the present invention provides a method for degassing a liquid containing a dissolved gas comprising providing a fluid treatment assembly comprising a pleated fluid treatment layer having a first and a second side and defining a first flow path and a second flow path along the first and second sides, respectively; passing the liquid along the first side of the fluid treatment layer at a first pressure; and transferring at least a portion of the gas from the liquid to the second side of the fluid treatment layer at a second lower pressure, thereby providing a difference in pressure between the first and second sides of the fluid treatment layer. The difference in pressure can be provided as described above, e.g., by applying a vacuum to the fluid treatment assembly so as to transfer at least a portion of the gas from the liquid to the other of the first side and the second side of the fluid treatment layer.

The gas and the liquid can pass each other in any suitable direction—co-current or, preferably, counter-current The solution prepared by the embodiments of the method may be free or substantially free of bubbles. The transfer of gas across the membrane occurs essentially through diffusive and pressure differential mechanisms.

Certain preferred embodiments of the fluid treatment elements constructed in accordance with the present invention may be free of O-rings or adhesives. The materials of construction may be all fluoropolymers. In certain embodiments, the fluid treatment element includes components that are melt-bonded. Accordingly, many of the embodiments of the fluid treatment elements do not leach organics or inorganics into the process fluid(s).

Further, the fluid treatment elements in accordance with embodiments of the present invention which include pleated fluid treatment packs are more mechanically robust. For example, the fluid treatment elements of the present invention are free of problems such as fiber breakage or blockage encountered with hollow fiber elements.

Embodiments of the fluid treatment elements in accordance with the present invention can be operated continuously for transfer of gases to aqueous or polar liquids for extended periods of time, preferably at moderate or low transmembrane pressures. Thus, for example, all fluoropolymer fluid treatment elements can be operated continuously without significant decline in gas transfer. If the transmembrane pressure were high, e.g., higher than 45 psi a 0.2 $\mu$m microporous membrane can be wetted by the aqueous or polar fluid, and a significant decline in the gas flux e.g., ozone flux, maybe observed.

When a plurality of fluid treatment elements are to be operated at the same time, instead of disposing all of the elements in a single housing, it may be advantageous to dispose the elements in modules which can be fluidly connected to each other to form an assembly of a desired size. A plurality of modules may be less expensive to manufacture than a single large housing accommodating an equal number of fluid treatment elements and may permit greater flexibility of operation by enabling any desired number of fluid treatments elements to be efficiently operated at the same time. FIGS. 26–29 illustrate an embodiment of a fluid treatment assembly, such as a filter assembly 1060 employing a plurality of fluid treatment modules 1100 connected to each other so as to simultaneously treat the same fluid.

Figure 26:
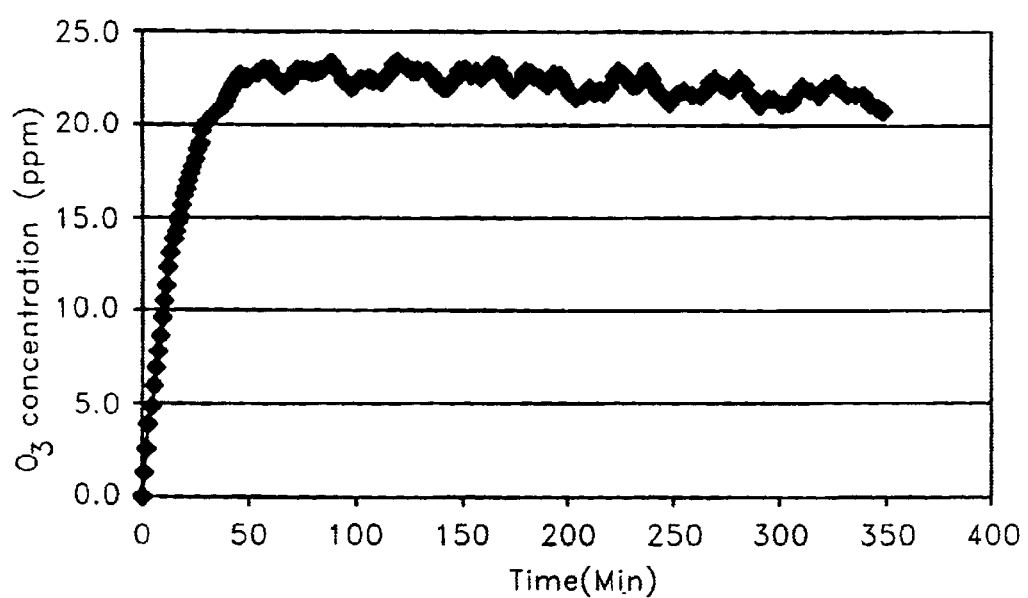
FIG. 26 depicts the concentration of ozone in water as a function of time of passing with ozone through a fluid treatment element in accordance with an embodiment of the present invention.

FIG. 26 is an isometric view of the fluid treatment assembly 1060 in an assembled state. As shown in this figure, the assembly 1060 includes a plurality of fluid treatment modules 1100 connected side-by-side. There is no restriction on the number of modules 1100 in the assembly 1060. One advantage of the modules 1100 is that any desired number can be connected to each other, but an assembly 1060 may also have only a single module 1100. The illustrated fluid treatment modules 1100 are identical in structure to each other but may differ in structure from module to module. Fluid conduits 1073, such as pipes for supplying fluid to or removing fluid from the assembly 1060, are installed at one or both ends of the assembly 1060. The illustrated assembly 1060 includes eight conduits 1073 (four at each lengthwise end of the assembly 1060), but a different number of conduits 1073 may be employed.

The type of fluid carried by a given conduit 1073 and the direction of flow through the conduit 1073 can vary depending upon the operating mode of the assembly 1060. While the conduits 1073 may be installed at a single end of the assembly 1060, it may be possible to distribute fluid more uniformly among the modules 1100 by having conduits 1073 at both ends of the assembly 1060. The conduits 1073 may be equipped with unillustrated valves for controlling the flow of fluid through them. The modules 1100 are shown vertically oriented in the figures, but they may have any desired orientation with respect to the vertical.

Figure 27:
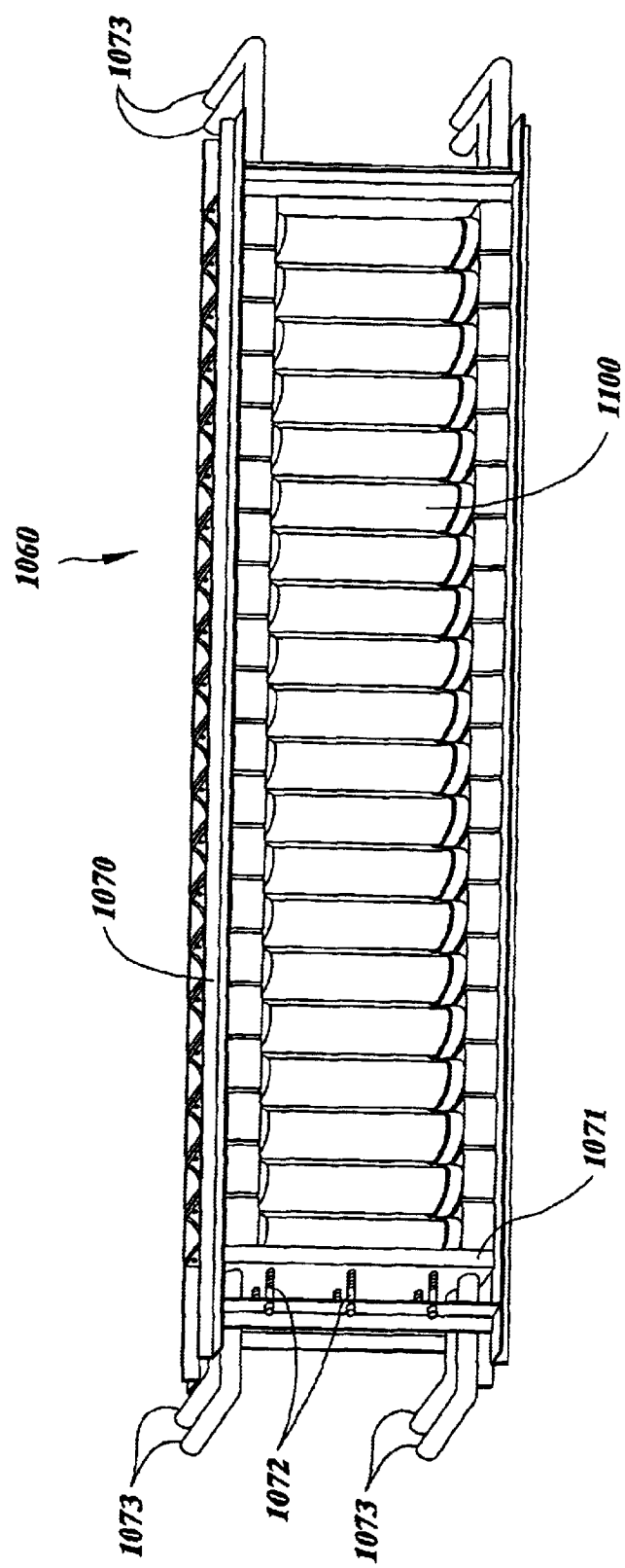
FIG. 27 is an isometric view of an embodiment of a fluid treatment assembly according to the present invention employing a plurality of modules.
Figure 28:
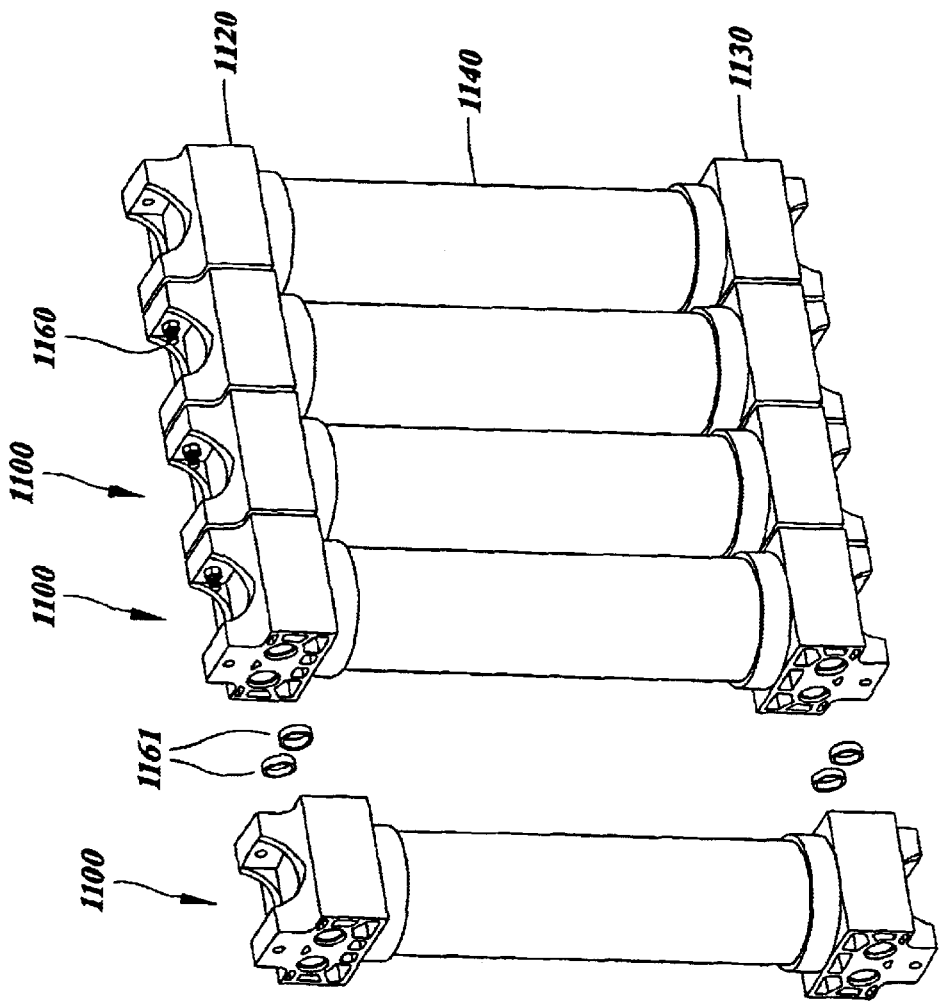
FIG. 28 is a partially exploded isometric view of some of the modules of the embodiment of FIG. 27.
Figures 29, 30:
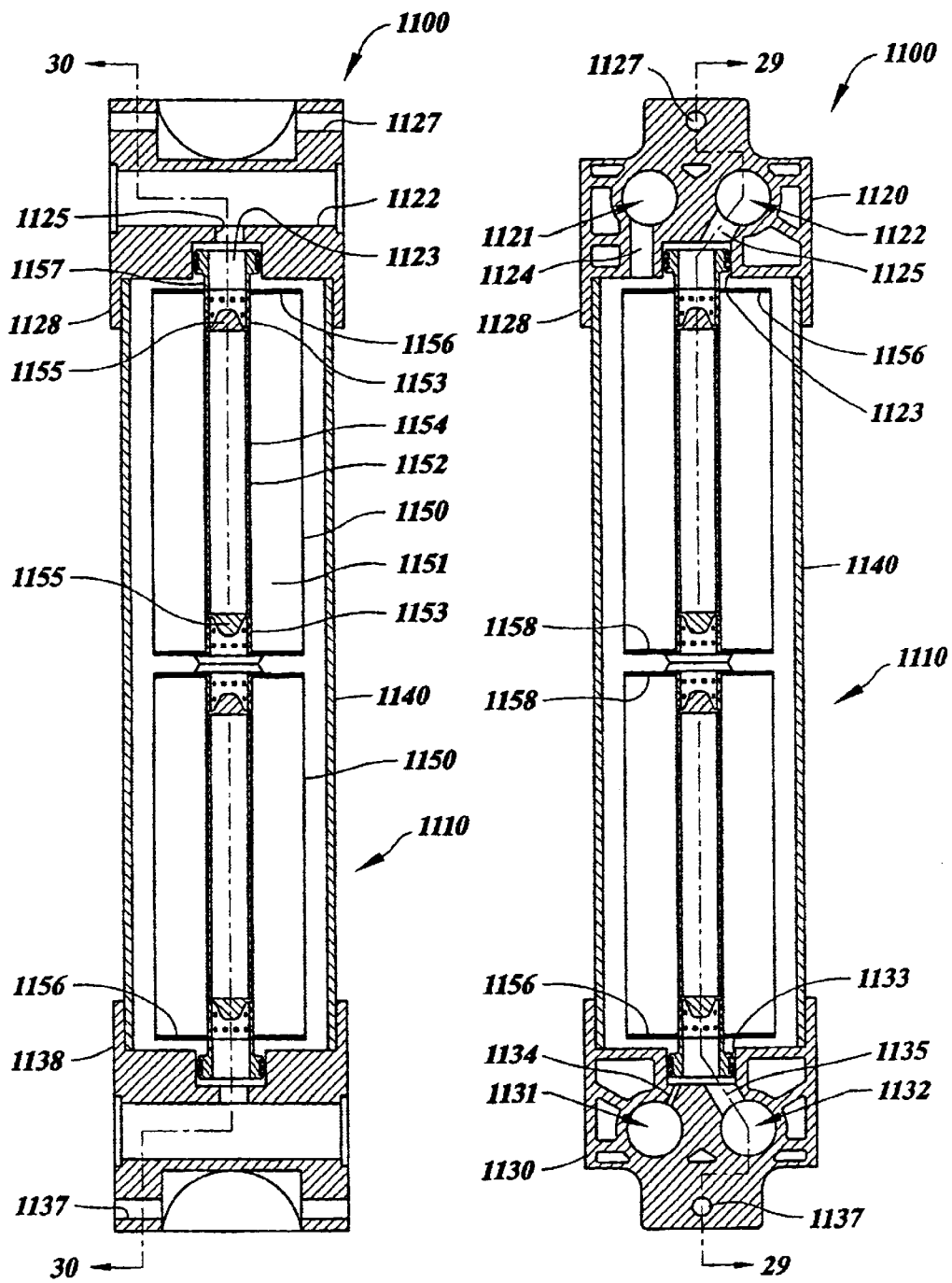
FIG. 29 is a side cross-sectional elevation of one of the modules of FIG. 28 taken along line 25—25 of FIG. 30 below.
FIG. 30 is a front cross-sectional elevation of the module taken along line 26—26 of FIG. 29.

FIG. 28 is a partially exploded isometric view of a group of the modules 1100 of the assembly 1060 of FIG. 27, and FIGS. 29 and 30 are vertical cross-sectional views of one of the modules 1100. As shown in these drawings, each module 1100 includes a housing 1110 having a first header 1120, a second header 1130 spaced from the first header 1120, and a hollow casing 1140 extending between the first and second headers 1120, 1130. Each module 1100 further includes one or more fluid treatment elements 1150 installed in the housing 1110 in communication with each other and with the headers 1120, 1130.

Each header 1120, 1130 of a module 1100 serves to fluidly connect the module 1100 with a header of one or more adjoining modules 1100 and to fluidly connect the interior of the housing 1110 of each module 1100 with its exterior. In this embodiment, the first header 1120 has first and second parallel bares 1121 and 1122 extending through it between opposite exterior surfaces. The first bore 1121 is fluidly corrected with the lower surface of the first header 1120 by a connecting passage 1124, and the second bore 1122 is connected by another connecting passage 1125 with a recess 1123 formed in the lower surface of the first header 1120 for receiving a fluid treatment element 1150. Similarly, the second header 1130 has first and second bores 1131 and 1132 extending through it between opposite exterior surfaces.

The first and second bores 1131, 1132 are fluidly connected with a recess 1133 for receiving a fluid treatment element 1150 formed in the upper surface of the second header 1130 by two connecting passages 1134 and 1135, respectively. The bores are shown extending along straight lines parallel to each other, but the directions along which the bores extend are not restricted. The illustrated bores have a circular transverse cross section, but the shape of the bores is also not restricted. In addition to the bores, the headers 1120, 1130 may be formed with various through holes or recesses which can be used to reduce the weight of the headers to provide better cooling of the headers or to carry fluids. The illustrated headers 1120, 1130 have a rectangular transverse cross-sectional shape, but they may have any shape which enables the modules 1100 to be connected to each other side-by-side.

The casing 1140 of each housing 1110 isolates the one or more fluid treatment elements 1150 within the housing 1110 from its exterior. The casing 1140 may have any shape which enables it to surround the fluid treatment elements 1150. For example, it may have a transverse cross-sectional shape which is circular, polygonal, or other shape, and the transverse cross-sectional shape may vary over the length of the casing 1140. The casing 1140 maybe permanently connected to one or both headers 1120, 1130, or it may be detachably connected to one or both headers to enable the fluid treatment elements 1150 to be removed from the housing 1110 and replaced. In the present embodiment, each lengthwise end of the casing 1140 is inserted into a cylindrical rim 1128, 1138 formed on the headers 1120, 1130, respectively, and is joined to the rims in a fluid tight manner, such as by adhesive bonding or melt bonding.

The housing 1110 of a module 1100 can be made of any material compatible with the fluid being treated, including but not limited to metals and polymers, including, for example, the fluorpolymers previously described. The housing 1110 may be reusable, or it may be discarded or recycled when the fluid treatment elements 1150 in the module 1100 reach the end of their useful life, thereby saving the expense of replacing the fluid treatment elements 1150 in the module 1100.

The fluid treatment elements 1150 are not restricted to any particular type. For example, they may be intended for dead end operation, crossflow operation, or both. The illustrated housings 1110 are constructed to enable the fluid treatment elements 1150 to be efficiently cleaned by crossflow cleaning, but the housings 1110 can also be employed with fluid treatment elements not intended for cleaning in this manner. The illustrated fluid treatment elements 1150 may be similar in structure to those illustrated in FIG. 5. Each fluid treatment element 1150 includes a pleated fluid treatment pack 1151, a core 1152 surrounded by the fluid treatment pack 1151, an unillustrated wrap member wrapped around the fluid treatment pack 1151, and first and second end caps 1156, 1158, respectively, disposed at opposite ends of the fluid treatment element 1150. The fluid treatment pack 1151 may be similar n structure to that of the embodiment of FIG. 1. For example, it may comprise a three-layer composite of a fluid treatment layer, an outer drainage layer disposed on the radially outer side of the fluid treatment layer, and an inner drainage layer disposed on the radially inner side of the fluid treatment layer. The composite can be formed into axially extending, laid-over pleats in any of the ways described with respect to FIG. 1. The pleats can be maintained laid-over by the wrap member, for example.

Each of the illustrated cores 1152 is open at each of its lengthwise ends and includes a perforated section 1153 at each of its lengthwise ends and a blind section 1154 through which fluid cannot pass extending between the two perforated sections 1153. Each of the perforated sections 1153 has a tubular wall formed with perforations or other openings through which fluid can pass between the interior of the core 1152 and the fluid treatment pack 1151, while the blind section 1154 has a peripheral wall through which fluid cannot pass. The blind section 1154 maybe similar in structure to that of the core 120 of FIG. 5 and include a hollow tube and a resilient layer which surrounds the tube to fill in the triangular gaps between adjoining legs of the pleats along the inner periphery of the fluid treatment pack 1151. One or both ends of the blind section 1154 is sealed by a stopper 1155 or in any other suitable manner to prevent fluid from flowing along the interior of the core 1152. The length of the blind section 1154 relative to the overall length of the core 1152 may be any suitable value, such as the same as in the embodiment of FIG. 5.

The lengthwise end faces of each fluid treatment pack 1151 are sealed by the end caps 1156 and 1158 or in any other suitable manner such that fluid will enter or exit the fluid treatment element 1150 via the core 1152 rather than through the lengthwise end faces. The end caps 1156 and 1158 may but need not be secured to the core 1152. Each of the first end caps 1156 is shaped for engagement with one of the headers 1120 or 1130 of the housing 1110, and each of the second end caps 1158 is constructed so as to be capable of connection in a fluid tight manner, either permanently or detachably, to the second end cap 1158 of the adjoining fluid treatment element 1150. The second end caps 1158 may be directly connected to each other, or they may be connected by a suitable connecting member disposed between them. The illustrated housing 1110 contains two fluid treatment elements 1150 connected to each other in series, but it may instead contain a single fluid treatment element 1150 or mores than two fluid treatment elements 1150.

Each fluid treatment element 1150 can be fluidly connected to one of the headers 1120, 1130 in any manner enabling fluid to flow between the core 1152 of the fluid treatment element 1150 and one of the bores in the headers. The fluid treatment elements 1150 can be either permanently or detachably connected to the headers 1120, 1130. In the present embodiment, the first end cap 1156 of each fluid treatment element 1150 is equipped with a neck 1157 which can be inserted into the recess of one of the headers 1120, 1130 to fluidly communicate with one or more of the bores in the header. The first end cap 1156 can be sealed to the header which it engages in any suitable manner. In the present embodiment, an O-ring or other sealing member is mounted on the exterior of the neck 1157 of the first end cap 1156 and forms a piston seal against the interior of the recess into which the neck 1157 is inserted.

The functions of the bores in the headers 1120, 1130 can vary depending upon the mode of operation of the fluid treatment elements 1150. When the fluid treatment elements 1150 are being used for dead end filtration, process fluid can be introduced through one or both of the second bores 1122, 1132 and filtrate can be removed from the first bore 1121 in the first header 1120, or process fluid can be introduced through the first bore 1121 in the first header 1120 and filtrate can be removed through one or both of the second bores 1122, 1132.

When the fluid treatment elements 1150 are used for crossflow filtration, process fluid can be introduced through one of the second bores 1122 and 1132, retentate can be removed from the other of the second bores, and permeate can be removed from the first bore 1121 in first header 1120. If the fluid treatment elements 1150 are to be subjected to backwashing, backwashing fluid can be introduced from any one of the bores located on what is the downstream side of the fluid treatment elements 1150 during filtration and can be removed from any one or more bores on what is the upstream side of the fluid treatment element 1150 during filtration.

When the fluid treatment elements 1150 are to be subjected to crossflow cleaning, a crossflow cleaning fluid, such as a mixture of gas and liquid, can be introduced into the fluid treatment elements 1150 through one or both of the bores 1131, 1132 in the second header 1130 and the cleaning fluid can be removed through the second bore 1122 in the first header 1120. Alternatively, a crossflow cleaning fluid can be introduced into the fluid treatment elements 1150 through the second bore 1122 in the first header 1120 and removed through the second bore 1132 in the second header 1130. Preferably, however, in accordance with another aspect of the invention the of air and gas comprising the cleaning fluid is formed at the end of the filter element 1150 in the recess 1133 by supplying only gas through the first bore 1131 and connecting passage 1134 of the second header 1130 and supplying only liquid through the second bore 1132 and connecting passage 1135. Because the connecting passage 1134 supplies only the gas, it may be smaller than the other connecting passages. In order to prevent liquid from flowing into the first bore 1131, the connecting passage 1134 may be equipped with a check valve. For example, air may be supplied through the first bore 1131 and connecting passage 1134 and water may be supplied through the second bore 1132 and connecting passage 1135. Both the air and the water are preferably supplied at about the same pressure, e.g., up to about 35 psi, and are mixed in the recess 1133 prior to entering the filter elements 1150. Mixing the gas and liquid at the end of the filter elements 1150 significantly enhances the effectiveness of the cleaning fluid. The first bore 1131 in the second header 1130 maybe used for purposes other than the introduction of gas to the cleaning fluid, but the first bore 1131 is normally used only during crossflow cleaning and not in other modes of operation.

The modules 1100 may be connected to each other, either permanently or detachably, in any way which permits fluid to flow between the corresponding bores of two adjoining modules 1100. In the present embodiment, each header 1120, 1130 is equipped with a hole 1127, 1137 through which a bolt 1160 can be passed to detachably secure the headers of adjoining modules 1100 to each other. A gasket 1161 or other scaling member can be placed between the opposing surfaces of adjoining headers 1120, 1130 to allow fluid to flow between adjoining headers without leakage. In the present embodiment, the end surface of each bore in each header is counted to receive one of the gaskets 1161, which is compressed between opposing surfaces of the headers 1120, 1130 to form a seal. Although not employed in the illustrated embodiment, it is possible to dispose a tube or other conduit between adjoining modules 1100 to fluidly interconnect them.

The assembly 1060 may be equipped with a frame or other structure to give it greater rigidity. In the present embodiment, the modules 1100 are supported by a frame 1070. Two end plates 1071 each having four of the conduits 1073 mounted thereon are disposed at opposite lengthwise ends of the assembly 1060. Each end plate 1071 is pressed into sealing contact with a module 1100 at one end of the assembly 1060 by jack screws 1072. Fluid can flow from each conduit 1073 into a bore of one of the headers of the adjoining module 1100 and then can flow through the aligned bores into each of the other modules 1100 of the assembly 1000.

The fluid treatment assembly 1070 can be operated in various modes. In order to perform crossflow filtration, a process fluid to be treated is introduced into the fluid treatment elements 1150 from one of the headers 1120, 1130 of each module 1100. As an example, the case will be described in which the process fluid is introduced from the second bore 1132 of the second header 1130 of each module 1100. The process fluid flows from the second bore 1132 into the first end cap 1156 of the lower fluid treatment element 1150 and then through the perforations at the lower end of the core 1152 of the fluid treatment element 1150 into the inner drainage layer of the fluid treatment element 1150. The process fluid then flows within the inner drainage layer towards the upper end of the lower fluid treatment element 1150. As it does so, a portion of the process fluid flows through the fluid treatment layer and is fluid treated to become permeate, which flows to the exterior of the fluid treatment element 1150 and then into the first bore 1121 of the first header 1120. The portion of the process fluid which reaches the upper end of the lower fluid treatment element 1150 without being fluid treated flows through the perforations at the upper end of the core 1152 of the lower fluid treatment element 1150 through the second end cap 1158 of the lower fluid treatment element 1150 and into the second end cap 1158 of the upper fluid treatment element 1150, flows through the perforations at the lower end of the core 1152 of the upper fluid treatment element 1150, and then flows into the inner drainage layer of the upper fluid treatment element 1150.

In the upper fluid treatment element 1150, the process fluid flows within the inner drainage layer towards the upper end of the upper fluid treatment element 1150, with a portion of the process fluid passing through the fluid treatment layer to become permeate, which flows out of the upper fluid treatment element 1150 and into the first bore 1121 of the first header 1120. The portion of the process fluid which does not pass through the fluid treatment layer is discharged from the upper end of the upper fluid treatment element 1150 into the second bore 1122 of the first header 1120 as retentate. A similar process takes place in all of the other modules 1100 in the assembly 1060. The retentate collected in each module 1100 flows through the aligned second bores 1122 of the first headers 1120 to be removed from the assembly 1060 via one or more of the conduits 1073 at the ends of the assembly 1060, and the permeate collected in each module 1100 flows through the aligned first bores 1121 of the first headers 1120 be removed from the assembly 1060 via one or more of the conduits 1073 at the ends of the assembly 1060.

In order to operate the fluid treatment assembly 1060 in a dead end mode of filtration, process fluid can be introduced into the fluid treatment elements 1150 from one or both of the second bore 1122 in the first header 1120 and the second bore 1132 in the second header 1130, and filtrate which has passed through the fluid treatment layers of the fluid treatment elements 1150 can be removed through the first bore 1121 in the first header 1120. If process fluid is introduced through only one of the second bores 1122 and 1132, the interior of the second bore which is not used can be maintained at a pressure so that process fluid will not flow into it. Dead end filtration can also be performed by introducing process fluid into each module 1100 from the first bore 1121 of the first header 1120 and removing filtrate from the module 1100 through one or both of the second bores 1122, 1132 in the first and second headers 1120, 1130.

To perform backwashing, a backwashing fluid can be introduced into a module 1100 through the second bore 1122 of the first header 1120, forced radially inwards through the fluid treatment elements 1150, and removed together with dislodged particles from one or both of the first bores 1121 and 1131 of the first and second headers 1120, 1130. Alternatively, the backwashing fluid can be introduced through one or both of the second bores 1122 and 1132, forced radially outwards through the fluid treatment elements 1150, and then removed together with dislodged particles through the first bore 1121 of the first header 1120. The direction in which backwashing fluid flows through the fluid treatment elements 1150 is selected to be the opposite of the direction in which fluid is made to flow during filtration.

During filtration or backwashing, the first bore 1131 in the second header 1130 is typically not used. In Dose situations, unillustrated valves communicating with the first bore 1131 may be closed to prevent fluid flow between the interior of the first bore 1131 and the interior of the recess 1133 in the second header 1130 to which it is connected.

In order to perform crossflow cleaning, a compressed gas, such as compressed air, is introduced into the recess 1133 at the end of the lower fluid treatment element 1150 through the first bore 1131 of the second header 1130 and a liquid, such as water, is introduced into the recess 1133 via the second bore 1132, both at the same pressure. The air and water are mixed in the recess 1133 to form the cleaning fluid. The cleaning fluid flows within the inner drainage layer of the lower fluid treatment element 1150 in a lengthwise direction of the element 1150, flows out of the upper end of the lower fluid treatment element 1150 into the upper fluid treatment element 1150, flows within the inner drainage layer of the upper fluid treatment element 1150 to the upper end of that element, flows out of the upper end of the upper fluid treatment element 1150 into the second bore 1122 of the first header 1120, and then is removed from the assembly 1060 through one or both ends of the assembly 1060. Alternatively, the compressed gas may be passed through the fluid treatment elements 1150 by itself, or the compressed gas and a liquid may be passed through the fluid treatment elements 1150 sequentially, with each fluid being passed through the fluid treatment elements 1150 one or more times.

During crossflow cleaning, it may be desirable to maintain the pressure in the first bore 1121 of the first header 1120 and in the interior of the housing 1110 surrounding the fluid treatment elements 1150 at a pressure equal to or greater than that within the inner drainage layers of the fluid treatment elements 1150 so that the cleaning fluid will not be forced radially outwards through the fluid treatment elements 1150.

Although a liquid may be introduced together with compressed gas through the first bore 1131 of the second header 1130, since the small diameter of the connecting passage 1134 between the first bore 1131 and the recess 1133 may impede the passage of liquid, it may be easier to introduce a crossflow cleaning liquid through the second bore 1132 of the second header 1130 rather than through the first bore 1131. During crossflow cleaning, it may be desirable to maintain the pressure in the second bore 1132 of the second header 1130 at a level such that gas from the first bore 1131 will not flow into the second bore 1132, e.g., substantially equal pressures.

In the present embodiment, all of the bores for carrying fluids in the modules 1100 have two open ends. However, if a module 100 is intended to communicate with only one adjoining module 1100 instead of with two, a module 1100 may have one or more bores which are open at only one end thereof. The bores in a header need not extend along a straight line, and they need not extend between opposite sides of the header. For example, a bore in a header may be L-shaped with two open ends opening onto external surfaces of the header at right angles to each other.

A module 1100 having bores with such a shape can be used to form an assembly having a configuration other than a linear one. For example, a fluid treatment assembly may include a first group of modules 1100, like those shown in FIG. 28, connected to each other along a fist straight line path, and a second group of modules 1100, also like those shown in FIG. 28, connected to each other along a second straight line path perpendicular to the first straight line path, with the two groups of modules 1100 intersecting each other at a module having L-shaped bores formed in its headers for connecting the two groups of modules 1100 to each other.

Figure 31:
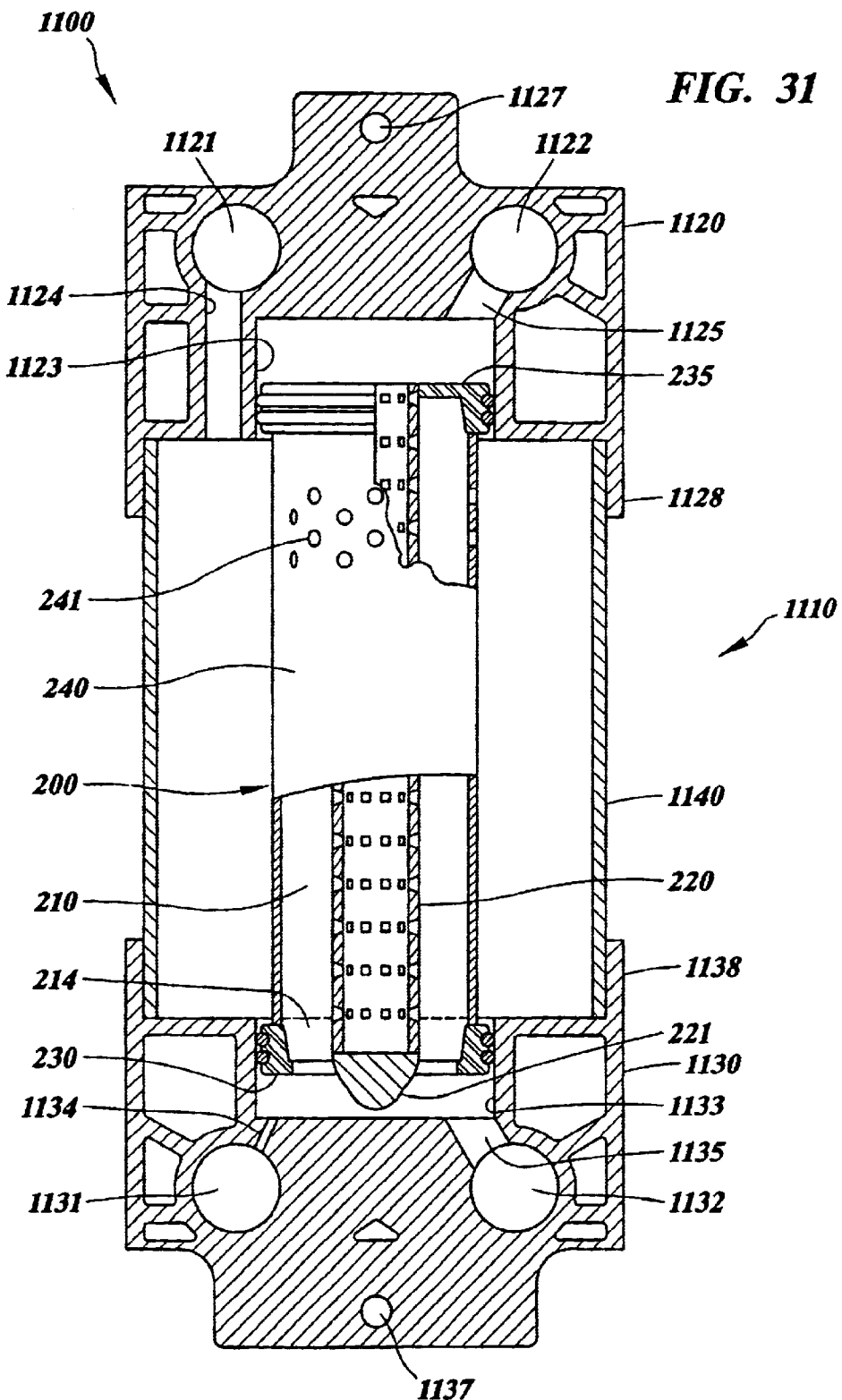
FIG. 31 is a front cross-sectional elevation of another embodiment of a fluid treatment module according to the present invention.

As stated above, the fluid treatment assembly 1060 of FIG. 27 is not limited to use with a specific type of fluid treatment element. Any of the previously described fluid treatment elements may be suitably used. For example, FIG. 31 is a vertical cross-sectional view of a modification of the module 1100 of FIGS. 29 and 30 equipped with a different type of fluid treatment element 200. The illustrated fluid treatment element 200 has a structure like that of the embodiment of FIG. 9 in which process fluid normally flows along the radially outer surfaces of pleats of the fluid treatment element 200 during filtration and permeate or filtrate flows into the perforated core 220 of the fluid treatment element 200 and out a lengthwise end of the core 220.

The housing 1110 of the module 1100 may have substantially the same structure as that of the housing 1110 shown in FIGS. 29 and 30, including first and second headers 1120, 1130 and a casing 1140 extending between and sealed to the headers. The housing 1110 is shown containing only a single fluid treatment element 200, but a plurality of fluid treatment elements 200 may be connected in series, as in the embodiment of FIGS. 29 and 30.

Like the previous embodiment, the embodiment of FIG. 31 can be operated in a variety of modes. In order to perform crossflow filtration, a process fluid to be treated will typically be introduced into the fluid treatment element 200 from the second bore 1132 of the second header 1130. A sealing strip 214 is provided on the radially inner side of the pleats of the fluid treatment body 210 at the lower lengthwise end of the fluid treatment element 200, so the process fluid flows from the second bore 1132 through the lower end cap 230 and into the outer drainage layer of the fluid treatment body 210.

The process fluid then flows within the outer drainage layer towards the upper end of the fluid treatment element 200. As it does so, a portion of the process fluid flows through the fluid treatment layer and is fluid treatment to become permeate, which flows into the perforated core 220, out of the upper end of the core 220 into the recess 1123 in the first header 1120, and then into the second bore 1122 of the first header 1120 to be removed from the module 1100, together with permeate from the other modules 1100 in the assembly 1060.

The portion of the process fluid which reaches the upper end of the fluid treatment element 200 without being filtered flows through the perforations 241 at the upper end of the outer tube 240, into the region of the housing 1110 surrounding the filter element 200, and then into the first bore 1121 of the first header 1120 to be removed from the module 1100 as retentate, together with retentate from the other modules 1100 in the assembly 1060.

In order to operate the filter assembly 1060 in a dead end filtration mode, process fluid can be introduced from one or both of the first bore 1121 in the first header 1120 and the second bore 1132 in the second header 1130, and filtrate which has passed through the filter layer of the filter element 200 can be removed from the second bore 1122 in the first header 1120. If process fluid is introduced through only one of the bores 1121 and 1132, the interior of the other bore can be maintained at a pressure so that process fluid will not flow into it. Dead end filtration can also be performed by introducing process fluid from the second bore 1122 of the first header 1120 and removing filtrate from the module 1100 through one or both of the fist bore 1121 in the first header 1120 and the second bore 1132 in the second header 1130.

To perform backwashing, a backwashing fluid can be introduced through the second bore 1122 of the first header 1120, forced radially outwards through the fluid treatment element 200, and removed together with dislodged particles from one or both of the first bore 1121 in the first header 1120 and the second bore 1132 in the second header 1130. Alternatively, the backwashing fluid can be introduced through one or both of the first bore 1121 in the first header 1120 and the second bore 1132 in the second header 1130, forced radially inwards through the fluid treatment element 200, and then removed together with dislodged particles through the second bore 1122 of the first header 1120.

In order to perform crossflow cleaning, a compressed gas can be introduced into the fluid treatment element 200 through the first bore 1131 of the second header 1130, and a liquid can be introduced into the filter element 200 through the second bore 1132, the gas and liquid mixing to form the cleaning fluid. The cleaning fluid is then made to flow within the outer drainage layer of the fluid treatment element 200 in a lengthwise direction thereof, and then be discharged through the perforations 241 in the outer tube 240 to be removed from the module 1100 through the first bore 1121 in the first header 1120. During crossflow cleaning, it may be desirable to maintain the pressure in the second bore 1122 of the first header 1120 and in the interior of the core 220 at a pressure equal to or greater than that within the outer drainage layer of the fluid treatment element 200 so that the gas used for crossflow cleaning will not be forced radially inwards through the fluid treatment layer of the fluid treatment body 210. As in the previous embodiment, the compressed gas may be passed through the fluid treatment element 200 by itself or the compressed gas and a crossflow cleaning liquid may be passed through the fluid treatment element 200 sequentially.

The following examples further illustrate various aspects of the present invention, but, of course, should not be construed as in any way limiting their scope.

EXAMPLE 1

This Example illustrates an advantage of fluid treatment elements in particular, fluid treatment elements in accordance with an embodiment of the present invention, namely, that the fluid treatment elements provide superior performance when cleaning is carried out in the crossflow mode.

Two fluid treatment elements were subjected to repeated cycles of filtering followed by cleaning either by conventional backwashing or by crossflow cleaning using water in conjunction with air. Each fluid treatment element measured about 20 inches long and had a fluid treatment medium with a do e area of about 12 square feet per side. The two fluid treatment elements had similar fluid treatment layers, drainage layers, and flow rate per unit area. The fluid treatment element subjected to crossflow cleaning had the structure shown in FIG. 5. The fluid treatment element subjected to backwashing was similar in overall structure, except that it had a core which was perforated over its entire length and unobstructed on its interior so that fluid could flow through the interior of the core over its entire length, and the lower end of the core was closed off by a blind end cap in place of the open end cap 140 of FIG. 5.

Each fluid treatment element was used to fluid treatment effluent of an activated sludge municipal waste water plant at a flow rate of 0.03 gpm gallons per minute) per square foot of fluid treatment medium area. Filtration was performed for twenty minutes, followed by cleaning either by backwashing or crossflow cleaning. During crossflow cleaning, water was introduced into a process fluid chamber with a pump, and at the same time compressed air was introduced into the process fluid chamber so that a mixture of water and air passed within the outer drainage layer in the lengthwise direction of the fluid treatment element, with the compressed air passing through the fluid treatment clement at a rate of about 1 scfm, which was equivalent to about 0.083 scfm per square foot of surface area on one side of the fluid treatment medium. At the same time, the pressure within the core of the fluid treatment element was maintained higher than that in the outer drainage layer to prevent the water and air being used for cleaning from passing through the fluid treatment layer. At the end of each 20-minute period of filtration, the terminal pressure drop of the fluid treatment element was measured.

The fluid treatment element which was subjected to conventional backwashing had a terminal pressure drop at the completion of the first period of filtration of under 0.5 psid. The terminal pressure drop increased to 5 psid after sixteen periods of filtration (the preceding fifteen periods of filtration each having been followed by backwash cleaning). For the fluid treatment element which was subjected to crossflow cleaning, the terminal pressure drop at the end of the first period of filtration was also 0.5 psid, but the fluid treatment element was able to operate for about forty-eight periods of filtration before the terminal pressure drop reached 5 psid. Thus, crossflow cleaning was far more effective in removing particles from the fluid treatment element than was backwash cleaning.

EXAMPLE 2

This Example illustrates a method of mass transfer in accordance with an embodiment of the present invention.

Figure 24:
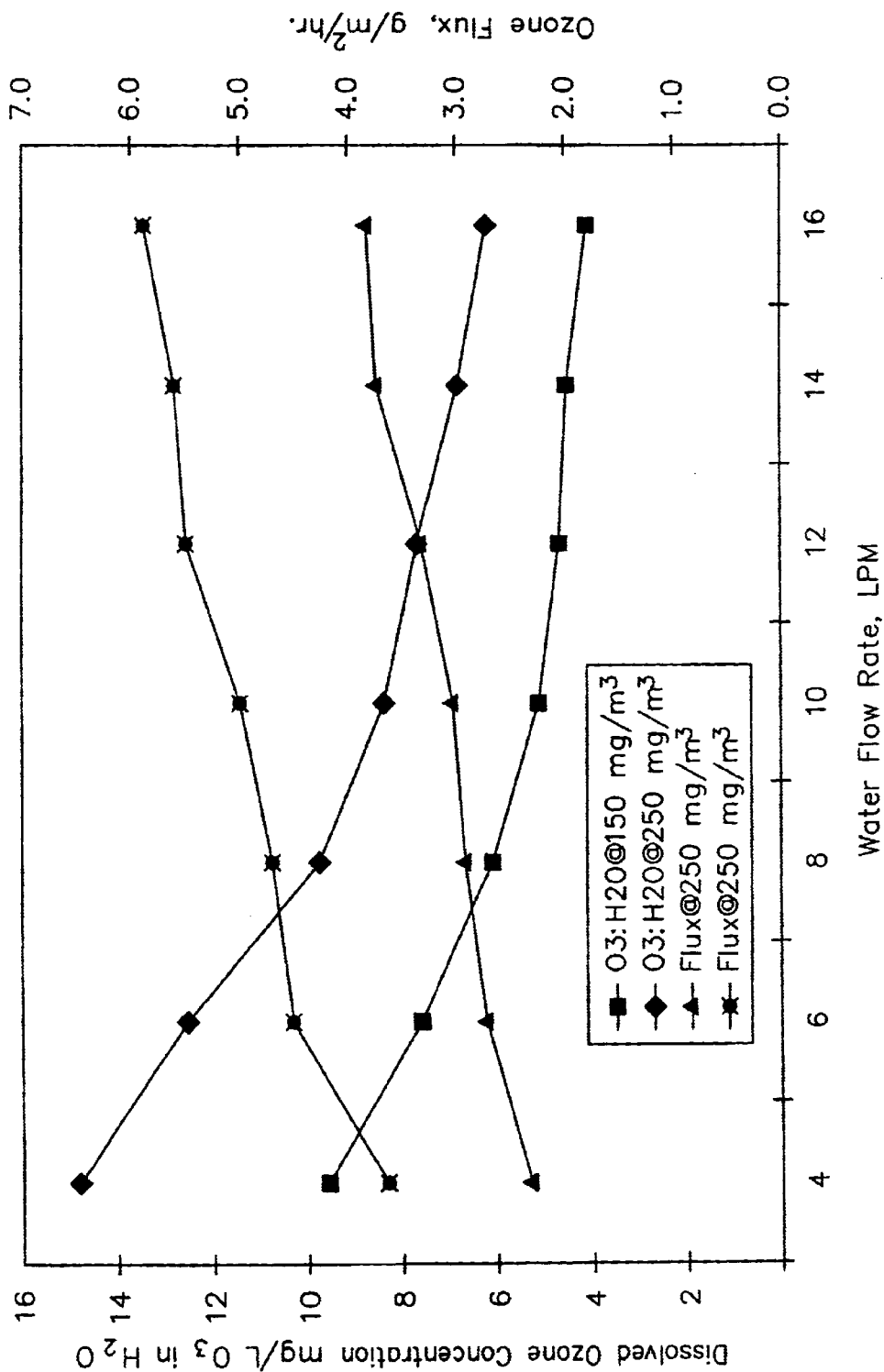
FIG. 24 depicts the dissolved ozone concentration and the ozone flux as a function of the water flow rate through a fluid treatment element in accordance with an embodiment of the present invention.

An all fluoropolymer pleated fluid treatment element substantially depicted in FIG. 23 comprising an expanded PTFE membrane of pore rating 0.2 μm and a PFA mesh was tested for transfer of ozone from a mixture of ozone and oxygen into deionized water. Two different ozone concentrations in oxygen, 150 g/m$^3$ and 250 g/m$^3$, were employed. The tests were carried out in single pass mode. The water flow rate was varied from 4 lpm to 16 lpm. The water pressure was 25 psi. The oxygen pressure was 20 psi. The concentration of ozone in water was monitored. FIG. 24 depicts the dissolved ozone concentration as a function of the water flow rate for the two ozone gas concentrations. As can be seen from the figure, the higher the gas phase ozone concentration, the higher the dissolved concentration. FIG. 24 also depicts the ozone flux as a function of the water flow rate. As can be seen from the figure, the ozone flux is higher at lower dissolved concentration.

EXAMPLE 3

This Example illustrates an advantage of the diffusive mass transfer in accordance with an embodiment of the present invention.

Two all fluoropolymer pleated fluid treatment element substantially depicted in FIG. 23 comprising an expanded porous PTFE membrane of pore rating 0.1 μm available from Pall Corporation as EMFLON™ and a diamond shaped PTFE mesh were tested in sparging and non-sparging modes. It was found that the testing in the non-sparging mode produced higher ozone transfer to water than in the sparging mode. Two different ozone concentrations were employed in these tests.

For the test where the $O_3:O_2$ concentration was 150 g/m$^3$ and the ozone was sparged, the test conditions were as follows: Water flow rate, 8 lpm; oxygen flow rate, 4 slpm; P(water in), 28 psi; P(water out), 25 psi; P(oxygen in), 26 psi; P(oxygen out), 24–26 psi; recirculation volume, 8 gallons. The water temperatures were as follows: at the beginning of the test, 57.6° F., and at the end of the test, 60.1° F. The ozone concentrations in the gas and the liquid streams were measured. The results obtained at set forth below.

| Time (min) | $O_3:O_2$ (g/m$^3$) | $O_3:H_2O$ (mg/L) |
|---|---|---|
| 1 | 153.9 | 4.1 |
| 2 | 153.2 | 4.4 |
| 3 | 152.9 | 5.1 |
| 4 | 152.2 | 5.6 |
| 5 | 151.8 | 6.2 |
| 6 | 151.3 | 6.5 |
| 7 | 150.7 | 6.9 |
| 8 | 150.3 | 7.4 |
| 9 | 149.7 | 8.1 |
| 10 | 149.4 | 8.4 |
| 11 | 149.2 | 8.6 |
| 12 | 148.9 | 8.9 |
| 13 | 148.4 | 9.4 |
| 14 | 148.4 | 10.2 |
| 15 | 148.0 | 12.5 |
| 16 | 147.8 | 13.4 |
| 17 | 147.5 | 13.7 |
| 18 | 147.3 | 13.8 |
| 19 | 147.2 | 13.6 |
| 20 | 147.2 | 13.6 |

For the test where the $O_3:O_2$ concentration was 250 g/m$^3$ and the ozone was sparged, the test conditions were as follows: Water flow rate, 8 lpm; oxygen flow rate, 4 slpm; P(water in), 28 psi, P(water out), 25 psi; P(oxygen in), 26 psi; P(oxygen out), 24–26 psi; recirculation volume, 8 gallons. The water temperatures were as follows: at the beginning of the test, 57.6° F., and at the end of the test 60.1° F. The ozone concentrations in the gas and the liquid stem were measured. The results obtained at set forth below.

| Time (min) | $O_3:O_2$ (g/m$^3$) | $O_3:H_2O$ (mg/L) |
|---|---|---|
| 1.0 | 251.2 | 5.7 |
| 2.0 | 249.9 | 7.6 |
| 3.0 | 249.2 | 10.1 |
| 4.0 | 249.3 | 14.5 |
| 5.0 | 248.5 | 16.7 |
| 6.0 | 247.2 | 18.6 |
| 7.0 | 248.1 | 20.4 |
| 8.0 | 247.8 | 22.2 |
| 9.0 | 247.4 | 23.3 |
| 10.0 | 247.1 | 24.7 |
| 11.0 | 247.2 | 26.0 |
| 12.0 | 247.0 | 26.3 |
| 13.0 | 246.9 | 26.5 |
| 14.0 | 246.5 | 26.4 |
| 15.0 | 245.9 | 26.8 |
| 16.0 | 245.8 | 27.1 |
| 17.0 | 245.6 | 27.0 |
| 18.0 | 245.2 | 26.9 |
| 19.0 | 245.1 | 27.2 |
| 20.0 | 245.3 | 27.1 |

For the test where the $O_3:O_2$ concentration was 150 g/m$^3$ and the ozone was non-sparging, tile test conditions were as follows: Water flow rate, 8 lpm; oxygen flow rate, 4 slpm; P(water in), 28 psi; P(water out), 25 psi; P(oxygen in), 22 psi; P(oxygen out), 20 psi; recirculation volume, 8 gallons. The water temperatures were as follows: at the beginning of the test, 68.9° F., and at the end of the test, 72.3° F. The ozone concentrations in the gas and the liquid streams were measured. The results obtained at set forth below.

| Time (min) | $O_3:O_2$ (g/m$^3$) | $O_3:H_2O$ (mg/L) |
|---|---|---|
| 1 | 148.0 | 7.3 |
| 2 | 148.2 | 8.8 |
| 3 | 147.8 | 9.7 |
| 4 | 147.6 | 10.5 |
| 5 | 147.4 | 11.2 |
| 6 | 147.1 | 12.8 |
| 7 | 147.4 | 13.4 |
| 8 | 147.6 | 14.6 |
| 9 | 147.1 | 15.2 |
| 10 | 146.6 | 15.6 |
| 11 | 146.3 | 16.2 |
| 12 | 146.2 | 16.6 |
| 13 | 146.2 | 17.4 |
| 14 | 146.0 | 17.8 |
| 15 | 145.7 | 18.1 |
| 16 | 145.5 | 18.5 |
| 17 | 144.2 | 18.7 |
| 18 | 145.0 | 19.2 |
| 19 | 144.9 | 19.3 |
| 20 | 144.5 | 19.5 |

For the test where the $O_3:O_2$ concentration was 250 g/m$^3$ and the ozone was non-sparging, the test conditions were as follows: Water flow rate, 8 lpm; oxygen flow rate, 4 slpm; P(water in), 28 psi; P(water out), 25 psi; P(oxygen in), 22 psi; P(oxygen out), 20 psi; recirculation volume, 8 gallons. The water temperatures were as follows: at the beginning of the test, 67.8° F., and at the end of the test, 70.9° F. The ozone concentrations in the gas and the liquid streams were measured. The results obtained at set forth below.

| Time (min) | $O_3:O_2$ (g/m$^3$) | $O_3:H_2O$ (mg/L) |
|---|---|---|
| 1 | 258.4 | 12.7 |
| 2 | 258.7 | 16.1 |
| 3 | 258.1 | 18.8 |
| 4 | 257.2 | 21.4 |
| 5 | 256.8 | 23.6 |
| 6 | 256.2 | 24.5 |
| 7 | 255.8 | 25.8 |
| 8 | 255.2 | 27.1 |
| 9 | 254.7 | 28.0 |
| 10 | 254.5 | 28.7 |
| 11 | 254.2 | 29.5 |
| 12 | 254 | 30.2 |
| 13 | 253.2 | 31.0 |
| 14 | 253.8 | 31.7 |
| 15 | 253.5 | 32.5 |
| 16 | 252.7 | 33.2 |
| 17 | 252.2 | 33.9 |
| 18 | 252.1 | 34.3 |
| 19 | 252 | 34.6 |
| 20 | 252.3 | 34.9 |

The foregoing data show that higher concentrations of ozone in water were obtained in a non-sparging mode than in a sparging mode.

EXAMPLE 4

This Example illustrates a method of diffusively transferring ozone to water by the use of a fluid treatment element in accordance with an embodiment of the present invention.

An all fluoropolymer pleated membrane module, substantially as depicted in FIG. 23 was employed in this test. The fluid treatment medium had an average pore rating of 0.1 μm. Ozone was generated in an ASTEX™ AX8400 ozone generator. The ozone was passed in a non-sparging mode with an upstream $O_3:O_2$ concentration of 250 g/m$^3$. Deionized water was passed downstream. Water was recirculated. The test conditions were as follows: water flow rate=16 lpm, water back pressure=2 psi, gas flow rate=2 slpm, gas back pressure=0 psi.

The ozone concentrations in the gas and water were measured by the use of DFFOZ™ and GFFOZ™ (both from IN USA Inc.) gas and liquid ozone sensors. The ozone flux rate varied from 2.8 g/m$^2$/hr at the start of the test to 0.3 g/m$^2$/hr at the ozone saturation level. An ozone concentration of 20–30 ppm was achieved and maintained in a 7-gallon capacity recirculating deionized water tank during 6 days of continuous testing. The ozone destruction, primarily due to the high TOC (Total Organic Carbon) present in the water, was at the rate of 3.0–0.3 g/m$^2$/hr. The results obtained are set forth below.

| Conc.(ppm) | Day 1 | Day 2 | Day 3 | Day 4 | Day 5 |
|---|---|---|---|---|---|
| 0–5 | 2.8 | N/A | 1.4 | 1.4 | 1.9 |
| 5–10 | 1.8 | N/A | 1 | 1.5 | 1.6 |
| 10–15 | 1.2 | N/A | 0.8 | 0.8 | 1.3 |
| 15–20 | 0.6 | N/A | 0.4 | 0.3 | 0.3 |
| Max. concentration | 31 | 22 | 23 | 24 | 25 |
| Time to max. Conc. (min) | 30 | | 45 | 60 | 60 |

Figure 25:
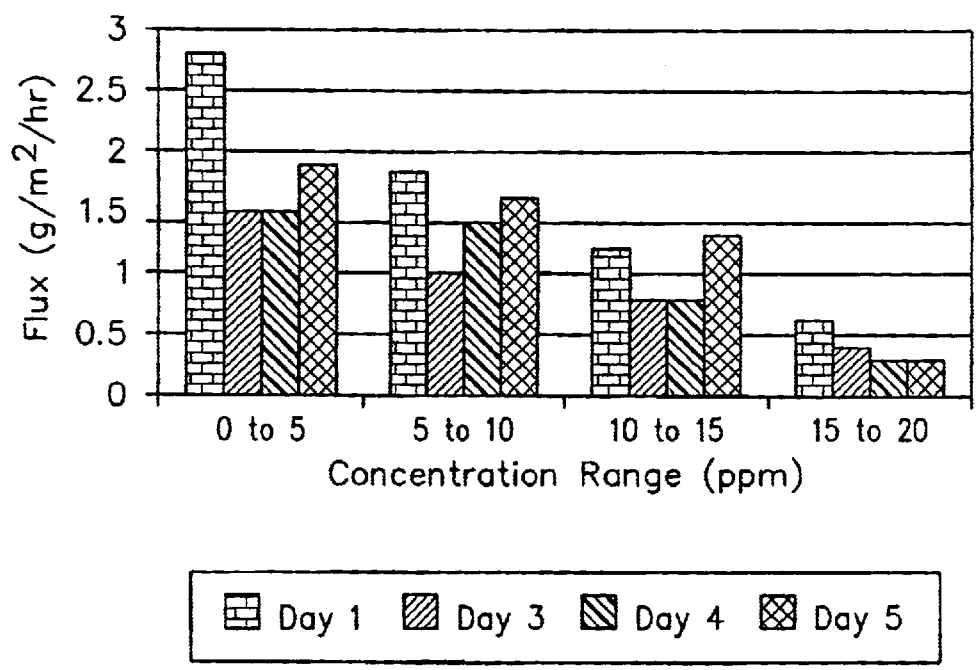
FIG. 25 depicts the ozone flux as a function of ozone concentration in water through a fluid treatment element in accordance with an embodiment of the present invention.

FIG. 25 depicts the flux as a function of ozone concentration in water. As can be seen from FIG. 25 and the data in Table 1, as the concentration of ozone in water increased, the flux decreased. This is to be expected since flux rate is dependent on the solution concentration gradient. As the ozone concentration increased, the concentration gradient decreased. Further, the maximum ozone concentration was reached in a relatively short time as shown in FIG. 26.

The fluid treatment element operated without significant drop in performance. After 6 days of continuous testing, no significant drop in the performance was observed.

Water was withdrawn from the recirculation tank every day before and after the ozone transfer test for TOC analysis, the results obtained are set forth below.

| Day | TOC before test (ppb) | TOC after test (ppb) |
|---|---|---|
| 1 | 220 | N/A |
| 2 | N/A | 120 |
| 3 | 770 | 240 |
| 4 | 1090 | 440 |
| 7 | 2100 | N/A |

The foregoing shows that the fluid treatment element transferred ozone to water in an amount that was effective in destroying the organic carbon content in water.

EXAMPLE 5

This Example illustrates an advantage of the fluid treatment element according to an embodiment of the present invention. The fluid treatment element depicted in FIG. 23 is substantially free of extractables.

An all fluoropolymer fluid treatment element was rinsed with deionized water and the resistivity of the rinsate was measured. The fluid treatment element included a 0.2 μm PTFE fluid treatment medium from Pall Corporation and a PFA woven mesh. The fluid treatment element was mounted in a horizontal fashion and deionized water was passed at a rate of 2 gpm through one side of the medium. The other side was left open to the atmosphere. Resistivity of the water was measure upstream and downstream with a Thornton 770 PC conductivity meter. The TOC level in the water also was measured by using an Anatel A-100P TOC monitor. The results obtained are set forth below.

| Time (Min) | Resistivity (upstream) Megohms | Resistivity (down) Megohms | TOC (ppb) |
|---|---|---|---|
| 1 | 18.06 | 14.01 | 5.79 |
| 5 | 18.05 | 16.76 | 5.13 |
| 12 | 18.05 | 17.38 | |
| 20 | 18.05 | 17.66 | 4.8 |
| 60 | 18.04 | 18.03 | 3.4 |
| 85 | — | — | 2.96 |

The rinsings also were analyzed for certain anions, cations, and transition metals. The results obtained are set forth below along with the detection limits.

| Anions | Blank ppb | Test Result ppb | Detection Limit (DL), ppb |
|---|---|---|---|
| F | <DL | <DL | 0.3 |
| Cl | <DL | 0.6 | 0.3 |
| $NO_3$ | <DL | <DL | 0.6 |
| $HPO_4$ | <DL | <DL | 0.9 |
| $SO_4$ | <DL | <DL | 1.7 |
| Cations | | | |
| Li | <DL | <DL | 0.5 |
| Na | <DL | <DL | 0.2 |
| $H_4N$ | <DL | <DL | 1.0 |
| K | <DL | <DL | 0.3 |
| Mg | <DL | <DL | 0.3 |
| Ca | <DL | 1.0 | 1.0 |
| Transition metals | | | |
| Fe | <DL | <DL | 0.5 |
| Cu | <DL | <DL | 0.5 |
| Ni | <DL | <DL | 1.0 |
| Zn | <DL | <DL | 2.0 |
| Co | <DL | <DL | 1.0 |

The foregoing shows that the fluid treatment element did not leach materials into the water.

All references cited herein, including patents and, patent applications, are incorporated herein in their entireties by reference.

While this invention has been described with an emphasis upon several embodiments, it will be obvious to those of ordinary skill in the art that variations of the embodiments may be used and that it is intended that the invention may be practiced otherwise tan as specifically described herein. For example, in accordance with the present invention, one or more or all of the features of any of the disclosed embodiments may be substituted and/or combined with one or more or all of the features of any of the other disclosed embodiments. Additionally, in accordance with the present invention, fewer than all of the disclosed features of each embodiment may be included within the invention. According, this invention includes all modifications encompassed within the spirit and scope of the invention as defined by the following claims.

What is claimed is:

1. A fluid treatment element adapted for cross flow filtration comprising a fluid treatment pack having first and second lengthwise ends, a fluid treatment layer, a first mesh layer disposed on a first side of the fluid treatment layer, and a second mesh layer disposed on a second side of the fluid treatment layer, the fluid treatment element defining a flow path for a process fluid to be treated passing in a lengthwise direction of the fluid treatment element inside the first mesh layer and a flow path for permeate passing through the second mesh layer and wherein the first mesh layer opens onto the first lengthwise end and the second mesh layer includes sealant at the first lengthwise end whereby fluid can flow through the first lengthwise end into the first mesh layer but not into the second mesh layer.

2. The fluid treatment element according to claim 1 wherein the fluid treatment layer is pleated, the pleated fluid treatment layer comprising a plurality of longitudinal pleats, wherein each pleat includes a crown, a root, and a pair of legs and wherein the legs of each pleat are joined to one another at the crown of the pleat and are joined to legs of adjacent pleats at the root of the pleat.

3. The fluid treatment element as claimed in claim 2 wherein the mesh layers are pleated with the fluid treatment layer.

4. The fluid treatment element as claimed in claim 2 wherein the height of each pleat measured in a direction along the legs and extending from the root of the pleat to the crown is equal to (D–d)/2, wherein D is the outer diameter of the fluid treatment element at the peaks of the fluid treatment element and d is the inner diameter of the fluid treatment element at the crowns of the fluid treatment element.

5. The fluid treatment element according to claim 1 wherein the sealant comprises an injected sealant.

6. The fluid treatment element according to claim 5 wherein the injected sealant comprises a resin.

7. The fluid treatment element as claimed in claim 1 wherein one of the mesh layers comprises nonwoven polymeric mesh.

8. The fluid treatment element as claimed in claim 1 wherein each mesh layer comprises a nonwoven polymeric mesh.

9. The fluid treatment element according to claim 1 wherein at least one mesh layer has parallel strands extending in the lengthwise direction of the fluid treatment element and a lower edgewise flow resistance in a direction generally parallel to the mesh layer surface.

10. The fluid treatment element according to claim 9 wherein at least one mesh layer comprises an extruded mesh.

11. A fluid treatment element comprising a fluid treatment pack having first and seconds lengthwise ends, a pleated fluid treatment medium, a first drainage medium disposed on a first side of the fluid treatment medium comprising a mesh having parallel strands extending in the lengthwise direction of the fluid treatment element and a lower edgewise flow resistance in a direction generally parallel to the mesh surface, and a second drainage medium disposed on a second side of the fluid treatment medium, the first drainage medium opening onto the first lengthwise end and the second drainage medium including sealant at the first lengthwise end whereby fluid can flow through the first lengthwise end into the first drainage medium but not into the second drainage medium the pleated fluid treatment medium comprising a plurality of longitudinal pleats, each pleat including a crown, a root, and a pair of legs, wherein the legs of each pleat are joined to one another at the crown of the pleat and are joined to legs of adjacent pleats at the root of the pleat, the fluid treatment element defining a flow path for process fluid to be treated passing in a lengthwise direction of the fluid treatment element inside the first drainage medium.

12. The fluid treatment element according to claim 11 wherein the drainage media are pleated with the fluid treatment medium.

13. The fluid treatment element according to claim 10 wherein the sealant comprises an injected sealant.

14. The fluid treatment element according to claim 13 wherein the injected sealant comprises a resin.

15. The fluid treatment element according to claim 11 wherein the first drainage medium is disposed on the radially inner side of the fluid treatment medium.

16. The fluid treatment element according to claim 15 further comprising an imperforate and impervious core, having first and second lengthwise ends, the core surrounded by the fluid treatment pack, wherein the lengthwise ends of the core are sealed to prevent fluid flow therethrough and a wrap member is disposed around an outer periphery of the fluid treatment pack.

17. The fluid treatment element according to claim 11 wherein the second drainage medium is disposed on the radially outer side of the fluid treatment medium.

18. The fluid treatment element according to claim 11 wherein the first drainage medium is disposed on the radially outer side of the fluid treatment medium.

19. The fluid treatment element according to claim 18 further comprising a perforated core surrounded by the fluid treatment pack, the core having first and second lengthwise ends, wherein one of the lengthwise ends is sealed to prevent fluid flow therethrough.

20. The fluid treatment element according to claim 11 wherein the second drainage medium is disposed on the radially inner side of the fluid treatment medium.

21. The fluid treatment element according to claim 11 wherein the fluid treatment element defines a flow path for permeate passing through the second drainage medium.

22. The fluid treatment element according to claim 11 wherein the fluid treatment element defines a flow path for a gas passing through the second drainage medium.

23. The fluid treatment element according to claim 11 wherein the height of each pleat measured in a direction along the legs and extending from the root of the pleat to the crown is equal to $(D-d)/2$, wherein D is the outer diameter of the fluid treatment element at the peaks of the fluid treatment element and d is the inner diameter of the fluid treatment element at the crowns of the fluid treatment element.

24. The fluid treatment element according to claim 11 further comprising a first end cap at a first lengthwise end of the fluid treatment pack and a second end cap at the second lengthwise end of the pack.

25. The fluid treatment element according to claim 24 wherein at least one end cap is adapted to be coupled to an end cap of an adjacent fluid treatment pack.

26. The fluid treatment element according to claim 11 further comprising a core having first and second lengthwise ends surrounded by the fluid treatment pack.

27. The fluid treatment element according to claim 26 wherein the core is imperforate and impervious and at least one lengthwise end is sealed to prevent fluid flow therethrough.

28. The fluid treatment element according to claim 26 wherein the core includes a perforated section extending between the first and second lengthwise ends through which fluid can flow between the interior of the core and the fluid treatment pack and wherein the first lengthwise end is sealed to prevent fluid flow therethrough.

29. The fluid treatment element according to claim 26 wherein an adhesive seals the gaps between adjoining pleats and the core, preventing fluid from flowing along the area between the core and the inner periphery of the fluid treatment pack.

30. The fluid treatment element according to claim 11 further comprising a housing surrounding the fluid treatment element having first and second lengthwise ends and a first fluid port disposed at the first lengthwise end, a second fluid port disposed at the second lengthwise end, and a third fluid port disposed at a location spaced from the first fluid port.

31. The fluid treatment element according to claim 30 wherein at least one fluid port is adapted to connect to a source of gas for cleaning the fluid treatment element.

32. The fluid treatment element according to claim 30 wherein the housing comprises an elongated tubular member and wherein an inner periphery of the housing fits closely around an outer periphery of the fluid treatment medium.

33. The fluid treatment element according to claim 11 wherein the pleated fluid treatment medium comprises one or more porous membranes.

34. The fluid treatment element according to claim 33 wherein the porous membrane comprises a PVDF membrane.

35. The fluid treatment element according to claim 33 wherein the porous membrane comprises a PTFE membrane.

36. The fluid treatment element according to claim 11 wherein the fluid treatment pack includes at least one of a cushioning layer disposed between the first drainage medium and the fluid treatment medium and a cushioning layer disposed between the fluid treatment medium and the second drainage layer.

37. The fluid treatment element according to claim 11 further comprising a wrap member disposed around an outer periphery of the fluid treatment pack.

38. The fluid treatment element according to claim 37 wherein the wrap member comprises a spiral wrap.

39. The fluid treatment element according to claim 37 wherein the wrap member comprises a cylindrical sleeve.

40. A fluid treatment element comprising a fluid treatment pack having a pleated fluid treatment medium, a first drainage medium disposed on a first side of the fluid treatment medium comprising a mesh having parallel strands extending in the lengthwise direction of the fluid treatment element and a lower edgewise flow resistance in a direction generally parallel to the mesh surface, and a second drainage medium disposed on a second side of the fluid treatment medium, the pleated fluid treatment medium comprising a plurality of longitudinal pleats, each pleat including a crown, a root, and a pair of legs, wherein the legs of each pleat are joined to one another at the crown of the pleat and are joined to legs of adjacent pleats at the root of the pleat, and a core having first and second lengthwise ends surrounded by the fluid treatment pack and a blind region in which fluid cannot flow between an interior of the core and the fluid treatment pack and a perforated region in which fluid can flow between the interior of the core and the fluid treatment pack adjoining at least one lengthwise end, the fluid treatment element defining a flow path for process fluid to be treated passing in a lengthwise direction of the fluid treatment element inside the first drainage medium.

41. The fluid treatment element according to claim 40 wherein the core includes a perforated region adjoining both lengthwise ends.

42. The fluid treatment element according to claim 40 wherein the fluid treatment element defines a flow path for a gas passing through the second drainage medium.

43. The fluid treatment element of claim 40 wherein the drainage media are pleated with the fluid treatment medium.

44. The fluid treatment element of claim 40 wherein the interior of core is hollow or solid.

45. A fluid treatment element comprising a fluid treatment pack having a pleated fluid treatment medium, a first drainage medium disposed on a first side of the fluid treatment medium comprising a mesh having parallel strands extending in the lengthwise direction of the fluid treatment element and a lower edgewise flow resistance in a direction generally parallel to the mesh surface, and a second drainage medium disposed on a second side of the fluid treatment medium, the pleated fluid treatment medium comprising a plurality of longitudinal pleats, each pleat including a crown, a root, and a pair of legs, wherein the legs of each pleat are joined to one another at the crown of the pleat and are joined to legs of adjacent pleats at the root of the pleat, and a core having first and second lengthwise ends surrounded by the fluid treatment pack, a blind region in which fluid cannot flow between an interior of the core and the fluid treatment pack and regions through which fluid can flow between an interior of the core and the fluid treatment pack adjoining both lengthwise ends, the fluid treatment element defining a flow path for process fluid to be treated passing in a lengthwise direction of the fluid treatment element inside the first drainage medium.

46. The fluid treatment element according to claim 45 wherein the fluid treatment element defines a flow path for a gas passing through the second drainage medium.

47. The fluid treatment element of claim 45 wherein the fluid treatment element defines a flow path for gas passing through the second drainage medium.

48. The fluid treatment element of claim 45 wherein the interior of the core is hollow or solid.

49. A fluid treatment element comprising a fluid treatment pack having a pleated fluid treatment medium, a first drainage medium disposed on a first side of the fluid treatment medium comprising a mesh having parallel strands extending in the lengthwise direction of the fluid treatment element and a lower edgewise flow resistance in a direction generally parallel to the mesh surface, and a second drainage medium disposed on a second side of the fluid treatment medium, the pleated fluid treatment medium comprising a plurality of longitudinal pleats, each pleat including a crown, a root, and a pair of legs, wherein the legs of each pleat are joined to one another at the crown of the pleat and are joined to legs of adjacent pleats at the root of the pleat and a core having first and second lengthwise ends surrounded by the fluid treatment pack, and a blind region in which fluid cannot flow between an interior of the core and the fluid treatment pack and extending for less than an entire length of fluid treatment pack, the fluid treatment element defining a flow path for process fluid to be treated passing in a lengthwise direction of the fluid treatment element inside the first drainage medium.

50. The fluid treatment element of claim 48 wherein the drainage media are pleated with the fluid treatment medium.

51. The fluid treatment element of claim 48 wherein the fluid treatment element defines a flow path for gas passing through the second drainage medium.

52. The fluid treatment element of claim 48 wherein the interior of the core is hollow or solid.

53. A fluid treatment element comprising a fluid treatment pack having a pleated fluid treatment medium, a first drainage medium disposed on a first side of the fluid treatment medium comprising a mesh having parallel strands extending in the lengthwise direction of the fluid treatment element and a lower edgewise flow resistance in a direction generally parallel to the mesh surface, and a second drainage medium disposed on a second side of the fluid treatment medium, the pleated fluid treatment medium comprising a plurality of longitudinal pleats, each pleat including a crown, a root, and a pair of legs, wherein the legs of each pleat are joined to one another at the crown of the pleat and are joined to legs of adjacent pleats at the root of the pleat, wherein the fluid treatment pack has first and second end regions through which fluid can flow between the exterior of the fluid treatment pack and the fluid treatment pack and an intermediate region between the first and second end regions through which fluid cannot flow between an exterior of the fluid treatment pack and the fluid treatment pack, the fluid treatment element defining a flow path for process fluid to be treated passing in a lengthwise direction of the fluid treatment element inside the first drainage medium.

54. The fluid treatment element according to claim 53 further comprising a first end cap at a first lengthwise end of the fluid treatment pack and a second end cap at a second lengthwise end of the fluid treatment pack.

55. The fluid treatment element of claim 53 further comprising a core having first and second lengthwise ends, a blind region in which fluid cannot flow between an interior of the core and the fluid treatment pack and a region through which fluid can flow between an interior of the core and the fluid treatment pack adjoining at least one lengthwise end.

56. The fluid treatment element of claim 55 wherein the core includes regions through which fluid can flow between an interior of the core and the fluid treatment pack adjoining both lengthwise ends.

57. The fluid treatment element of claim 55 wherein the interior of the core is hollow or solid.

58. The fluid treatment element of claim 53 wherein the drainage medium are pleated with the fluid treatment medium.

59. The fluid treatment element of claim 53 wherein the fluid treatment element defines a flow path for gas passing through the second drainage medium.

* * * * *